(12) United States Patent
Badenhorst

(10) Patent No.: US 12,059,924 B1
(45) Date of Patent: Aug. 13, 2024

(54) BICYCLE HUB SYSTEM, METHOD AND DEVICE INCLUDING A FRONT HUB LOCKING MECHANISM

(71) Applicant: Red Star Holdings, LLC, Saratoga, CA (US)

(72) Inventor: Casper Hendrik Badenhorst, Pietermaritzburg (ZA)

(73) Assignee: Red Star Holdings, LLC, Saratoga, CA (US)

( * ) Notice: Subject to any disclaimer, the term of this patent is extended or adjusted under 35 U.S.C. 154(b) by 0 days.

(21) Appl. No.: 18/242,361

(22) Filed: Sep. 5, 2023

(51) Int. Cl.
*B60B 27/02* (2006.01)
*B60B 27/00* (2006.01)

(52) U.S. Cl.
CPC ........ *B60B 27/023* (2013.01); *B60B 27/0005* (2013.01); *B60B 27/0026* (2013.01); *B60B 27/0047* (2013.01); *B60B 2320/10* (2013.01); *B60B 2900/521* (2013.01)

(58) Field of Classification Search
CPC ..... B60B 27/023; B60B 27/026; B60B 1/042; B60B 1/04
See application file for complete search history.

(56) References Cited

U.S. PATENT DOCUMENTS

| | | |
|---|---|---|
| 4,170,369 A | 10/1979 | Strutman |
| 4,226,317 A | 10/1980 | Nagano et al. |
| 4,659,097 A | 4/1987 | Kupper et al. |
| 5,090,776 A | 2/1992 | Van Breemen |
| 5,332,294 A | 7/1994 | Haeussinger |
| 5,390,947 A | 2/1995 | Pong et al. |
| 5,456,537 A * | 10/1995 | Wang .................. B60B 27/023 384/545 |
| 5,549,315 A | 8/1996 | Ashman |
| 5,823,555 A | 10/1998 | Ashman |
| 6,059,305 A | 5/2000 | Bollini |
| 6,290,304 B1 | 9/2001 | Lashinske |
| 6,374,975 B1 | 4/2002 | Schlanger |
| 6,409,281 B1 | 6/2002 | Kanehisa et al. |
| 6,435,622 B1 | 8/2002 | Kanehisa et al. |
| 6,497,314 B2 | 12/2002 | Kanehisa |
| 6,523,659 B2 | 2/2003 | Kanehisa et al. |
| 6,736,464 B1 | 5/2004 | Pidoux |
| 7,011,321 B2 | 3/2006 | Hargroder |
| RE39,528 E | 3/2007 | Kanehisa et al. |
| 7,909,412 B2 | 3/2011 | Ashman |
| 7,926,886 B1 | 4/2011 | Ashman |
| 8,449,045 B2 | 5/2013 | Ashman |
| 8,485,335 B2 | 7/2013 | Schlanger |
| 9,315,071 B2 | 4/2016 | Webber |
| 9,944,119 B2 | 4/2018 | Hara |

(Continued)

FOREIGN PATENT DOCUMENTS

| | | |
|---|---|---|
| CN | 209381679 U | 9/2019 |
| EP | 0094649 A2 | 11/1983 |

(Continued)

*Primary Examiner* — Jason R Bellinger
(74) *Attorney, Agent, or Firm* — Haverstock & Owens, A Law Corporation

(57) ABSTRACT

A bicycle hub system, method and device including rear and front hub assemblies. Both the rear and front hub assemblies include locking mechanisms with matching undulating splined coupling faces that correspond to complementary undulating splined coupling faces of a wheel hub.

26 Claims, 74 Drawing Sheets

(56) References Cited

U.S. PATENT DOCUMENTS

| | | |
|---|---|---|
| 10,189,306 B2 | 1/2019 | Thoma et al. |
| 10,870,464 B2 | 12/2020 | Braedt |
| 2002/0067068 A1 | 6/2002 | Kanehisa et al. |
| 2002/0067069 A1 | 6/2002 | Kanehisa et al. |
| 2002/0070604 A1 | 6/2002 | Kanehisa |
| 2002/0072446 A1 | 6/2002 | Kanehisa et al. |
| 2004/0017058 A1 | 1/2004 | Hargroder |
| 2006/0119172 A1 | 6/2006 | Mercat et al. |
| 2006/0158022 A1 | 7/2006 | Nicolai |
| 2007/0035106 A1 | 2/2007 | Thorpe |
| 2007/0222275 A1 | 9/2007 | Vrielink |
| 2009/0243255 A1 | 10/2009 | Ashman |
| 2010/0170762 A1 | 7/2010 | Schlanger |
| 2011/0133543 A1 | 6/2011 | Ashman |
| 2011/0227401 A1* | 9/2011 | Huang .................. B60B 27/023  301/110.5 |
| 2015/0015125 A1 | 1/2015 | Webber |
| 2016/0039491 A1 | 2/2016 | Morelli |
| 2016/0311256 A1 | 10/2016 | Hara |
| 2017/0050465 A1 | 2/2017 | Thoma et al. |

FOREIGN PATENT DOCUMENTS

| | | |
|---|---|---|
| EP | 0191710 A2 | 8/1986 |
| EP | 0277576 A2 | 8/1988 |
| EP | 0890505 B1 | 11/2004 |
| EP | 3492275 A1 | 6/2019 |
| FR | 2501124 | 9/1982 |
| FR | 2518461 | 6/1983 |
| FR | 2618101 A1 | 1/1989 |
| FR | 2680746 A1 | 3/1993 |
| FR | 2782471 A1 | 2/2000 |
| FR | 3005028 A1 | 10/2014 |
| FR | 3061452 | 7/2018 |
| FR | 3068674 | 1/2019 |
| FR | 3077264 A1 | 8/2019 |
| GB | 9170 | 4/1912 |
| GB | 2435018 A | 8/2007 |
| GB | 2493925 A | 2/2013 |
| IT | MO20100309 | 4/2012 |
| WO | 92/01573 | 2/1992 |
| WO | 2016/083412 A1 | 6/2016 |
| WO | 2017/195124 A1 | 11/2017 |
| WO | 2018/121947 A1 | 7/2018 |

\* cited by examiner

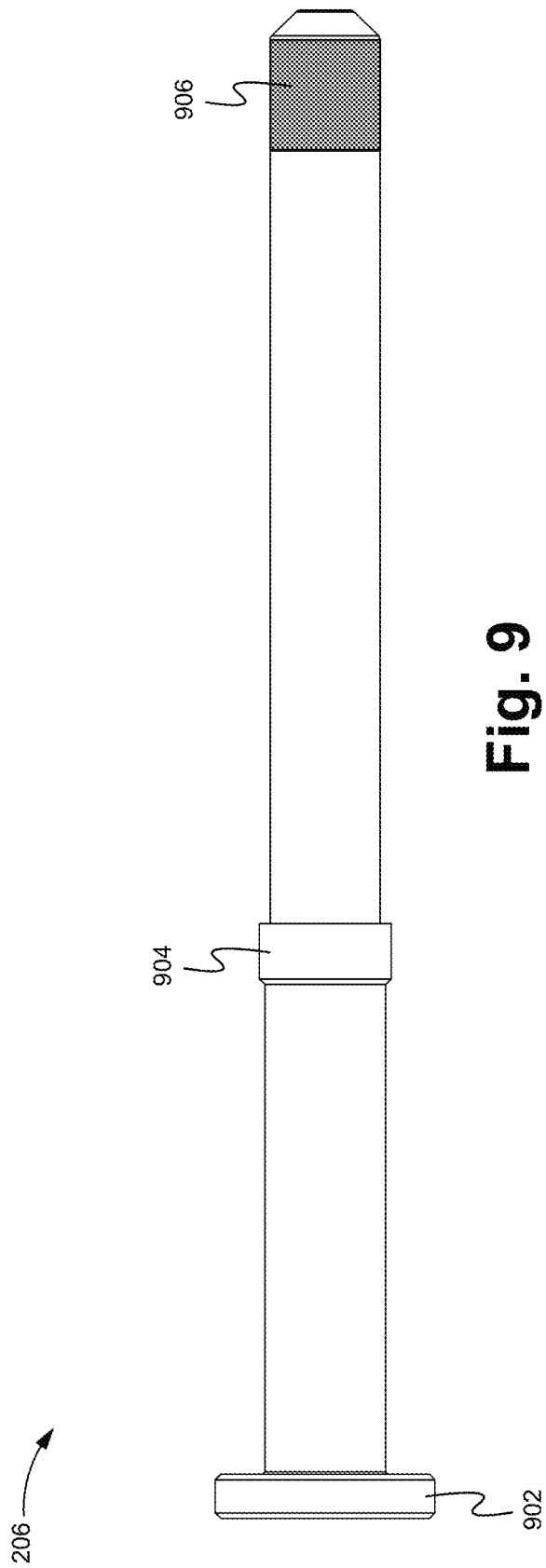

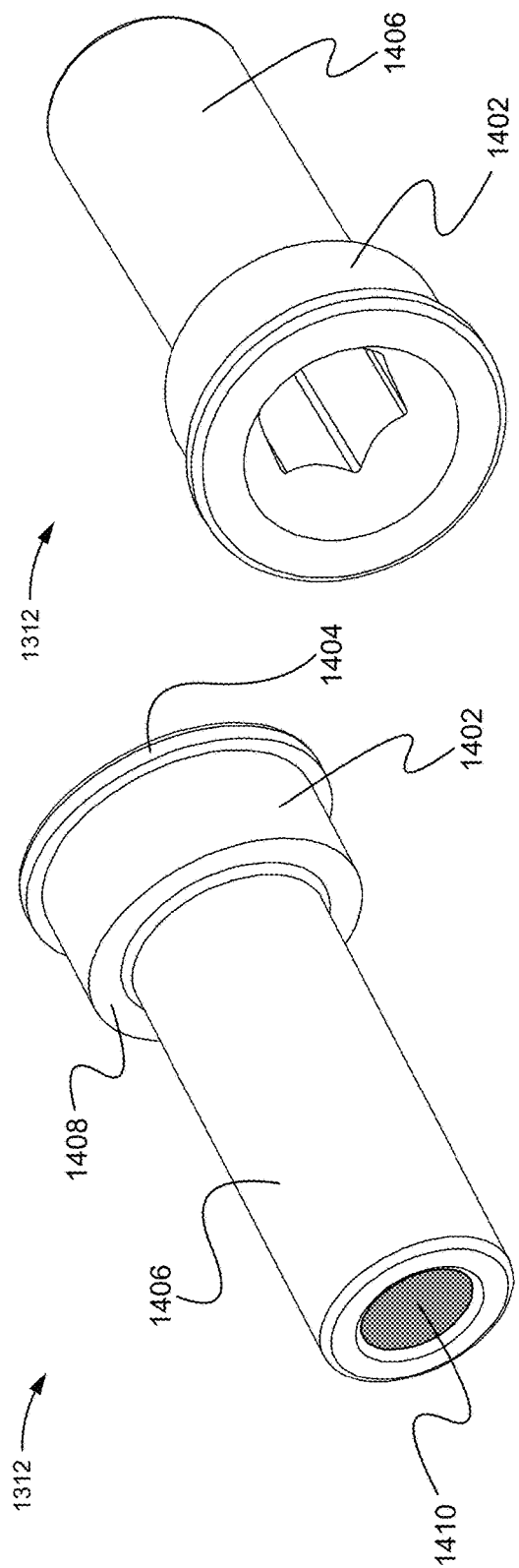
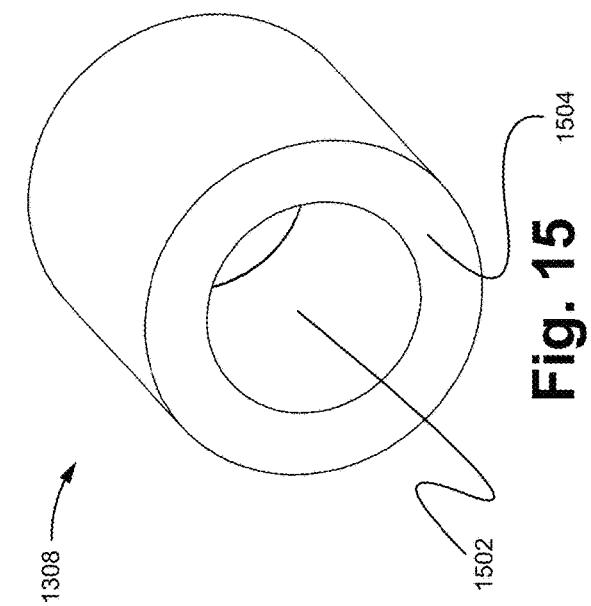

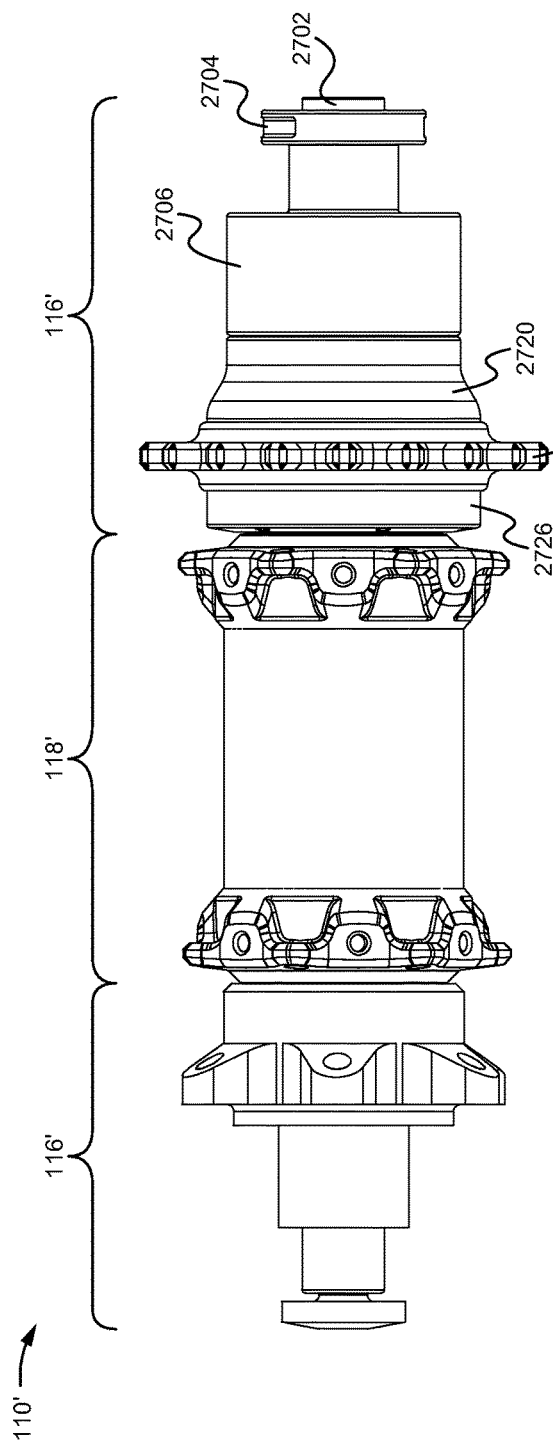
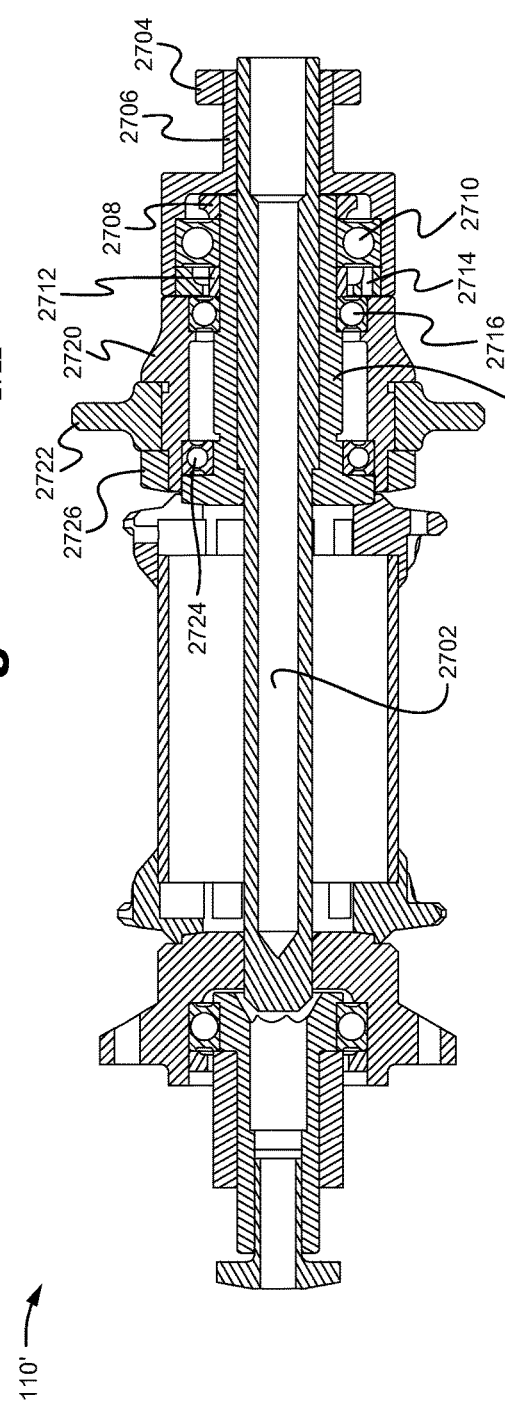
Fig. 27B
Fig. 27C

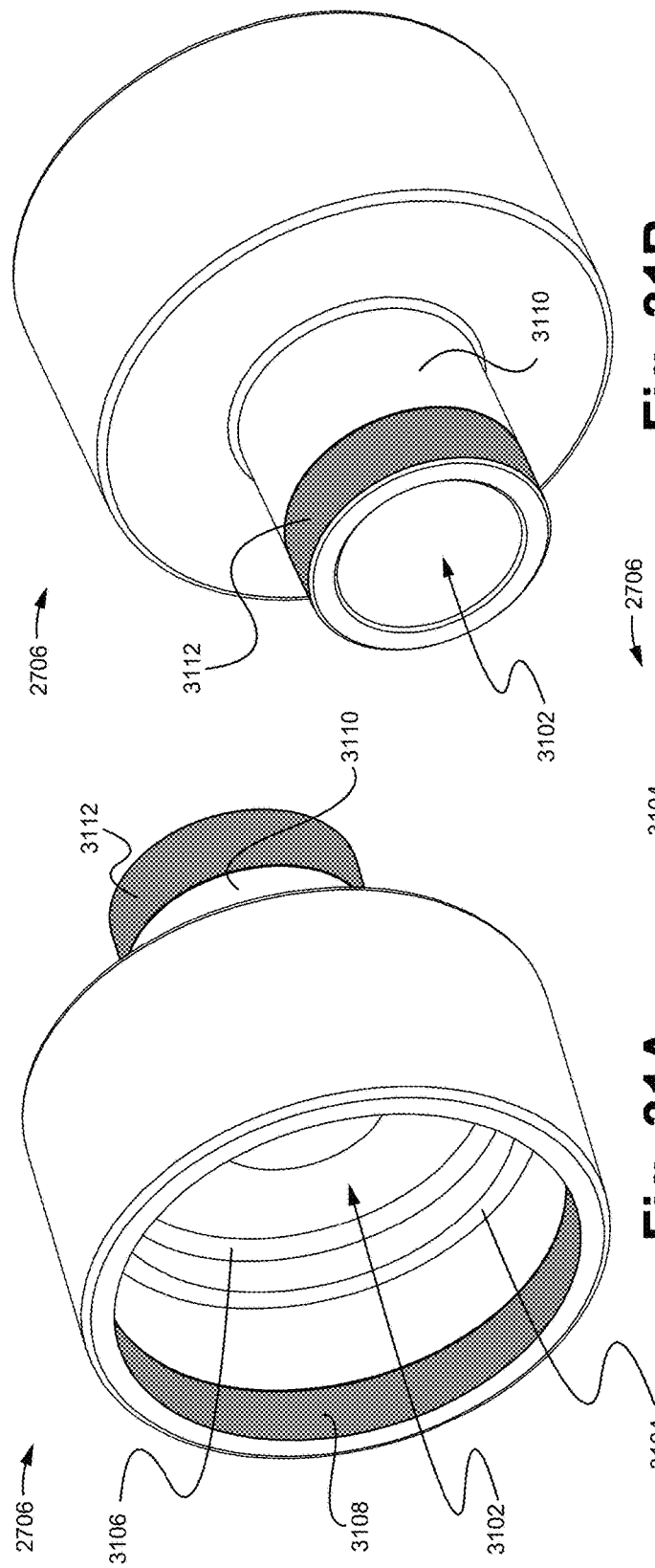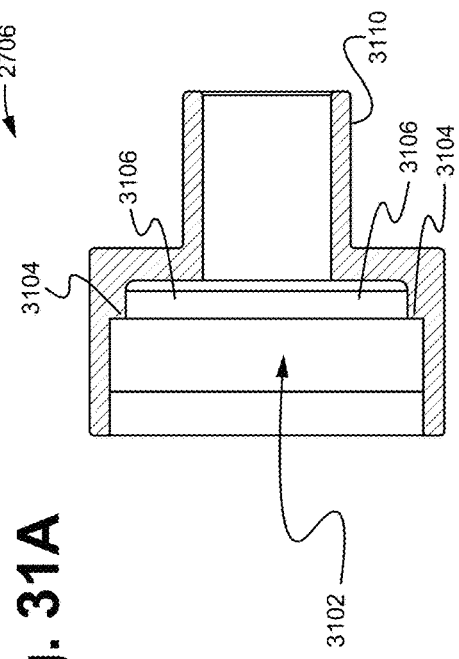

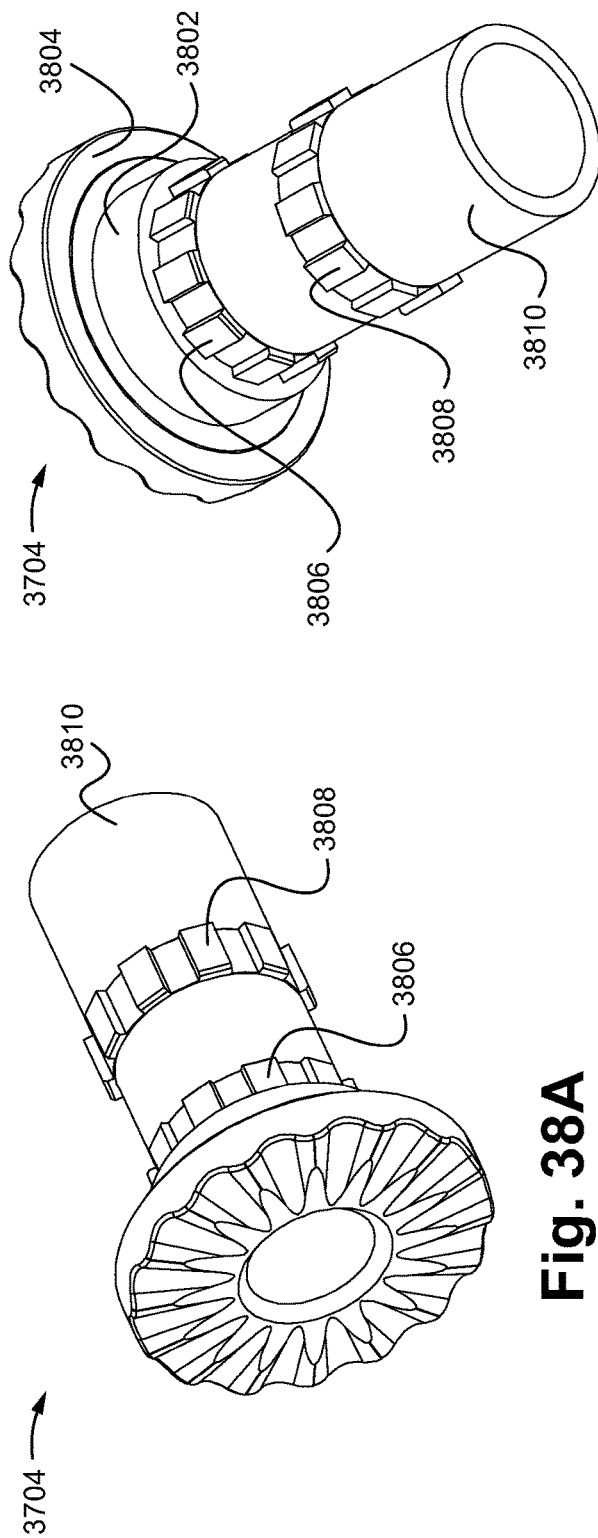
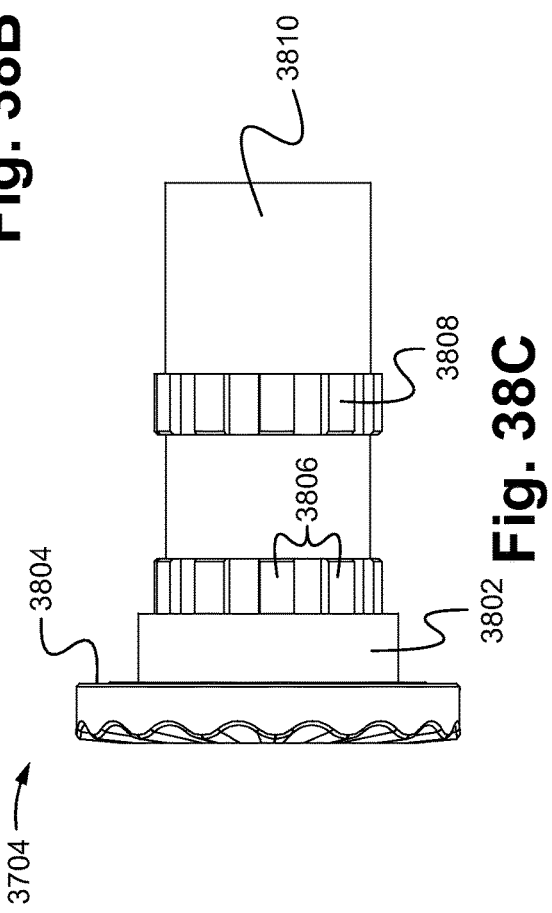
Fig. 38A
Fig. 38B
Fig. 38C

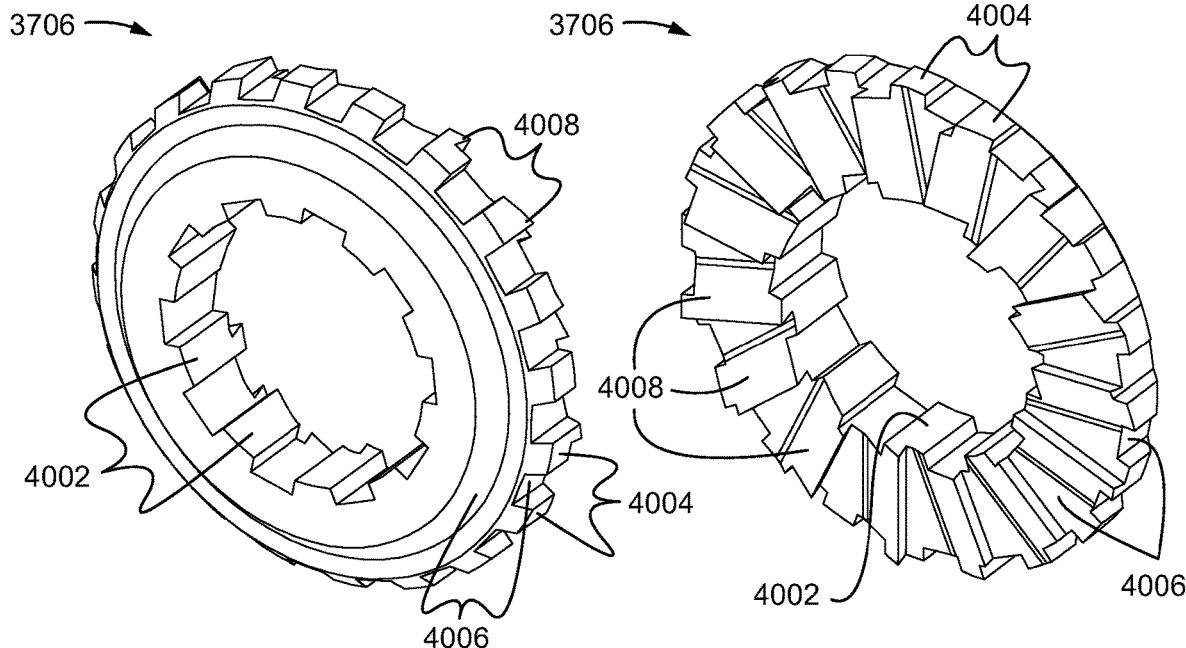
Fig. 40A    Fig. 40B
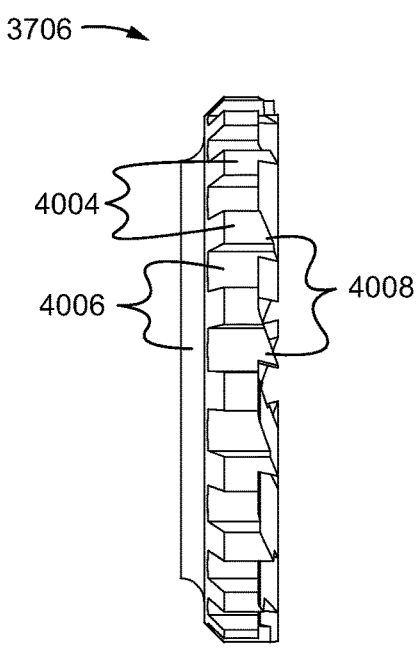
Fig. 40C

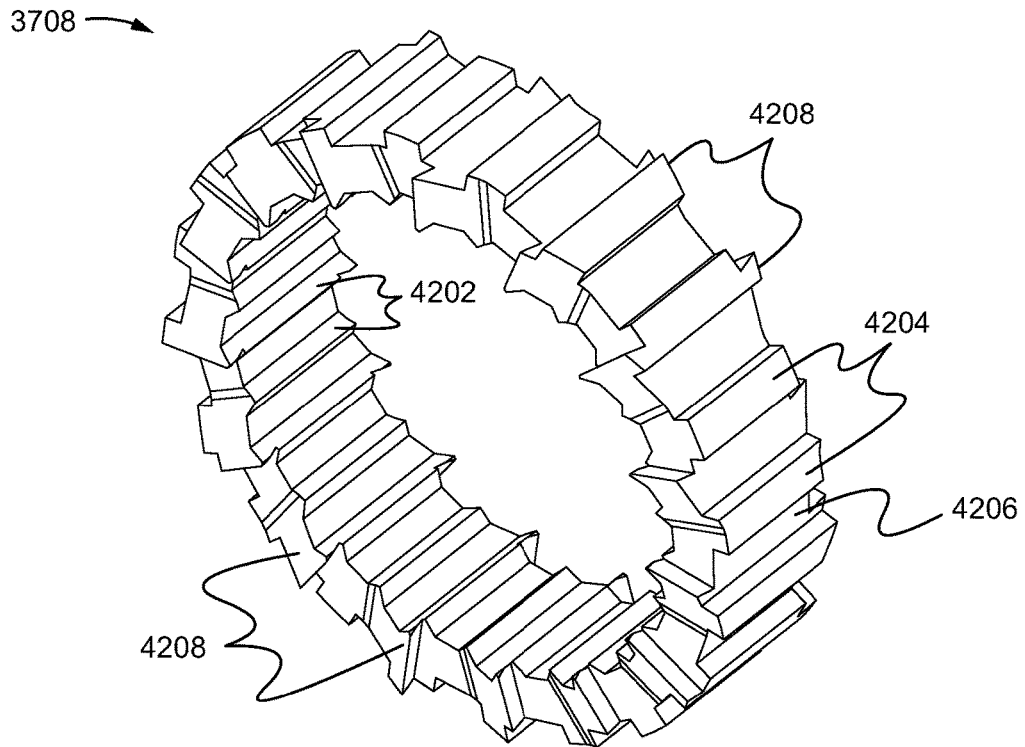
Fig. 42A
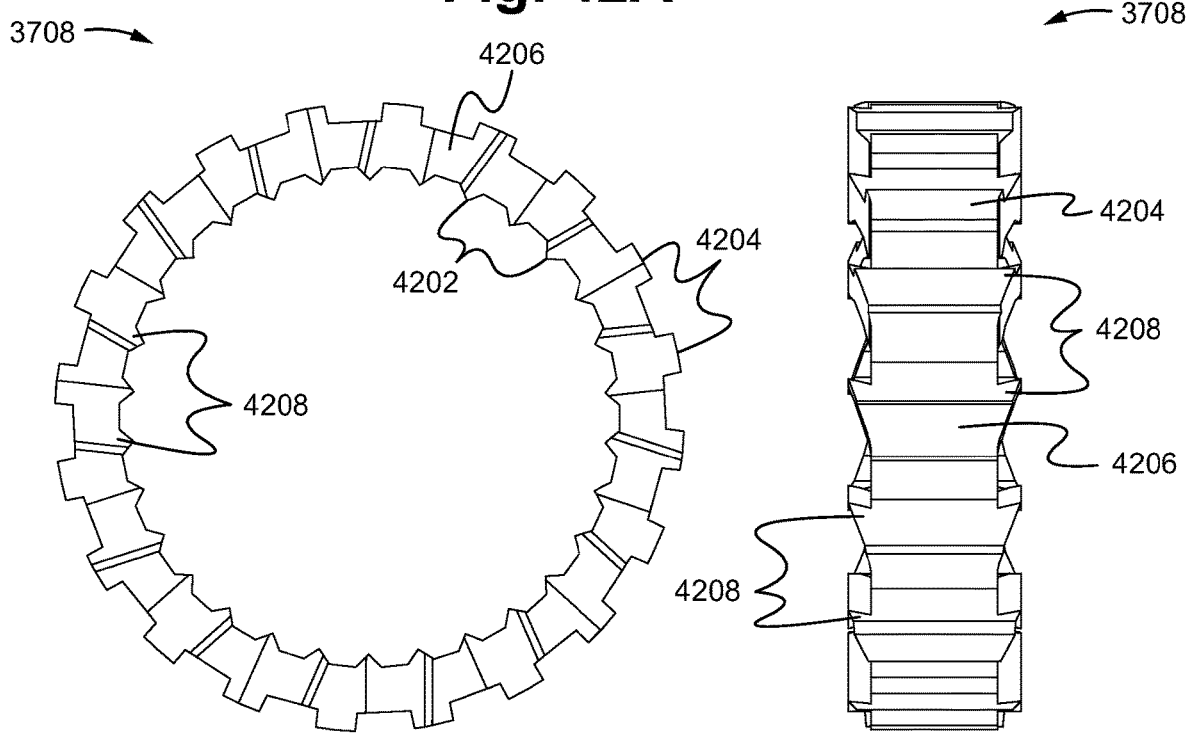
Fig. 42B
Fig. 42C

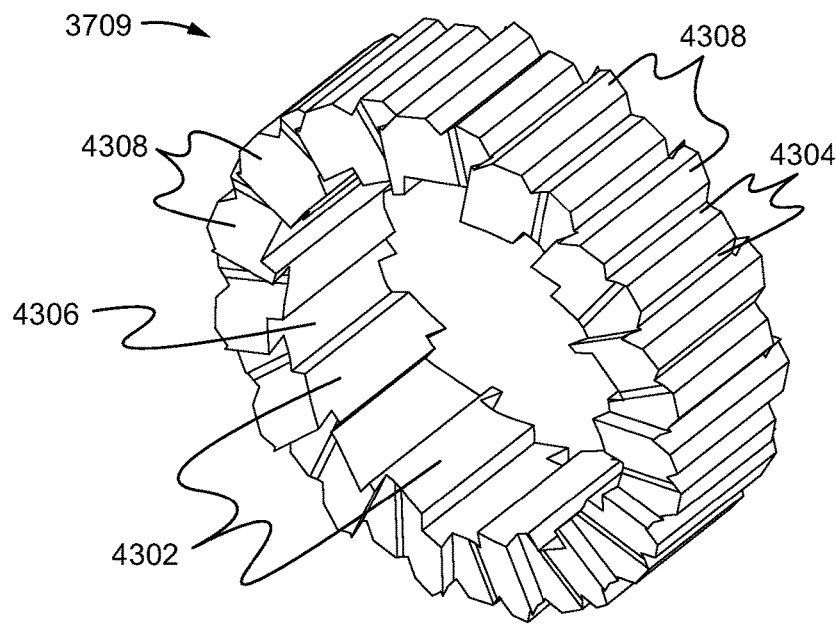
Fig. 43A
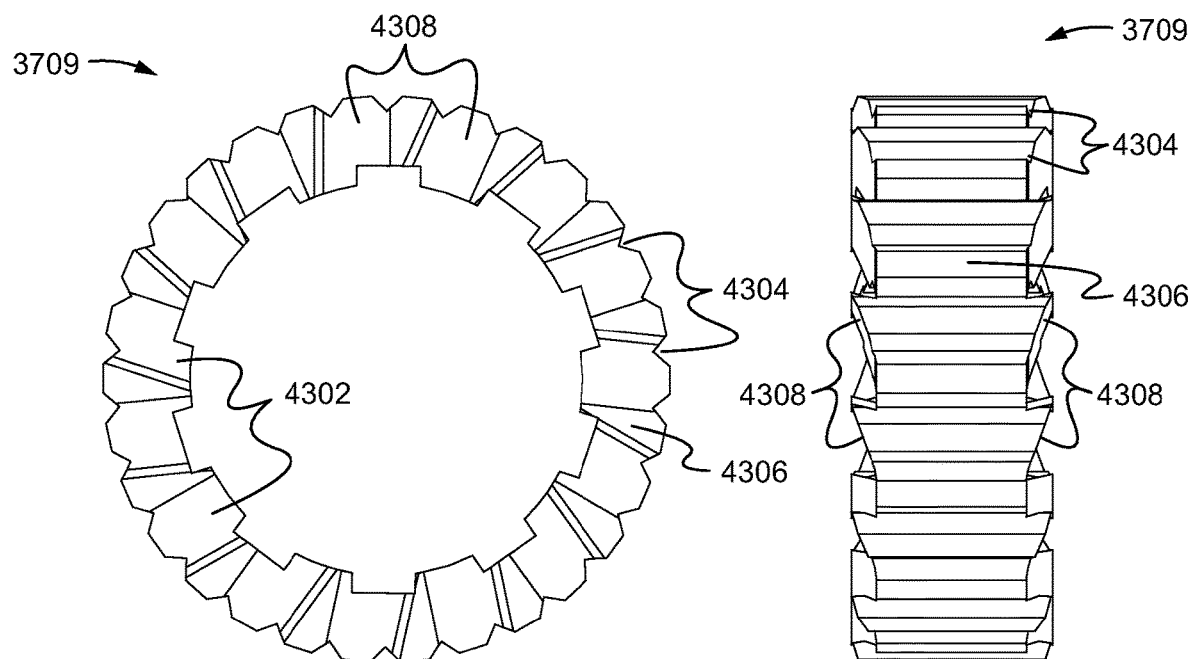
Fig. 43B        Fig. 43C

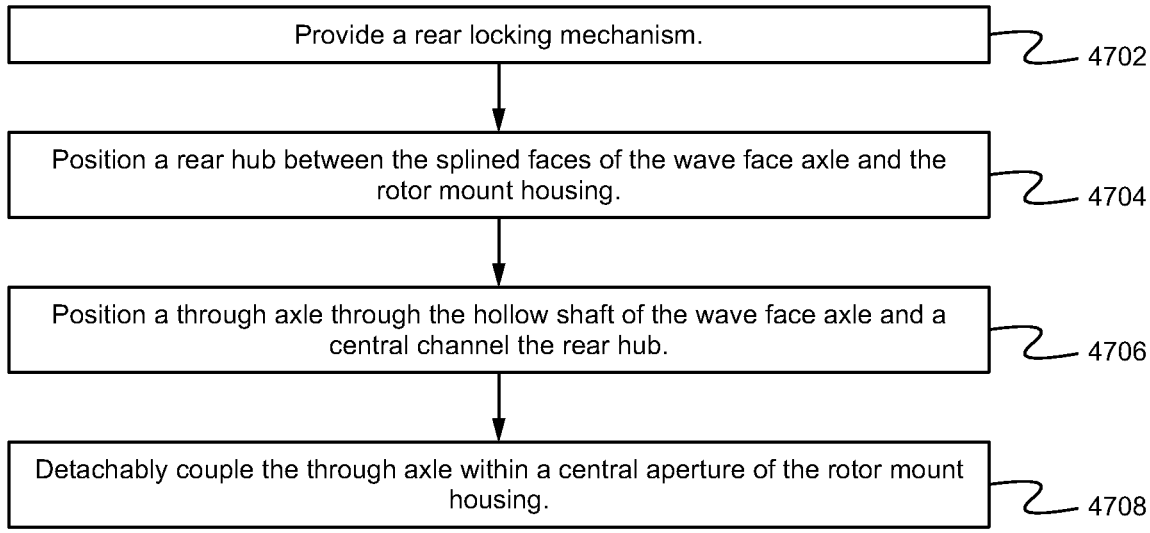
Fig. 46
Fig. 47
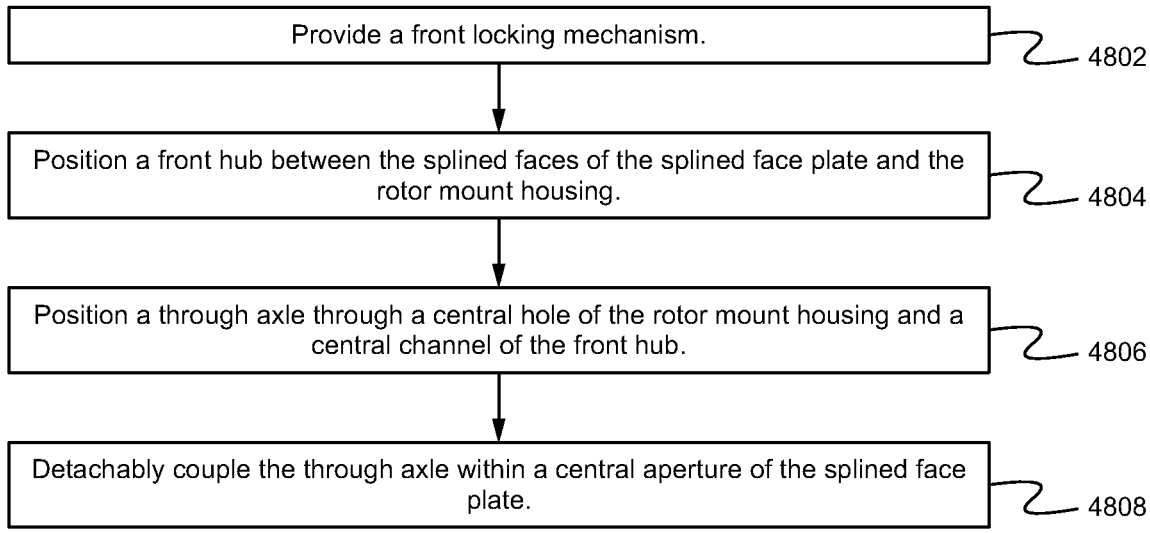
Fig. 48

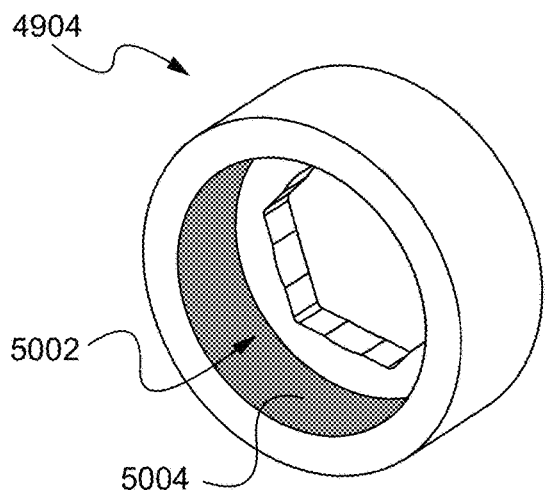 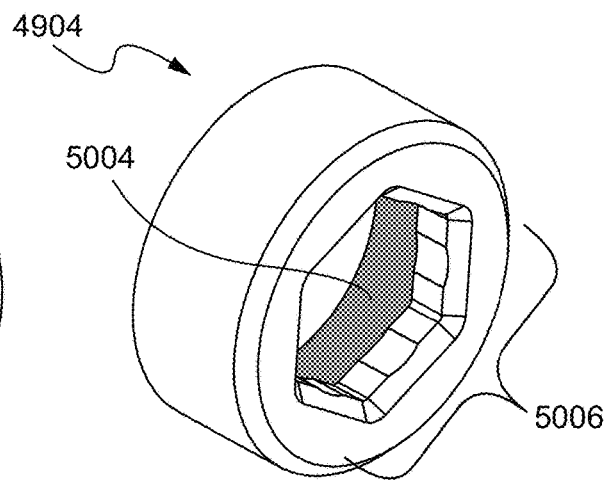
Fig. 50A    Fig. 50B
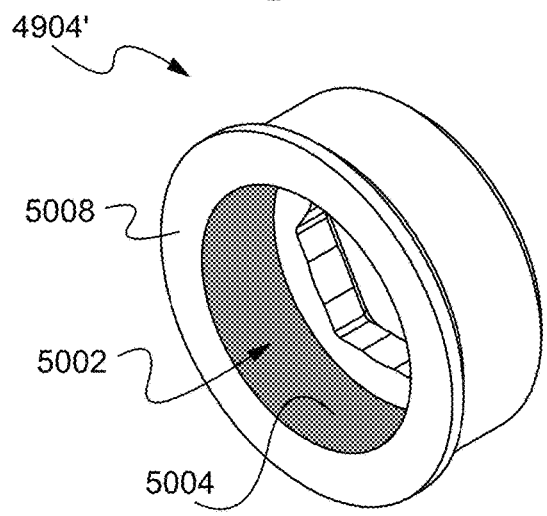 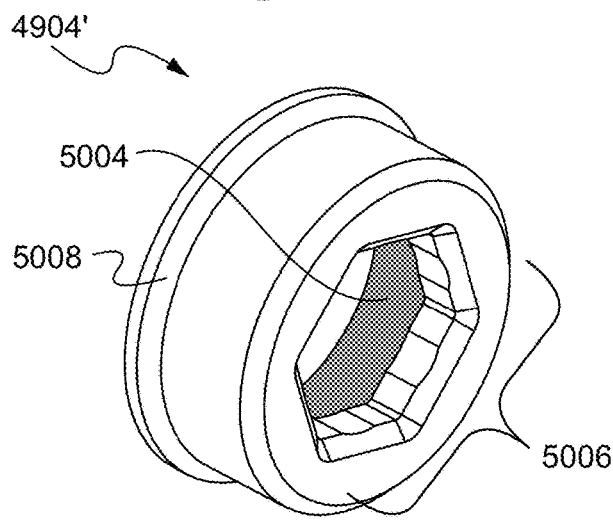
Fig. 50C    Fig. 50D
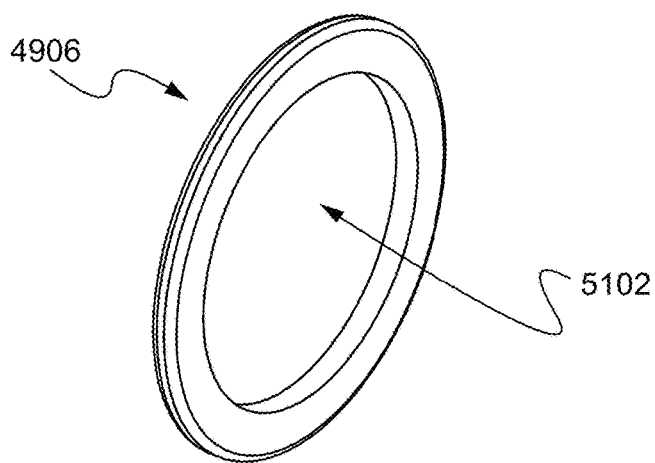
Fig. 51

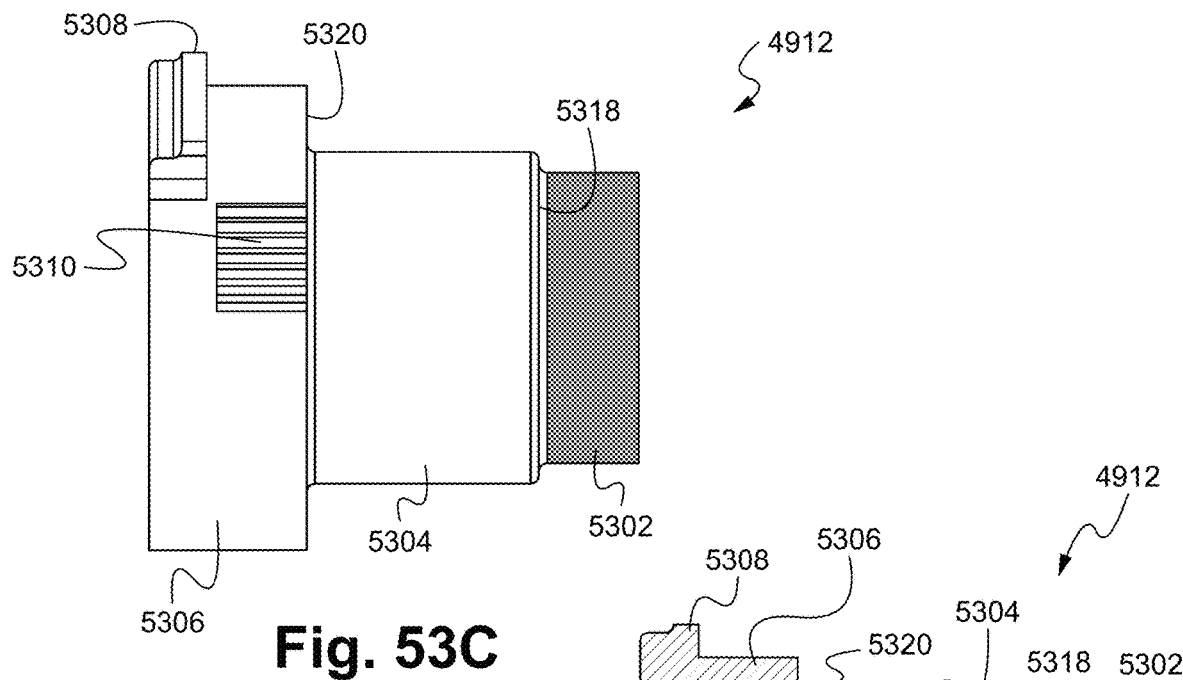
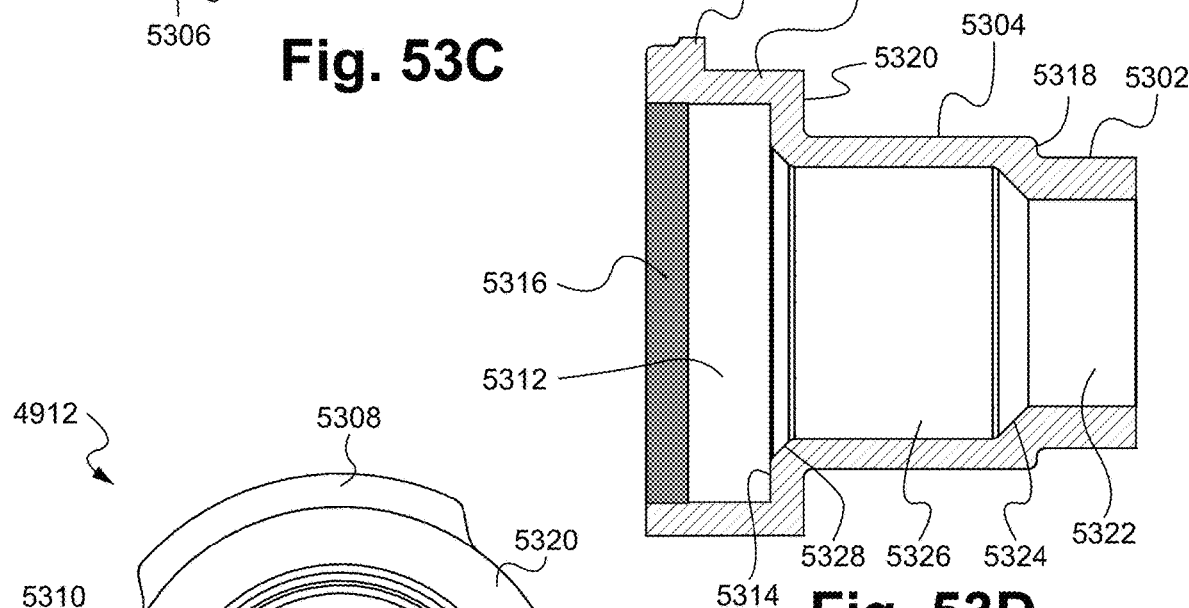
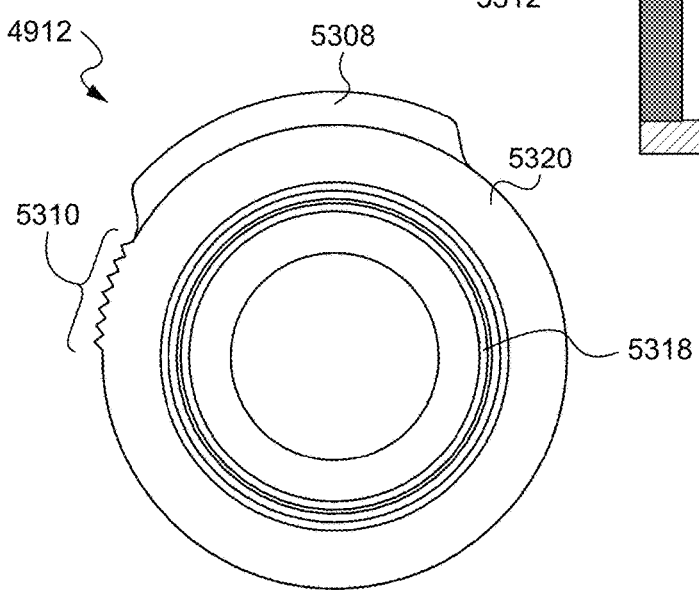
Fig. 53C
Fig. 53D
Fig. 53E

BICYCLE HUB SYSTEM, METHOD AND DEVICE INCLUDING A FRONT HUB LOCKING MECHANISM

FIELD OF THE INVENTION

The present invention is generally directed to wheel hub systems for a bicycle. More specifically, the present invention is directed to a wheel hub system including a hub locking mechanism that enables the wheels/hubs to be coupled/decoupled from the frame separate from the drive and/or brake components.

BACKGROUND OF THE INVENTION

Traditional attachment of a wheel hub to a bicycle frame consists of a hub that has attachment points for the drive and/or brake components, and an axle that attaches the hub to a frame. When the wheel is removed, the drive and/or brake components are thus still attached to the hub. The axle must be removed first, then careful movements must be made by a person to ensure that the drive components are disengaged before the wheel can be completely removed. When the wheel is inserted into a frame again, careful lining up of the brake components and placement of the drive components must be made by a person, to prevent damage and to ensure proper function of the wheel as part of a frame.

Disadvantages of the current system are a long wheel change duration during competitive cycling events where every second counts, due to the need for careful removal of the wheel, careful insertion of the spare wheel and due to a drive that must be geared down before removal and then geared up again after insertion of spare wheel. This gearing down or up is to case the removal and insertion of the wheel, but increases the wheel change time and leads to the discomfort of the cyclist to start pedaling on a gear that was selecting by his wheel change crew. Additionally, front and rear wheels are not interchangeable due to different hub widths and axle sizes, which creates the need to stock both wheels as spares. The incompatibility between different drive and brake component brands prevent sharing of spare wheels from neutral service vehicles/crews/teams, which cannot keep in stock all possible brands of components. Further, precision brake and drive setups are compromised when wheels are changed using the current hub lock system, due to different levels of wear and tear between brake and/or drive components.

Other disadvantages are possible damage to brake components during removal and insertion of wheels from a frame, difficulty in storage of spare wheels due to damage prevention methods and bulk taken up by brake and drive components attached to the wheels, big financial outlays to build up spare wheels each with its own brake and/or drive components attached.

SUMMARY OF THE INVENTION

Embodiments of a bicycle hub system, method and device having a locking mechanism are described herein. The bicycle hub system, method and device comprises rear and front hub assemblies including locking mechanisms having matching coupling faces that correspond to complementary coupling faces of a wheel hub. As a result, the wheel hub is able to be easily coupled/decoupled from either the front locking mechanism or the rear locking mechanism as desired. Indeed, when the wheel is changed, the drive and/or brake components of the hub assemblies stay in the frame, thus removing the need for careful disengaging or lining up movements to be made by a person. The drive also does not need to be geared down or up and thus stays in the gear the cyclist was in. This reduces the wheel change time immensely.

Additionally, the system provides the advantage of reduced financial outlays due to the interchangeability of front and rear wheels and the zero amount of spare drive and brake components needed for each spare wheel, and case of storage due to less bulk and reduced risk of damage to components during storage. Another big advantage of this new hub lock system is that precision brake and drive setups are not compromised when a spare wheel is inserted into a frame. Spare wheels can be shared between different brands of brake and drive components, without compromised performance of these components. Also, the system is able to use standard frame and fork sizes, standard brake and drive components, and/or standard wheel rims and spoke lengths with standard tyre widths. Moreover, because the bearings are housed in housings separate from the hub and/or within the hanger or derailleur coupling housing, larger bearing are able to be used that are able to withstand larger forces and therefore last longer.

A first aspect is directed to a bicycle front hub system. The system comprises a front locking mechanism including a non-rotor-side bearing housing, a non-rotor-side bearing, a splined face plate, a rotor mount bearing and a rotor mount housing, the non-rotor-side bearing positioned around a base of the splined face plate within an inner chamber of the non-rotor-side bearing housing, and the rotor mount housing having a splined housing face, a plurality of rotor apertures for coupling to a brake rotor and a rotor mount housing inner cavity, wherein the rotor mount bearing is positioned within the rotor mount housing inner cavity and the splined housing face faces and is parallel with the splined face plate, a front hub positioned between the splined housing face and the splined face plate and a through axle positioned through a central hole of the rotor mount housing and a central channel of the front hub and detachably coupled within a central aperture of the splined face plate, wherein when the front locking mechanism is coupled to the front hub, the splined face plate rotates with the front hub as the front hub rotates about the through axle. In some embodiments, when positioned through the splined housing face, the through axle has a protruding lip that abuts an inner surface of the rotor mount housing inner cavity. In some embodiments, the system further comprises a face plate lock ring threaded onto a stem extending from the base of the splined face plate, wherein the face plate lock ring blocks the non-rotor-side bearing from sliding of the base of the splined face plate.

In some embodiments, the system further comprises a non-rotor side bearing housing lock ring coupled to the non-rotor bearing housing thereby holding the non-rotor-side bearing, as coupled with the splined face plate and the splined face plate lock ring, within the inner chamber of the non-rotor-side bearing housing. In some embodiments, a splined face of the splined face plate protrudes from a middle aperture of the non-rotor-side bearing housing lock ring toward the splined housing face. In some embodiments, the hub comprises a tube coupled between a pair of flanges, wherein each of the flanges includes an outer flange face having a central flange aperture and hub splines. In some embodiments, the flanges each include a plurality of spoke faces having spoke apertures for coupling with spokes of a wheel. In some embodiments, a portion of the spoke faces are perpendicular to a central axis of the tube and a remainder of the spoke faces are non-perpendicular to the central axis of the tube.

A second aspect is directed to a front locking mechanism for a bicycle. The front locking mechanism comprises a splined face plate having a splined surface including extending from a first side, a base extending from a second side opposite the first side, and a central aperture extending through the splined surface and the base, a non-rotor-side bearing housing having an inner chamber, a non-rotor-side bearing positioned around the base of the splined face plate and within the inner chamber of the non-rotor-side bearing housing, a rotor mount bearing and a rotor mount housing having a splined housing face including a central hole, a plurality of rotor apertures for coupling to a brake rotor and a rotor mount housing inner cavity, wherein the rotor mount bearing is positioned within the rotor mount housing inner cavity and the splined housing face faces and is parallel with the splined surface. In some embodiments, the front locking mechanism further comprises a face plate lock ring threaded onto a stem extending from the base of the splined face plate, wherein the face plate lock ring blocks the non-rotor-side bearing from sliding of the base of the splined face plate. In some embodiments, the front locking mechanism further comprises a non-rotor side bearing housing lock ring coupled to the non-rotor bearing housing thereby holding the non-rotor-side bearing, as coupled with the splined face plate and the splined face plate lock ring, within the inner chamber of the non-rotor-side bearing housing. In some embodiments, a splined surface of the splined face plate protrudes from a middle aperture of the non-rotor-side bearing housing lock ring toward the splined housing face.

A third aspect is directed to a front hub for a bicycle. The front hub comprises a pair of flanges each including an inner flange recess and an outer flange face, the outer flange face having a central flange aperture and a plurality of flange splines that radially undulate about the central flange aperture and a hollow tube having a first end coupled within the inner flange recess of a first of the flanges and a second end coupled within the inner flange recess of a second of the flanges. In some embodiments, the flange splines of each of the flanges are recessed into the outer flange faces. In some embodiments, the flange splines of each of the flanges are non-perpendicular to a central axis of the central flange apertures such that the flange splines taper from an inside end proximate the central flange apertures to an outside end distal from the central flange apertures. In some embodiments, a thickness of the flange splines of each of the flanges decreases in a direction of a center of the central flange apertures from the outside end to the inside end. In some embodiments, the flanges each include a plurality of spoke faces having spoke apertures for coupling with spokes of a wheel. In some embodiments, a portion of the spoke faces are perpendicular to a central axis of the tube and a remainder of the spoke faces are non-perpendicular to the central axis of the tube.

A fourth aspect is directed to a method of operating a bicycle front hub system. The method comprises providing a front locking mechanism including a non-rotor-side bearing housing, a non-rotor-side bearing, a splined face plate, a rotor mount bearing and a rotor mount housing, the non-rotor-side bearing positioned around a base of the splined face plate within an inner chamber of the non-rotor-side bearing housing, and the rotor mount housing having a splined housing face, a plurality of rotor apertures for coupling to a brake rotor and rotor mount housing inner cavity, wherein the rotor mount bearing is positioned within the rotor mount housing inner cavity and the splined housing face faces and is parallel with the splined face plate, positioning a front hub between the splined housing face and the splined face plate and positioning a through axle through a central hole of the rotor mount housing and a central channel of the front hub and detachably coupled within a central aperture of the splined face plate, wherein when the front locking mechanism is coupled to the front hub, the splined face plate rotates with the front hub as the front hub rotates about the through axle. In some embodiments, when positioned through the splined housing face, the through axle has a protruding lip that abuts an inner surface of the rotor mount housing inner cavity.

In some embodiments, the method further comprises threading a face plate lock ring onto a stem extending from the base of the splined face plate, wherein the face plate lock ring blocks the non-rotor-side bearing from sliding of the base of the splined face plate. In some embodiments, the method further comprises threading a non-rotor side bearing housing lock ring onto the non-rotor bearing housing thereby holding the non-rotor-side bearing, as coupled with the splined face plate and the splined face plate lock ring, within the inner chamber of the non-rotor-side bearing housing. In some embodiments, a splined face of the splined face plate protrudes from a middle aperture of the non-rotor-side bearing housing lock ring toward the splined housing face. In some embodiments, the hub comprises a tube coupled between a pair of flanges, wherein each of the flanges includes an outer flange face having a central flange aperture and hub splines. In some embodiments, the flanges each include a plurality of spoke faces having spoke apertures for coupling with spokes of a wheel. In some embodiments, a portion of the spoke faces are perpendicular to a central axis of the tube and a remainder of the spoke faces are non-perpendicular to the central axis of the tube.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 9 illustrates a side view of a through axle according to some embodiments.

FIGS. 14A and 14B illustrate outside and inside perspective views, respectively, of a rotor side bearing axle according to some embodiments.

FIG. 15 illustrates an inside perspective view of a rotor side spacer according to some embodiments.

FIGS. 27A, 27B, 27C and 27D illustrate a perspective view, a front view, a cross-sectional front view and an exploded non-rotor side perspective view, respectively, of a rear hub assembly according to some embodiments.

FIGS. 31A, 31B and 31C illustrate inside perspective, outside perspective and side cross-sectional views, respectively, of a non-rotor side bearing housing according to some embodiments.

FIGS. 38A, 38B and 38C illustrate inside perspective, outside perspective and side views, respectively, of a ratchet wave face axle according to some embodiments.

FIGS. 40A, 40B, 40C, 40D and 40E illustrate inside perspective, outside perspective, side, outside and inside views, respectively, of a first unidirectional gear according to some embodiments.

FIGS. 42A, 42B and 42C illustrate inside perspective, inside and side views, respectively, of an outer ratchet gear according to some embodiments.

FIGS. 43A, 43B and 43C illustrate inside perspective, inside and side views, respectively, of an inner ratchet gear according to some embodiments.

FIG. 46 illustrates a method of operating bicycle system according to some embodiments.

FIG. 47 illustrates a method of operating a rear hub apparatus of a bicycle system according to some embodiments.

FIG. 48 illustrates a method of operating a front hub apparatus of a bicycle system according to some embodiments.

FIGS. 50A and 50B illustrate top inside perspective and top outside perspective views of the final outside lock bolt, respectively, according to some embodiments.

FIGS. 50C and 50D illustrate top inside perspective and top outside perspective views, respectively, of a final outside lock bolt having a blocking flange according to some embodiments.

FIG. 51 illustrates a top inside perspective view of the outside spacer according to some embodiments.

FIGS. 53A, 53B, 53C, 53D and 53E illustrate top inside perspective, top outside perspective, side, side cross-section and top views of the non-rotor side bearing housing, respectively, according to some embodiments.

DETAILED DESCRIPTION OF THE EMBODIMENTS

Figure 1A:
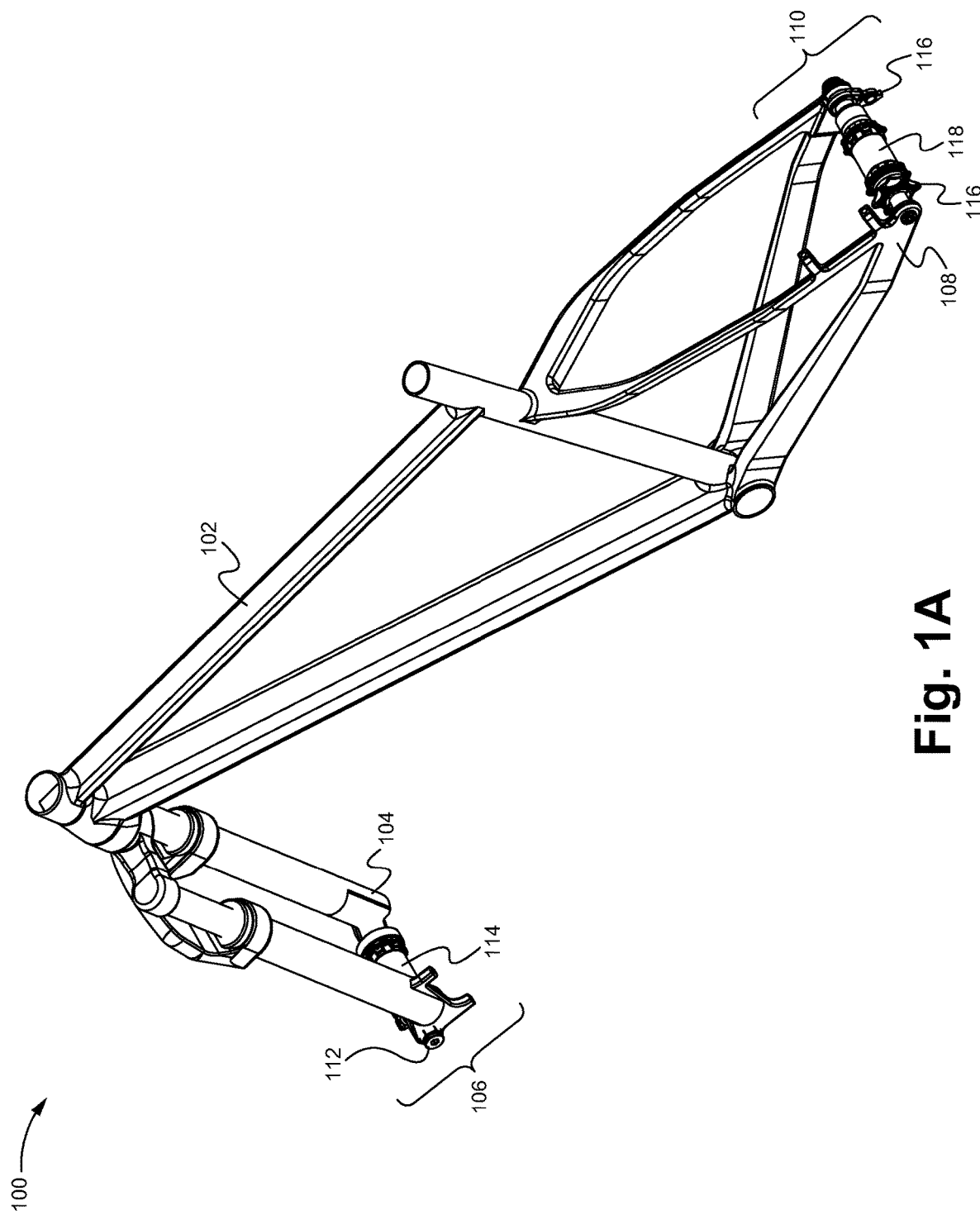
FIGS. 1A and 1B illustrate a perspective view and a perspective exploded view, respectively, of a bicycle hub system according to some embodiments.
Figure 1B:
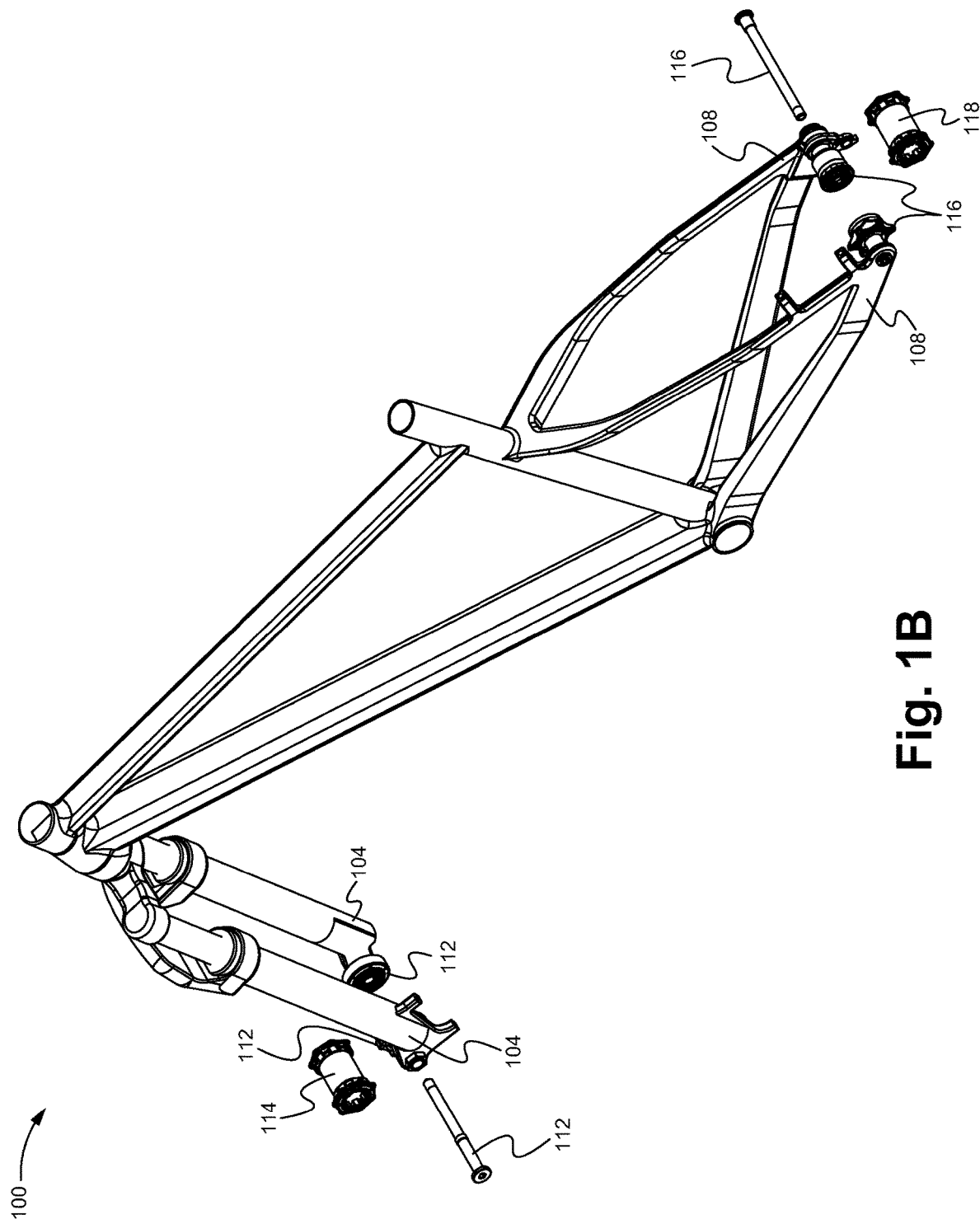
Figure 1C:
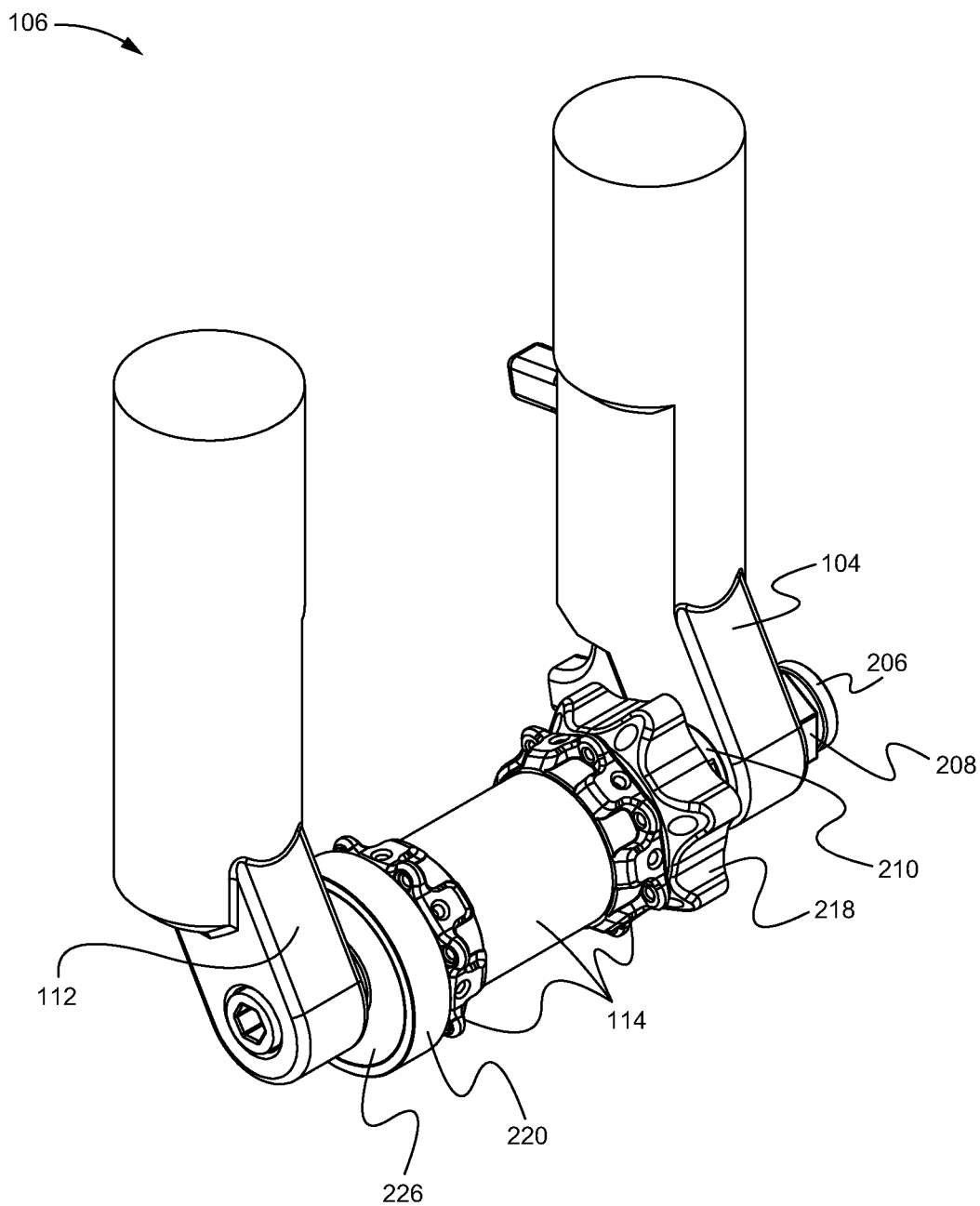
FIGS. 1C and 1D illustrate a perspective view and a perspective exploded view, respectively, of a front hub assembly according to some embodiments.
Figure 1D:
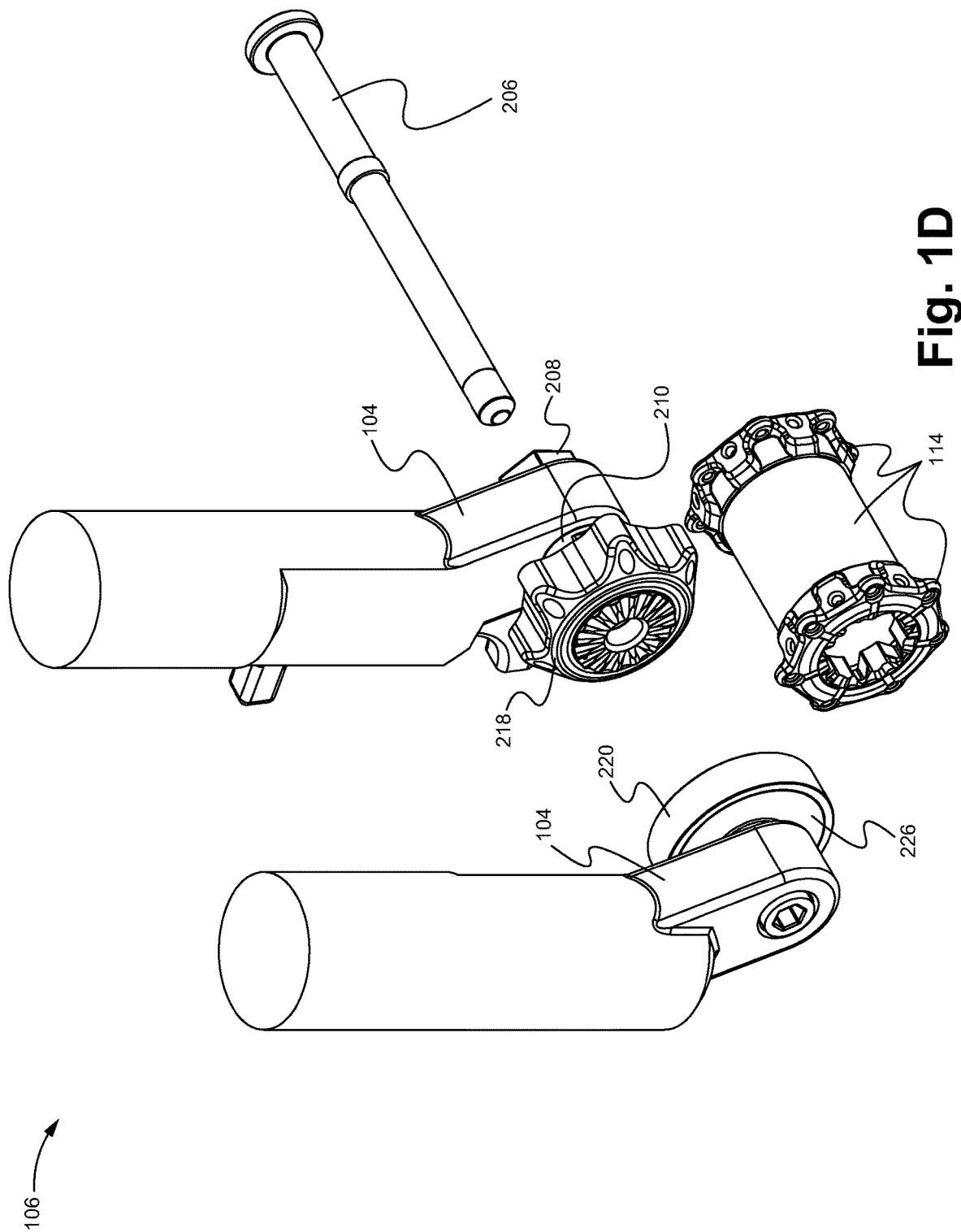
Figure 1E:
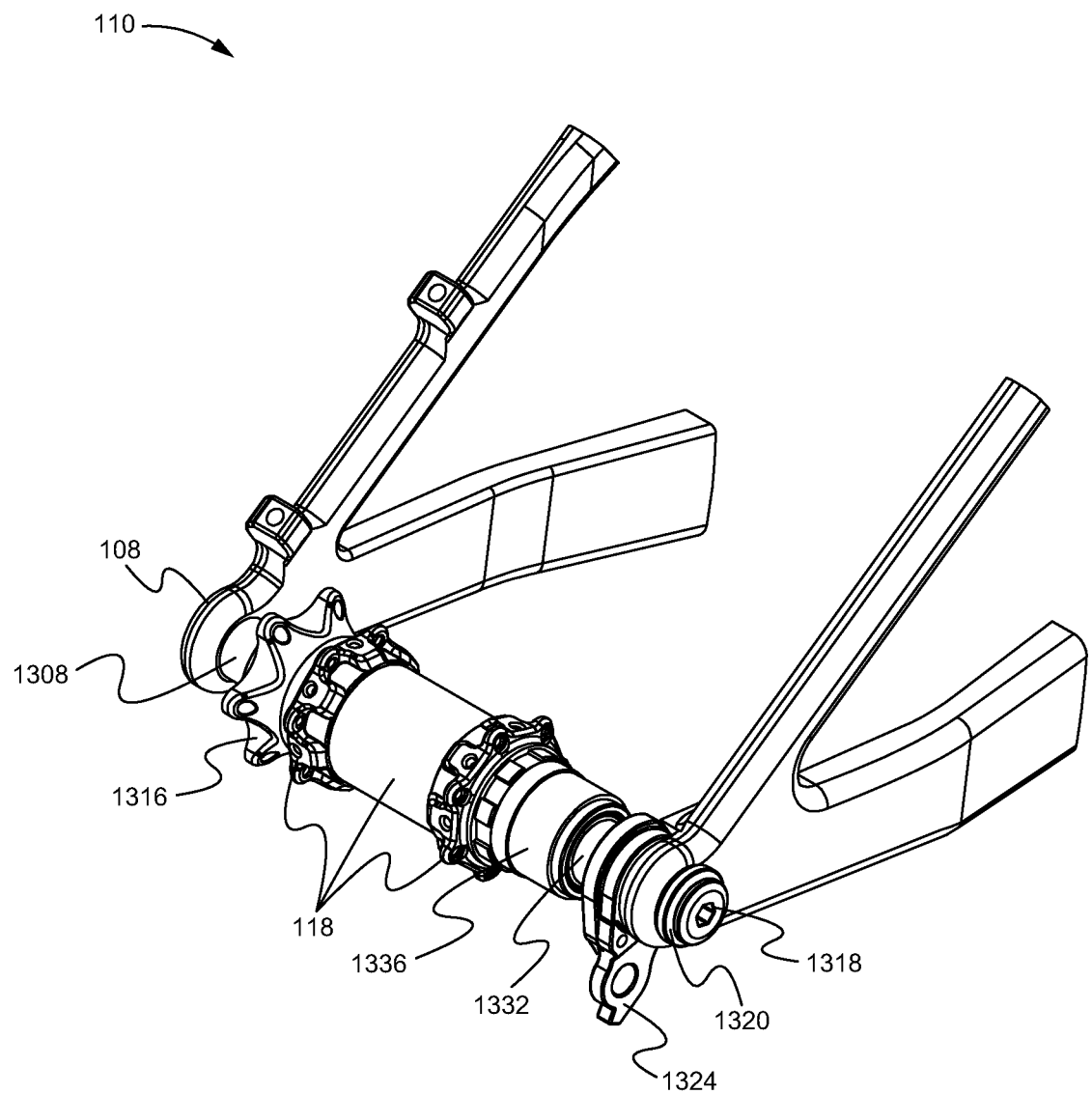
FIGS. 1E and 1F illustrate a perspective view and a perspective exploded view, respectively, of a rear hub assembly according to some embodiments.
Figure 1F:
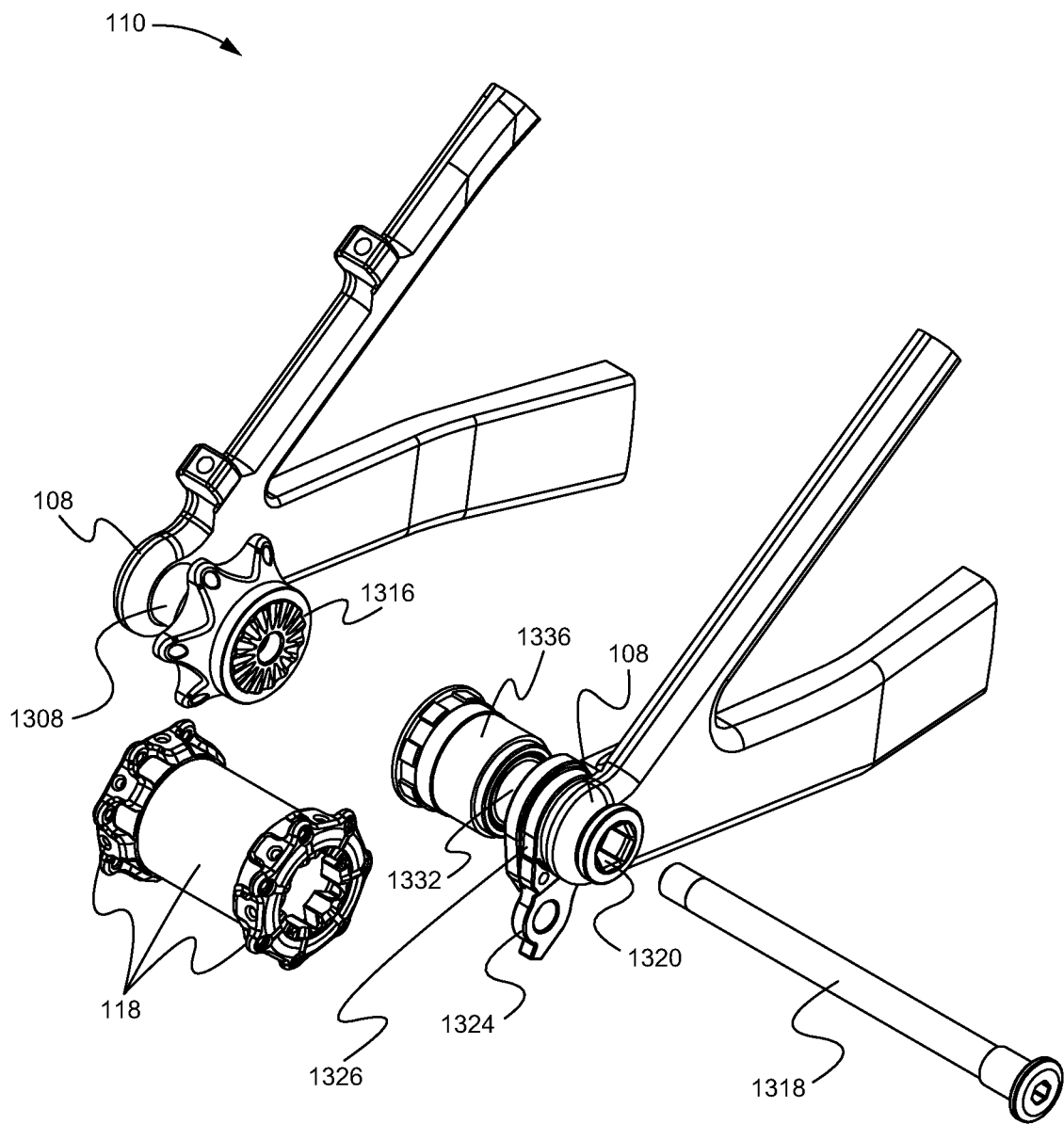

Embodiments of the application are directed to a bicycle hub system, method and device including rear and front hub assemblies, wherein both the rear and front hub assemblies include locking mechanisms with matching undulating splined coupling faces that correspond to complementary undulating splined coupling faces of a wheel hub. As a result, the wheel hub is able to be easily coupled/decoupled from either the front locking mechanism or the rear locking mechanism as desired. Indeed, when the wheel is changed, the drive and/or brake components of the hub assemblies stay in the frame, thus removing the need for careful disengaging or lining up movements to be made by a person. The drive also does not need to be geared down or up and thus stays in the gear the cyclist was in. This reduces the wheel change time immensely.

Reference will now be made in detail to implementations of a bicycle hub system, method and device including a hub locking mechanism, such as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure. Additionally, for the sake of clarity within the Figures, threaded portions of the components shown in the Figures are indicated by grey portions.

FIGS. 1A-1F illustrate a bicycle hub system 100 according to some embodiments. As shown in FIGS. 1A-1F, the bicycle hub system 100 comprises a bicycle frame (or frameset) 102 having front fork ends 104 coupled to a front hub assembly 106 and rear fork ends (or drop out) 108 coupled to a rear hub assembly 110. The front hub assembly 106 is able to comprise a front hub locking mechanism 112 detachably coupled to a front wheel/hub 114 and the rear hub assembly 110 is able to comprise a rear hub locking mechanism 116 detachably coupled to a rear wheel/hub 118. The bicycle hub system 100 is able to comprise one or more additional components of the bicycle that are well known in the art (e.g. seat, drive mechanism, brake mechanism, handle bars) and not described in detail herein for the sake of brevity.

Front Hub Assembly

Figure 2A:
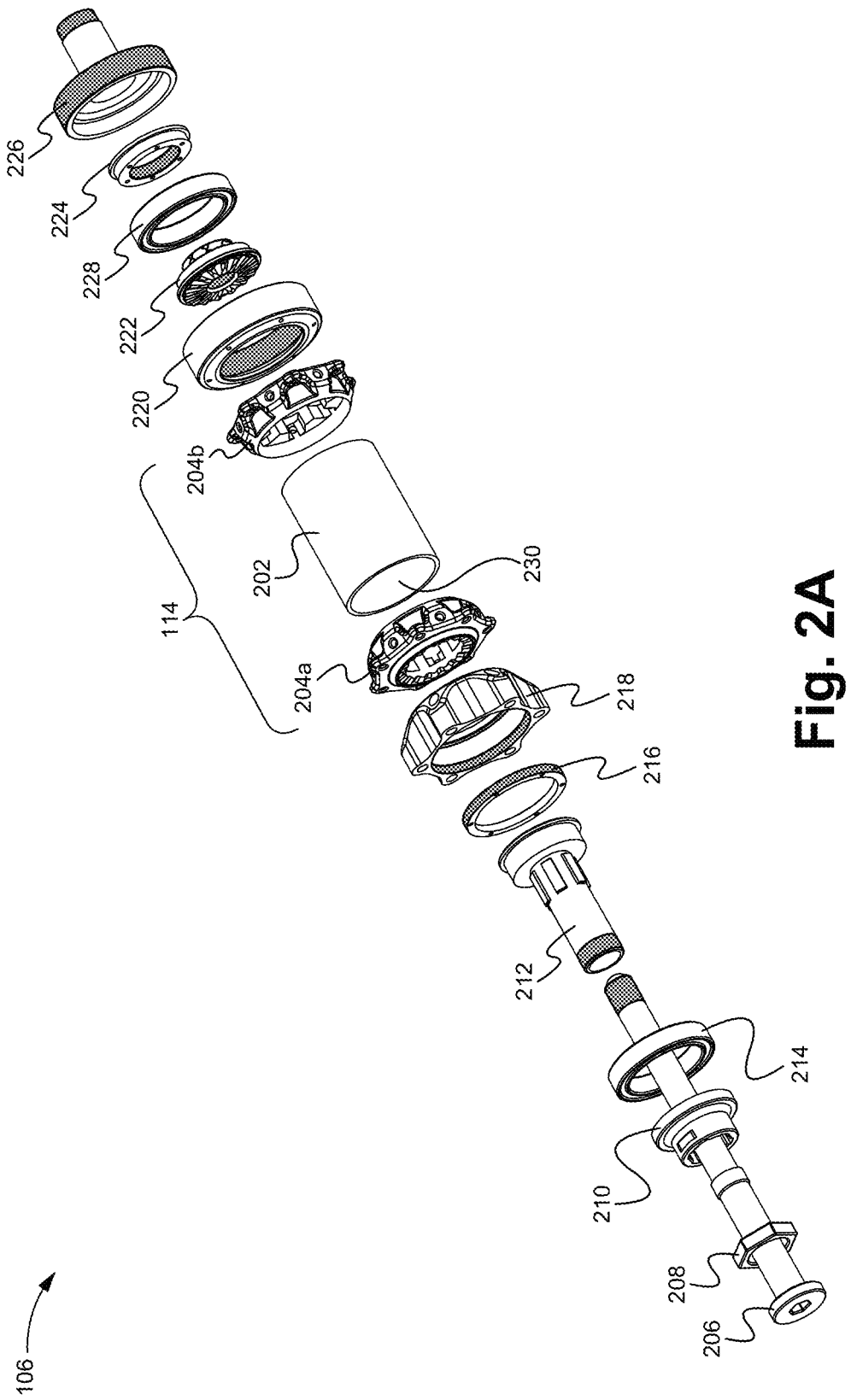
FIGS. 2A, 2B and 2C illustrate an exploded perspective view, a front view and a cross-sectional front view, respectively, of a front hub assembly according to some embodiments.
Figure 2B:
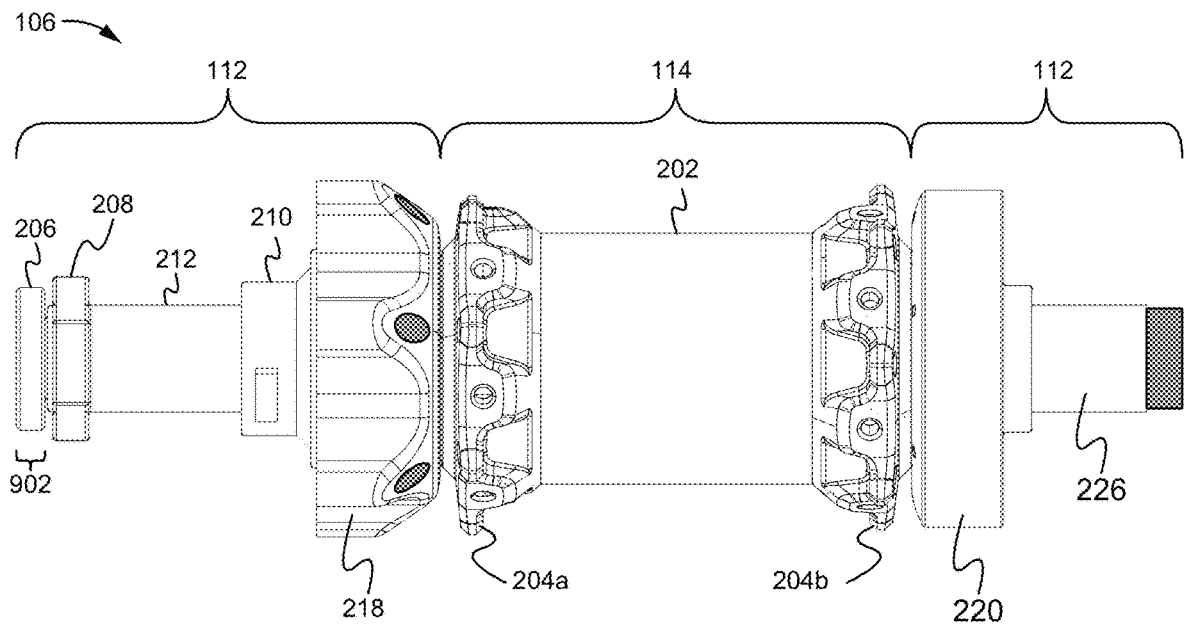
Figure 2C:
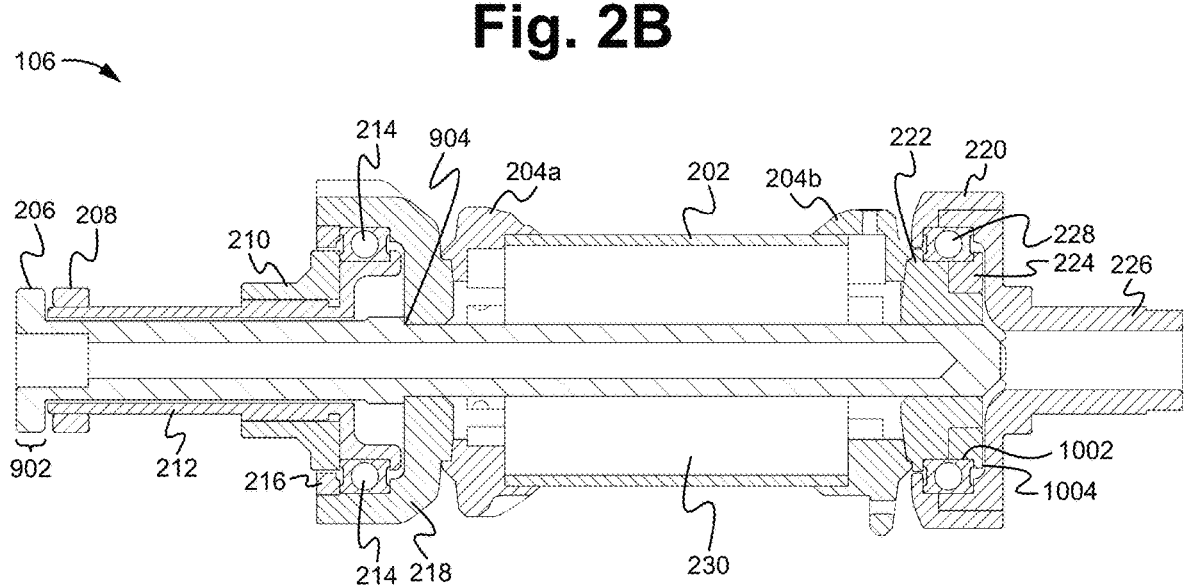

FIGS. 2A, 2B and 2C illustrate an exploded perspective view, a front view and a cross-sectional front view, respectively, of a front hub assembly 106 according to some embodiments. As illustrated in FIGS. 2A-2C, the spokes and tire of the front wheel/hub 114 are not shown for the sake of clarity. As shown in FIGS. 2A-2C, the front hub assembly 106 comprises the front hub 114 including a hollow tube 202 coupled between a pair of flanges 204a, 204b (rotor side flange 204a and non-rotor side flange 204b) and a front hub locking mechanism 112 straddling the front hub 114. The front hub locking mechanism 112 is able to comprise a through axle 206, a lock ring nut 208, a splined spacer 210, a rotor side fork axle 212, a rotor side bearing 214, a rotor side lock ring 216, a front hub bearing housing/rotor mount 218, a non-rotor side bearing housing lock ring 220, a non-rotor side splined face plate 222, a non-rotor side face plate lock ring 224, a non-rotor side bearing housing 226 and a non-rotor side bearing 228. Alternatively, one or more of the above components are able to be omitted.

Figure 5A:
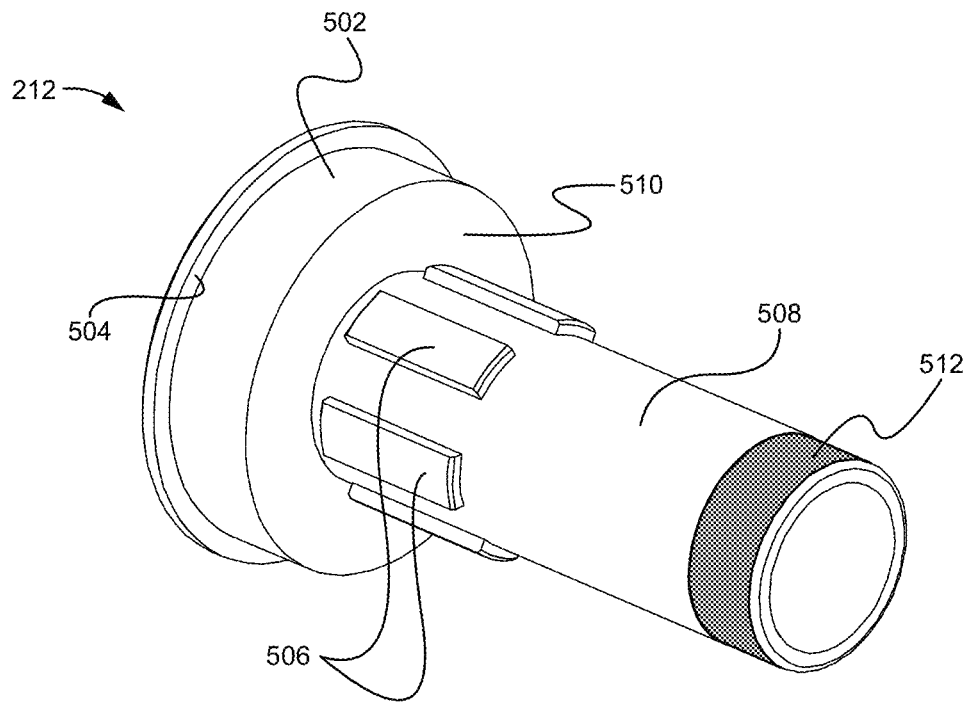
FIGS. 5A and 5B illustrate outside and inside perspective views, respectively, of a rotor side fork axle according to some embodiments.
Figure 5B:
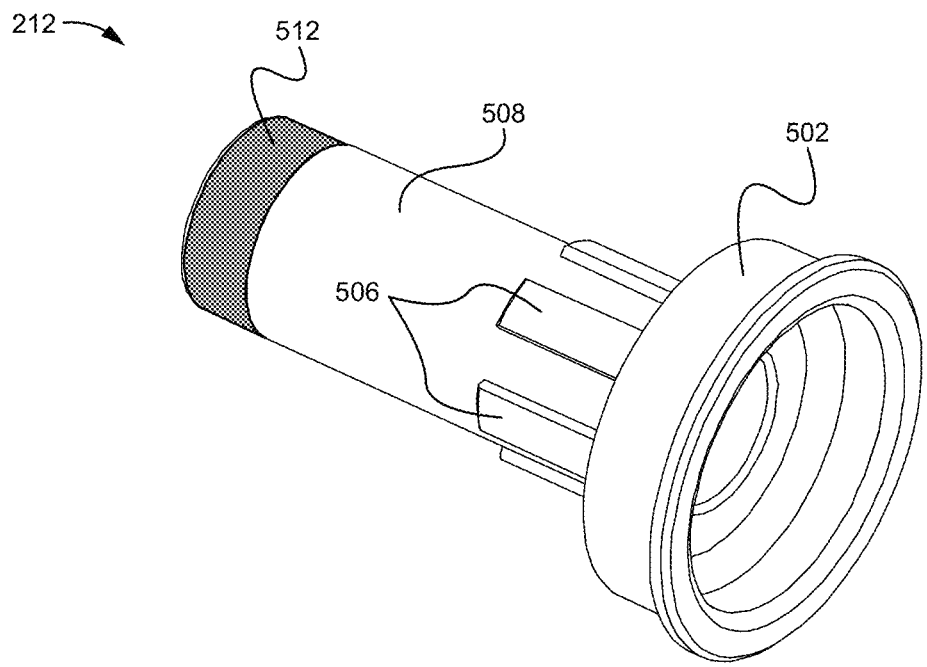
Figure 6A:
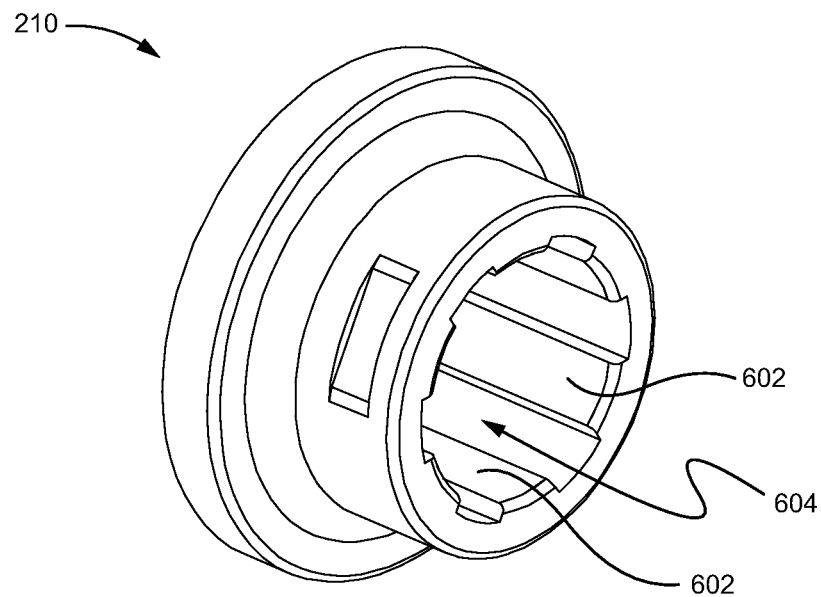
FIGS. 6A and 6B illustrate outside and inside perspective views, respectively, of a splined spacer according to some embodiments.
Figure 6B:
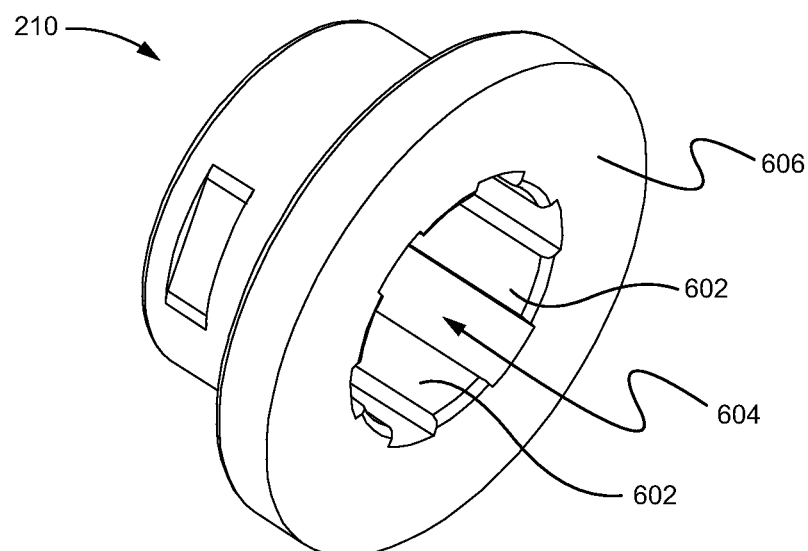
Figure 7A:
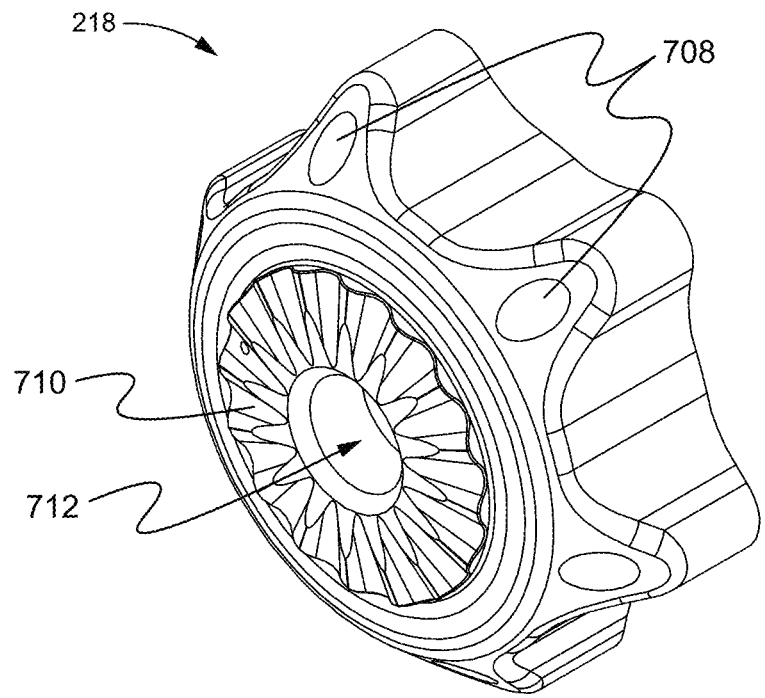
FIGS. 7A and 7B illustrate inside and outside perspective views, respectively, of a front hub bearing housing/rotor mount according to some embodiments.
Figure 7B:
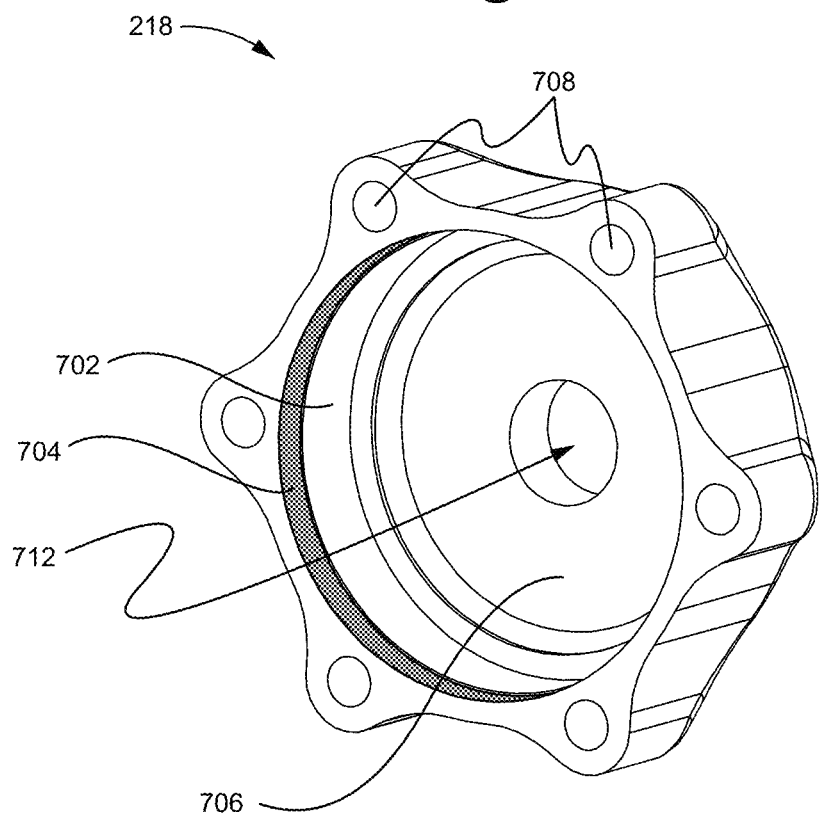
Figure 8A:
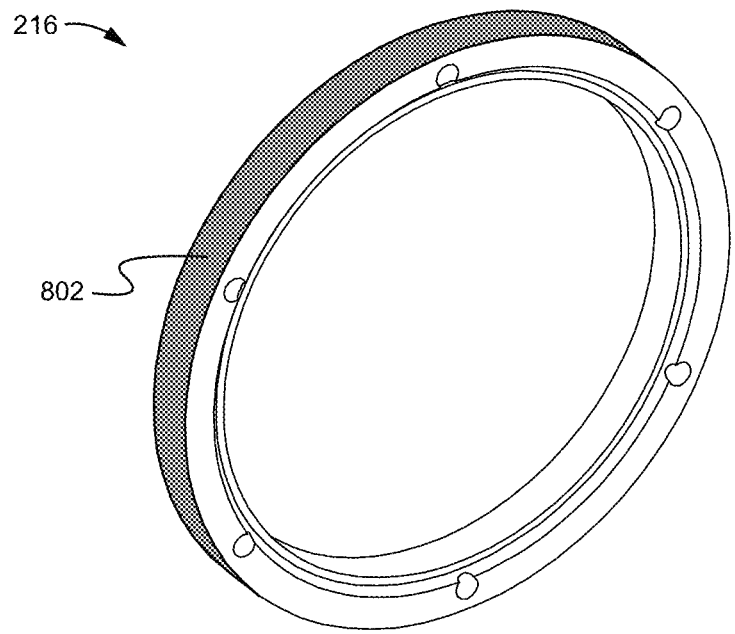
FIGS. 8A and 8B illustrate inside and outside perspective views, respectively, of a rotor side lock ring according to some embodiments.
Figure 8B:
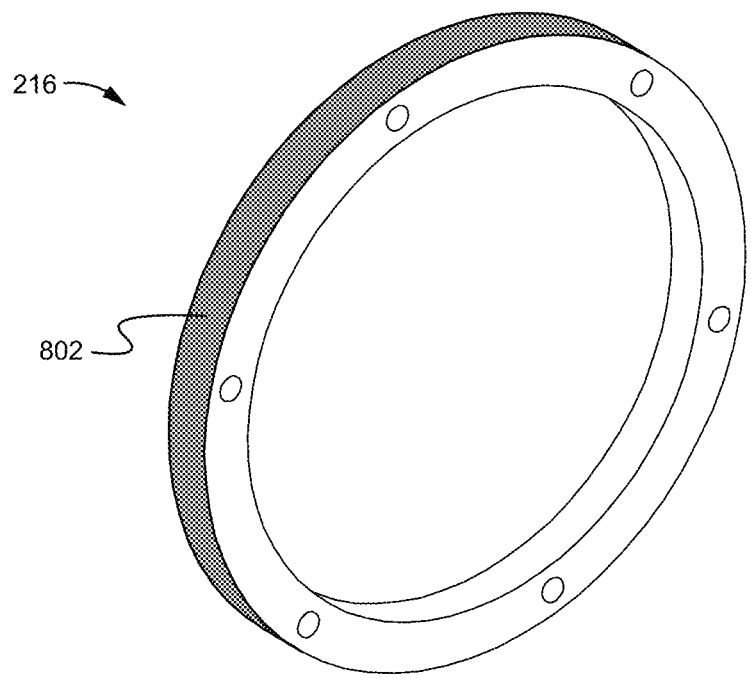

On the rotor side, the rotor side bearing 214 is positioned around a base 502 and abutting a terminal wall 504 of the rotor side fork axle 212 as shown in FIGS. 5A and 5B. As shown in FIGS. 6A and 6B, the splined spacer 210 has internal splines 602 within a central aperture 604 that correspond to splines 506 of a shaft 508 of the rotor side fork axle 212 such that the central aperture 604 is able to slide onto the splines 506 of the shaft 508 of with a bottom 606 of the spacer 210 abutting a top face 510 of the rotor side fork axle 212. Together, the rotor side bearing 214, the splined spacer 210 and the base 502 of the rotor side fork axle 212 are positioned within the cavity 702 (See FIGS. 7A and 7B) of the bearing housing/rotor mount 218, with the rotor side lock ring 216 having an outer threaded portion 802 (see FIGS. 8A and 8B) that threads into internal threads 704 of the bearing housing/rotor mount 218 on top of the rotor side bearing 214 thereby holding all of the components within the cavity 702.

The bearing housing/rotor mount 218 is able to further comprise one or more rotor apertures 708 for coupling with a brake rotor (not shown). Additionally, the bearing housing/rotor mount 218 comprises a protruding splined face 710 radially surrounding a central channel 712. Each spline of splined face 710 is able to be rounded and radially slant outwardly away from a center of the channel 712 such that a height of the spline closest to the channel 712 is greater than a height of the spline farthest from the channel 712. The angle, size and/or shape of the splined face 710 is able to correspond to (and/or be congruent with) the recessed splined surface 402a of the rotor side flange 204a. In particular, the recessed splined surface 402a of the rotor side flange 204a is able to also be rounded, but instead radially slant inwardly toward a central opening 404a such that when pressed against each other, the splines of the splined face 710 fit within the gaps between the splines of the recessed splined surface 402a and vice versa. Indeed, due to their radial formation, rounded edges and corresponding inward/outward angles, even when misaligned, compression of the faces 710, 402a against each other causes the faces 710, 402a (and thus the hub 114 and locking mechanism 112) to slide along the rounded edges and/or angles into proper alignment. Thus, the protruding splined face 710 and/or the recessed splined surface 402a provide the benefit of enabling easy alignment of the two faces 710, 402a when changing a tire/hub.

The front fork end 104 is able to coupled to the rotor side fork axle 212 (see FIGS. 1C and 1D) and the lock ring nut 208 is able to thread onto the upper threads 512 of the shaft 508 of the rotor side fork axle 212 to prevent the front fork end 104 from sliding off the rotor side fork axle 212. The through axle 206 (see FIG. 9) is able to extend through central shafts of the rotor side fork axle 212 and the bearing housing/rotor mount 218 until a head 902 of the through axle 206 contacts the top of the rotor side fork axle 212 and/or a lip 904 of the axle 206 contacts an inner wall 706 of the bearing housing/rotor mount 218. As a result, the through axle 206 is able to provide a compressing force against rotor side fork axle 212 and/or the bearing housing/rotor mount 218 compressing the bearing housing/rotor mount 218 against the rotor side flange 204a of the hub 114 (when threaded into the splined face plate 222). In some embodiments, the lip 904 is created by a discrete reduction in radius of the axle 206 about its central axis such that an upper portion before the lip 904 has a larger radius than a lower portion of the axle 206 after the lip 904. Alternatively, the axle 206 is able to have the same or substantially similar radius immediately before and after the lip 904, with the lip 904 constituting a portion having a discrete increase in radius than the portions immediately before and after the lip 904.

Figure 3A:
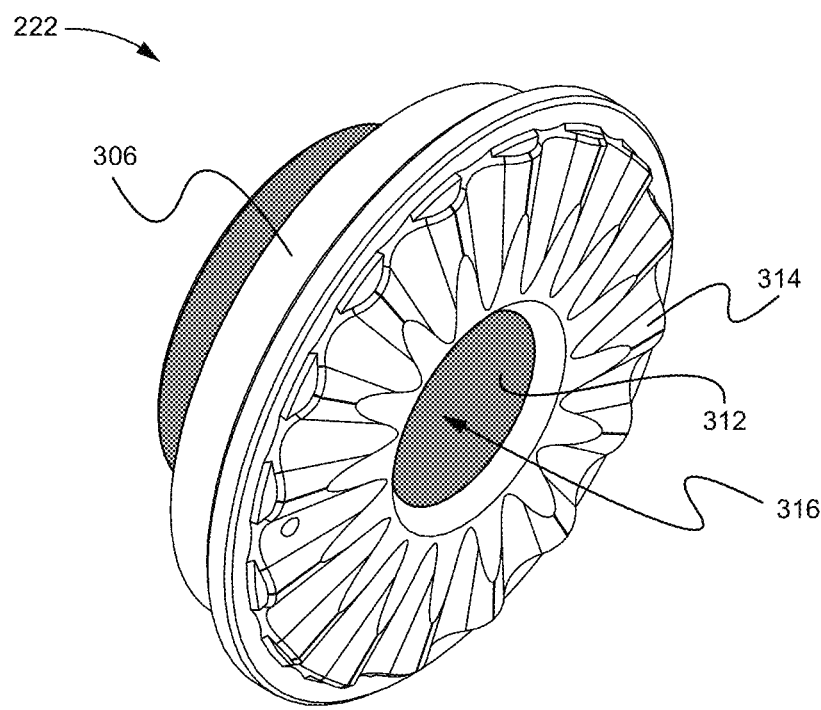
FIGS. 3A and 3B illustrate inside and outside perspective views, respectively, of a non-rotor side splined face plate according to some embodiments.
Figure 3B:
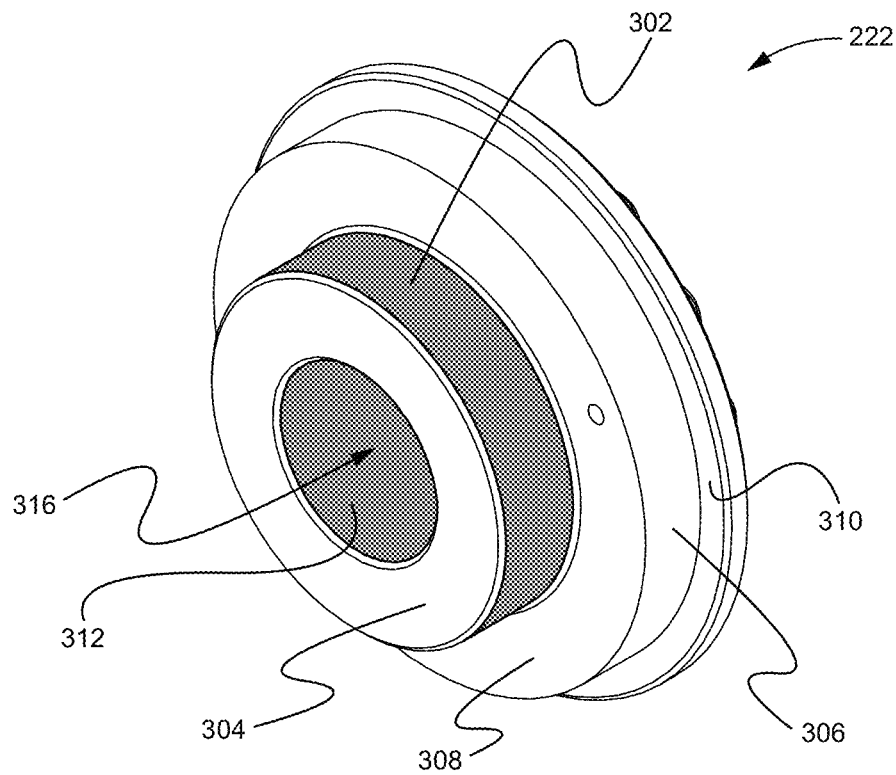
Figures 4A, 4B:
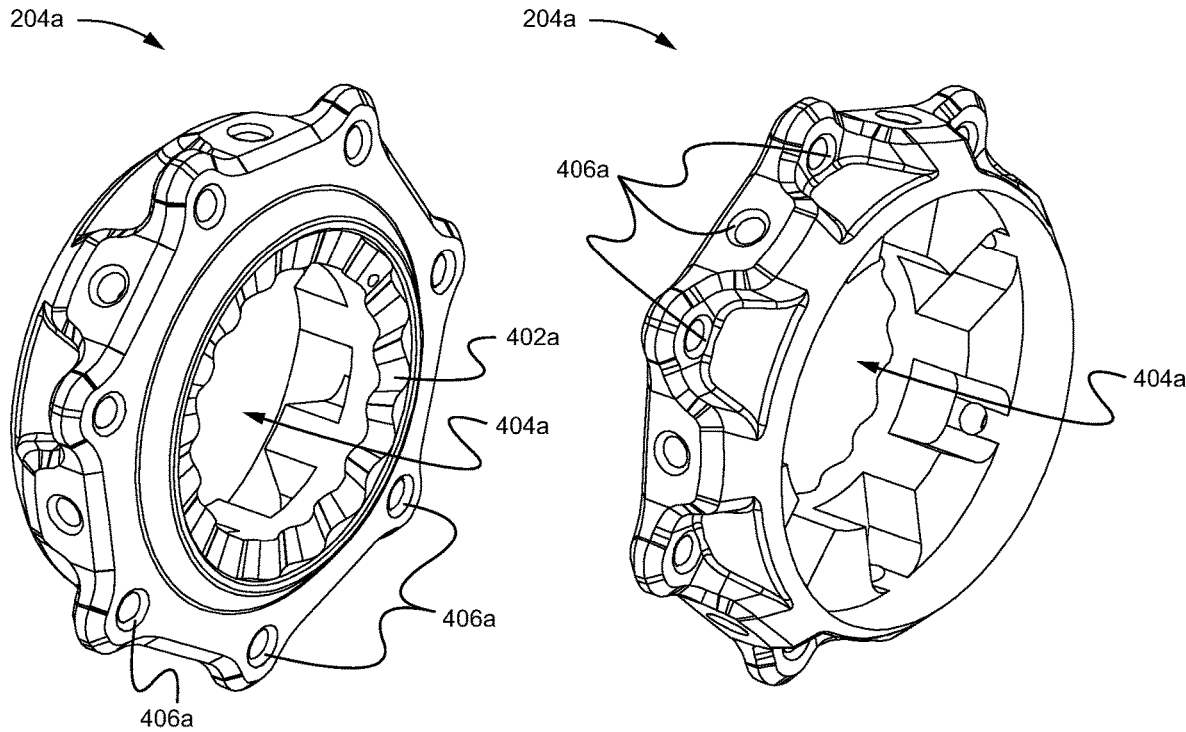
FIGS. 4A and 4B illustrate outside perspective and inside perspective views, respectively, of a rotor side flange according to some embodiments.
Figures 4C, 4D:
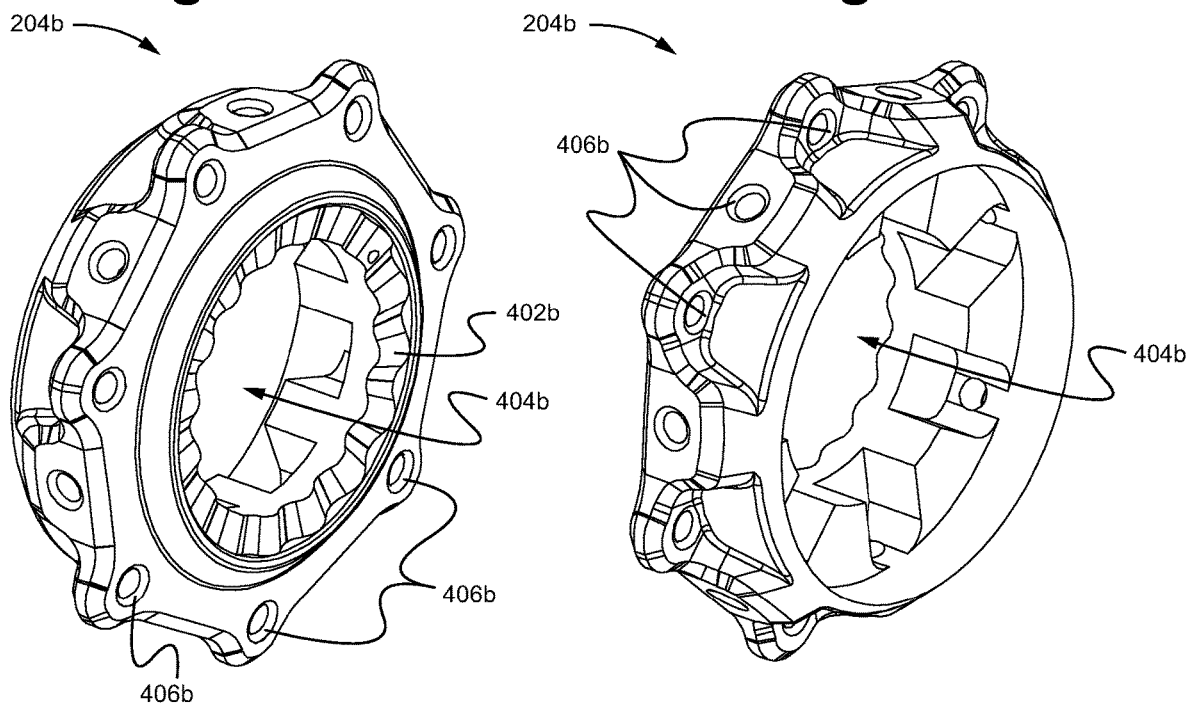
FIGS. 4C and 4D illustrate outside perspective and inside perspective views, respectively, of a non-rotor side flange according to some embodiments.
Figure 10A:
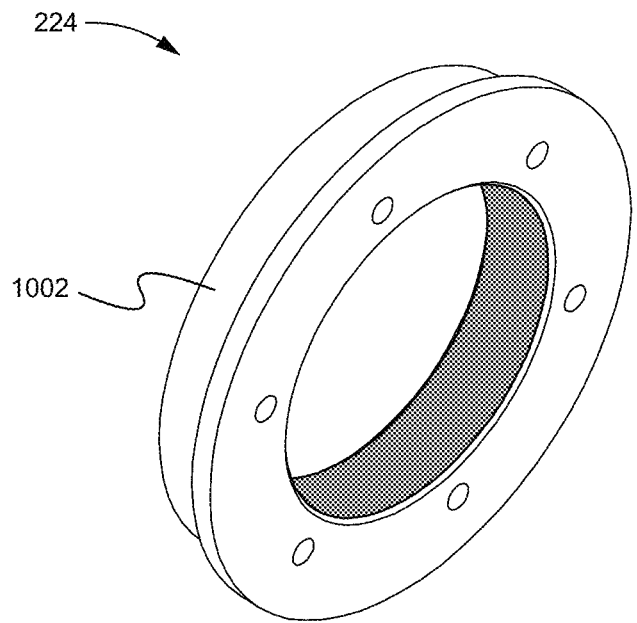
FIGS. 10A and 10B illustrate outside and inside perspective views, respectively, of a non-rotor side face plate lock ring according to some embodiments.
Figure 10B:
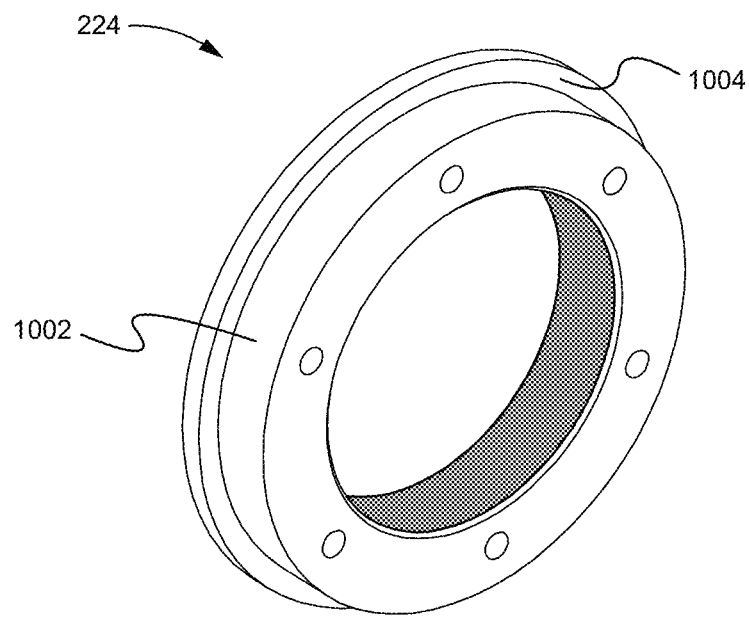
Figure 11A:
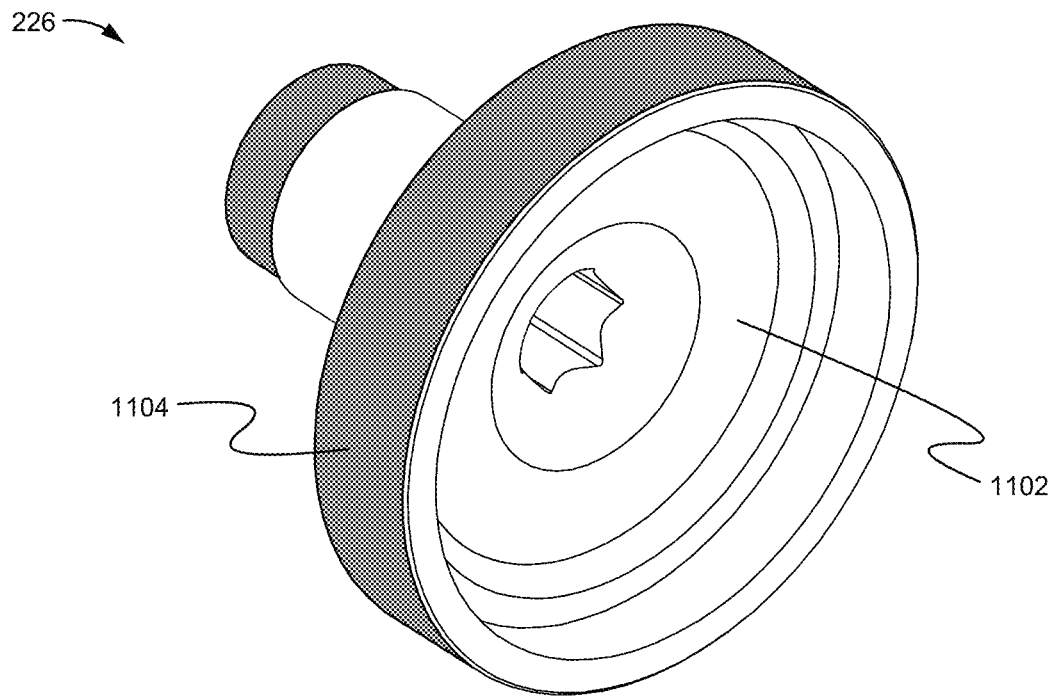
FIGS. 11A and 11B illustrate inside and outside perspective views, respectively, of a non-rotor side bearing housing according to some embodiments.
Figure 11B:
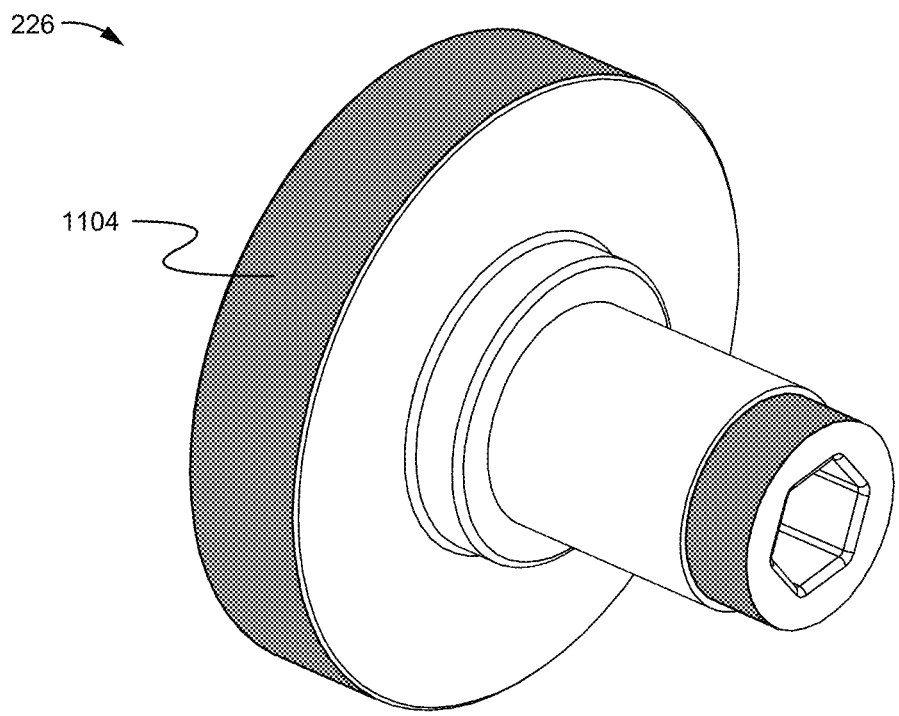
Figure 12A:
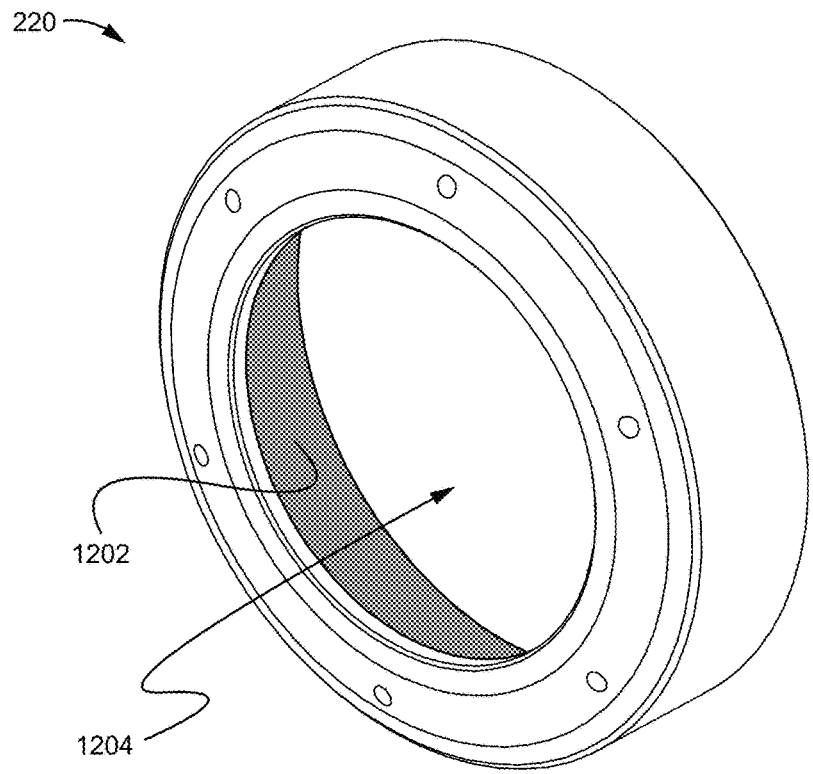
FIGS. 12A and 12B illustrate inside and outside perspective views, respectively, of a non-rotor side bearing housing lock ring housing according to some embodiments.
Figure 12B:
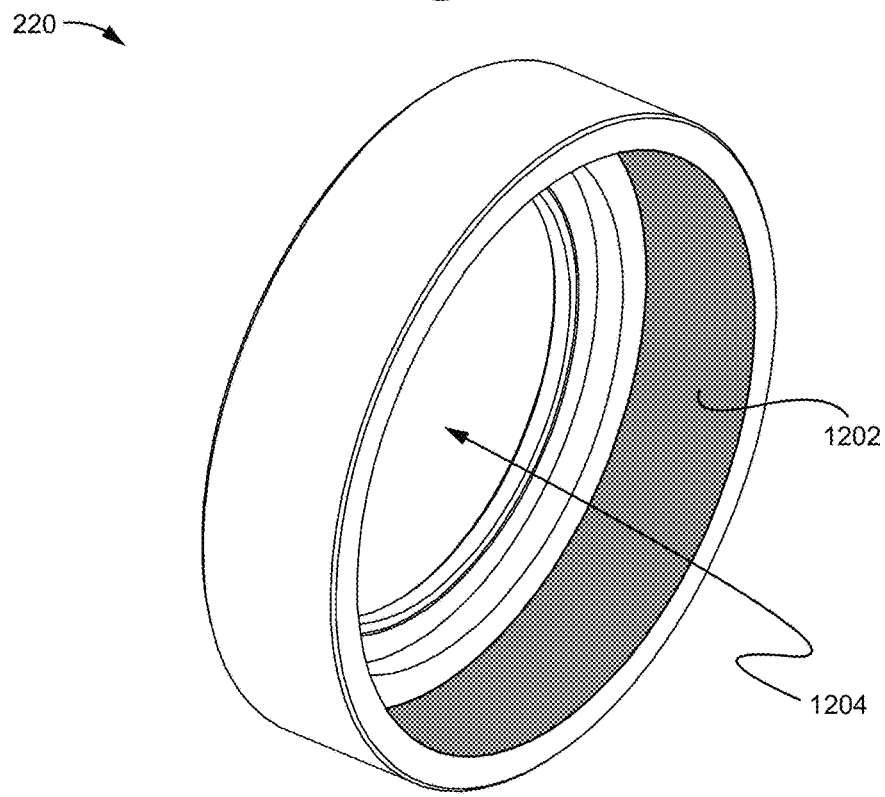
Figure 13A:
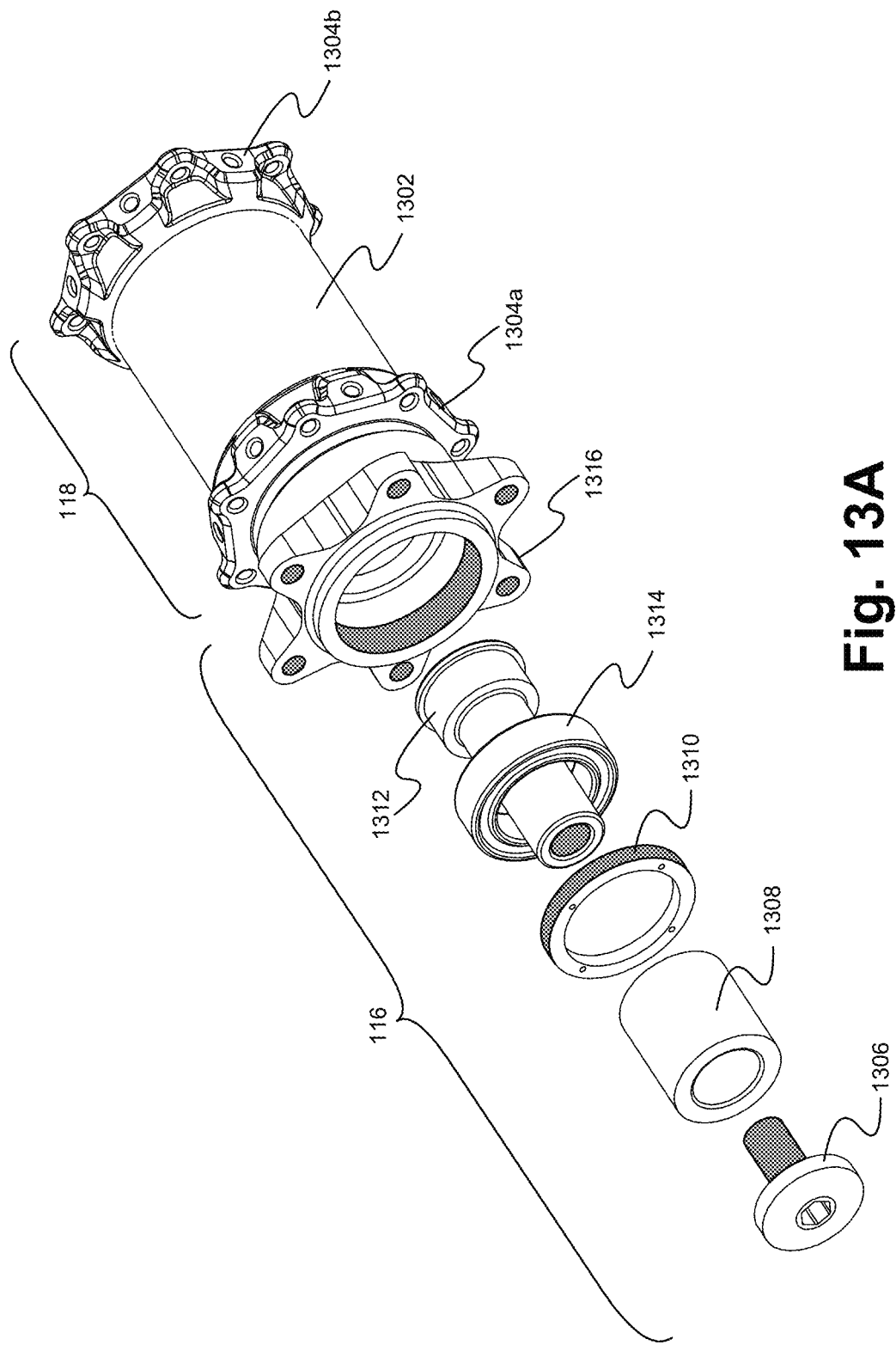
FIGS. 13A, 13B, 13C and 13D illustrate an exploded perspective rotor side locking mechanism and hub view, an exploded perspective non-rotor side view, a front view and a cross-sectional front view, respectively, of a rear hub assembly according to some embodiments.
Figure 13B:
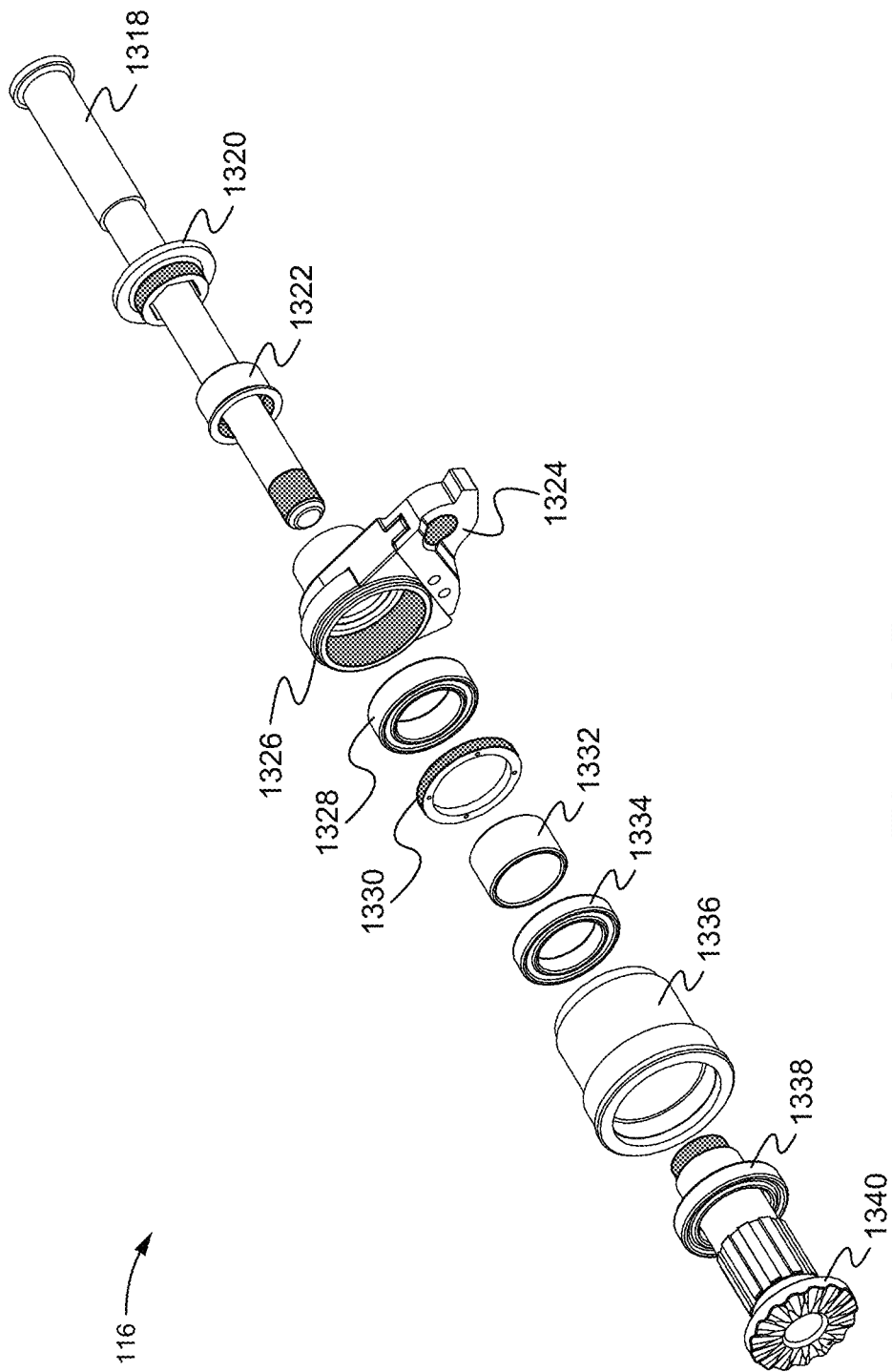
Figure 13C:
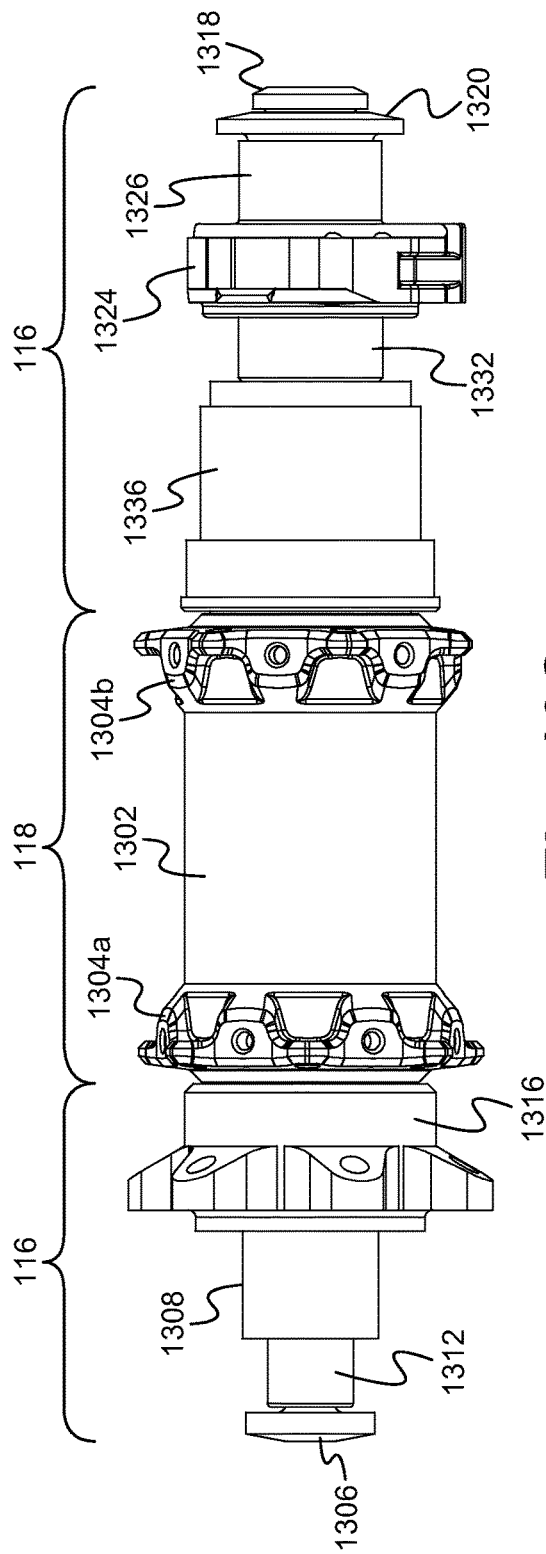
Figure 13D:
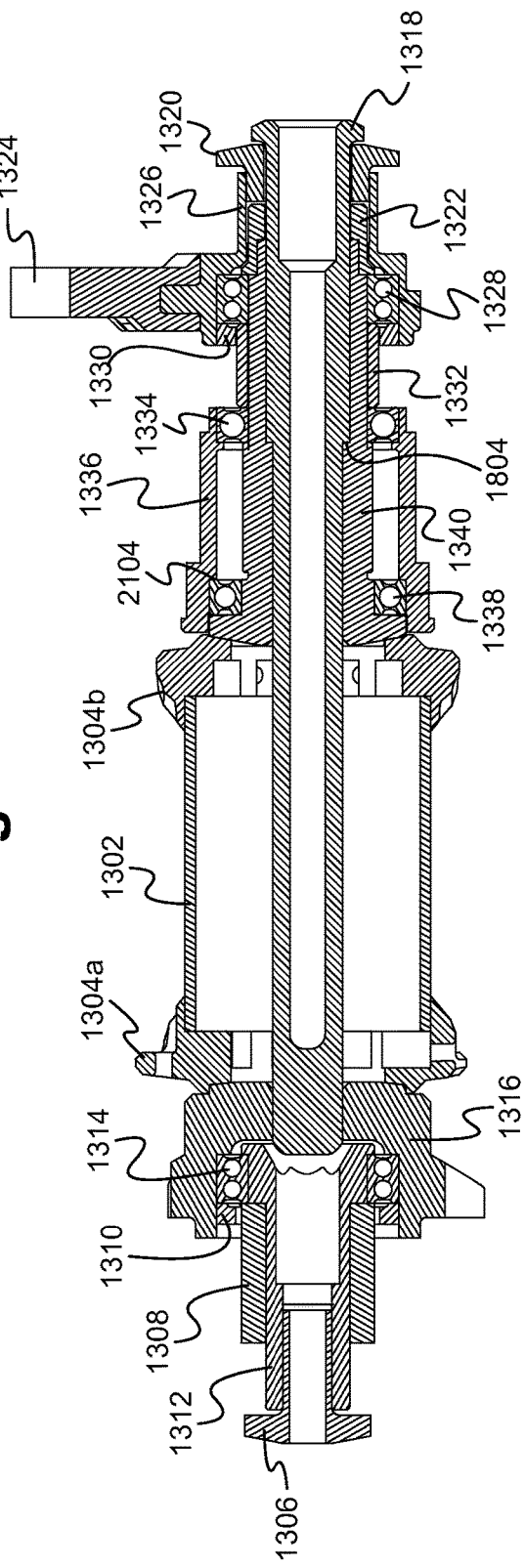

On the non-rotor side, the non-rotor side face plate lock ring 224 is positioned around a perimeter face 302 of a base ring 304 of the splined face plate 222 (see FIGS. 3A and 3B). In some embodiments, the inside of the face plate lock ring 224 and the outside of the perimeter face 302 are threaded such that the face plate lock ring 224 is able to thread onto the base ring 304 of the splined face plate 222. Alternatively, the face plate lock ring 224 is just slid onto the base ring 304 of the splined face plate 222. The non-rotor side bearing 228 is positioned around a perimeter face 306 of a bearing ring 308 of the splined face plate 222 and a perimeter face 1002 (See FIGS. 10A and 10B) of the face plate lock ring 224 (as coupled with the splined face plate 222) between a stop wall 310 of the splined face plate 222 and an end wall 1004 of the lock ring 224. Together, the face plate lock ring 224, the splined face plate 222 and the non-rotor side bearing 228 are at least partially positioned within the cavity 1102 of the non-rotor side bearing housing 226 (See FIGS. 11A and 11B). As shown in FIGS. 12A and 12B, the inner threads 1202 of the non-rotor side bearing housing lock ring 220 are able to be threaded onto outside threads 1104 of the bearing housing 226 thereby holding the face plate lock ring 224 and the non-rotor side bearing 228 within the cavity 1102 (with a protruding splined face 314 of the splined face plate 222 protruding through a central aperture 1204 of the bearing housing lock ring 220 such that it is able to contact the non-rotor side flange 204b). The front fork end 104 is able to couple to a neck of the non-rotor side bearing housing 226. In some embodiments, a lock nut is screwed onto end threading of the neck of the bearing housing 226 to hold the front fork end 104 on the neck of the bearing housing 226 (see FIG. 1C).

The protruding splined face 314 of the splined face plate 222 is able to be substantially similar to the protruding splined face 710 of the bearing housing/rotor mount 218. Specifically, the face 314 is able to radially surrounding a central aperture 316 and each spline is able to be rounded and radially slant outwardly away from a center of the aperture 316 such that a height of the spline closest to the aperture 316 is greater than a height of the spline farthest from the aperture 316. The angle, size and/or shape of the splined face 314 is able to correspond to (and/or be congruent with) the recessed splined surface 402b of the non-rotor side flange 204b. In particular, the recessed splined surface 402b of the non-rotor side flange 204b is able to also be rounded, but instead radially slant inwardly toward a central opening 404b such that when pressed against each other, the splines of the splined face 314 fit within the gaps between the splines of the recessed splined surface 402b and vice versa. Indeed, as described above, due to their radial formation, rounded edges and corresponding inward/outward angles, even when misaligned, compression of the faces 314, 402b against each other causes the faces 314, 402b (and thus the hub 114 and locking mechanism 112) to slide along the rounded edges and/or angles into proper alignment. Thus, the protruding splined face 314 and/or the recessed splined surface 402b provide the benefit of enabling easy alignment of the two faces 314, 402b when changing a tire/hub.

The through axle 206 is able to extend through central shafts of the flanges 204a, 204b and hollow tube 202 and threadably couple to the splined face plate 222 via internal threads 312 of the splined face plate 222 and end threads 906 of the through axle 206. As a result, as the through axle 206 is further threaded into the splined face plate 222, the splined face plate 222 is pulled against the outer face of the non-rotor side flange 204b, which along with the simultaneous compressing force against rotor side fork axle 212 and/or the bearing housing/rotor mount 218, causes the hub 114 to be fixed between the splined face plate 222 and the bearing housing/rotor mount 218. Conversely, as the through axle 206 is unscrewed out of the splined face plate 222, the pulling and compression forces are subsided and the hub 114 is able to be removed from between the splined face plate 222 and the bearing housing/rotor mount 218 (e.g. during a tire change process).

Now turning to the front hub 114, the flanges 204a, 204b of the front hub 114 are positioned on either side of the hollow tube 202. As shown in FIGS. 4A-4D, each of the flanges 204a, 204b are able to have a splined surface 402a, 402b that radially surrounds a perimeter of a central opening 404a, 404b of the flange 204a, 204b leading to the internal cavity 230 of the tube 202. Each spline of splined surface 402a, 402b is able to be rounded and radially slant inward toward the center of the opening 404a, 404b. Further, the angle, size and/or shape of the splined surfaces 402a, 402b of the flanges 204a, 204b are able to correspond to (and/or be congruent with) the splined surfaces 710, 314, respectively, such that their respective splines are able to fit within/alongside each other. In some embodiments, as shown in FIG. 2A, the splines of the splined surfaces 402a, 402b are able to be shorter than the splines of the splined surfaces 710, 314 (with the overlapping portions being congruent with and/or corresponding to each other). Alternatively, the splines of the splined surfaces 402a, 402b are able to be the same length as the splines of the splined surfaces 710, 314 (such that the entirety of the splines overlap and are congruent with and/or corresponding to each other).

In any case, because the splines are rounded, radially positioned and/or angled, when the wheel/hub 114 is inserted between the front wheel locking mechanism 112, the splines naturally engage each other without having to rotate either side to affect an engagement. This is contrast to non-rounded (e.g. splines having points/edges) whose edges can get caught on each other when trying to align with corresponding splines a hub. Further, because the splines on each side of the hub 114 are able to be recessed (e.g. so that the peaks of the splines are flush with the outermost portion of flanges 204a, 204b away from the tube 202), there is increased room to fit the wheel/hub 114 between the locking mechanism 112. This all facilitates easier and faster changing of wheels/hubs 114 which is key to successful bicycle racing.

Further, each of the flanges 204a, 204b are able to comprise a plurality spoke holes 406a, 406b for coupling spokes (not shown) to the hub 114. As shown in FIGS. 4A-4D, one or more of the spoke holes 406a, 406b (and/or surfaces of the flanges 204a, 204b) are able to be inwardly angled in order to, like the recessed splined faces 402a, 402b, increase clearance and facilitate easier insertion of the front wheel/hub 114 between the front hub locking mechanism 112. Indeed, in some embodiments this enables the spokes to be laced from the inside of the hollow tube 202, laced in the flanged manner, multi-tension laces and/or laces from the hollow tube 202 directly. As shown in FIGS. 4A-4D, the spoke holes 406a, 406b (and/or surfaces of the flanges 204a, 204b) are alternately inwardly angled. Alternatively, all of the spoke holes 406a, 406b (and/or surfaces of the flanges 204a, 204b) are able to be inwardly angled or all of the spoke holes 406a, 406b (and/or surfaces of the flanges 204a, 204b) are able to be straight. The spokes are able to be straight pull, J bend and/or a combination thereof.

In operation, an existing wheel/hub 114 is able to removed from the locking mechanism 112 by unscrewing and removing the through axle 206 thereby releasing the compression between the splined surfaces 402a, 402b of the flanges 204a, 204b and the splined surfaces 710, 314 of the locking mechanism 112. As a result, the unwanted wheel/hub 114 is able to be pulled out from between the splined surfaces 402a, 402b and replaced with a new wheel/hub 114 at least semi-aligned between the splined surfaces 710, 314 of the locking mechanism 112. The through axle 206 is then able to be reinserted and screwed into the splined face plate 222. As the through axle 206 is further threaded into the splined face plate 222, the splined face plate 222 is pulled against the outer face of the non-rotor side flange 204b, which along with the simultaneous compressing force against rotor side fork axle 212 and/or the bearing housing/rotor mount 218, causes the hub 114 to be fixed between the splined face plate 222 and the bearing housing/rotor mount 218. When pulled up tight the wheel/hub 114 and the two sides of the locking mechanism 112 essentially become a single rigid component capable of safely holding the wheel/hub 114 in place while the bike is in use. Additionally, it should be noted that due to the arrangement of the bearings 214, 228 and the through axle 206, when the through axle 206 is tightened no side loading is exerted onto the bearings 214, 228. Instead, the through axle 206 only pulls the two sets of splined faces together. In other words, the purpose of the through axle 206 is to pull the engaging splined faces together, not to carry any of the transverse load exerted on the hub/wheel 114 by the weight of the rider and the riding conditions. In particular, because the splines are radially projected towards a center point, when they are engaged, they are both self-centering and when tightened together are able to withstand the required transverse loading exerted on the hub 114. As a result, the system 100 provides the benefit of not needing wheel bearings in the central hub 114 itself, but instead having all the forces transferred through the engaging splined faces to the bearings 214, 228 in the outer bearing housings 218, 226.

After the coupling is complete, the bearings 214, 228 enable the through axle 206, the rotor side lock ring 216, the bearing housing/rotor mount 218, the front hub 114, the non-rotor side splined face plate 222 and the non-rotor side face plate lock ring 224 to all rotate together as the front hub/wheel 114 rotates. In other words, when the wheel/hub 114 rotates so will the through axle 206 unlike a traditional through axle that remains stationery. The lock ring nut 208, the splined spacer 210 (e.g. due to the splines 234) and rotor side fork axle 212 are affixed to one of the front fork ends 104 of the frame 102 and thus do not rotate with the hub 114. Similarly, the non-rotor side bearing housing lock ring 220 and the non-rotor side bearing housing 226 are affixed to the other one of the front fork ends 104 of the frame 102 and do not rotate with the hub 114.

Freewheel Rear Hub Assembly

FIGS. 13A, 13B, 13C and 13D illustrate an exploded perspective rotor side locking mechanism and hub view, an exploded perspective non-rotor side view, a front view and a cross-sectional front view, respectively, of a rear hub assembly 110 according to some embodiments. As shown in FIGS. 13A-13D, the rear hub assembly 110 comprises the rear hub 118 including a hollow tube 1302 coupled between a pair of flanges 1304a, 1304b (rotor side flange 1304a and non-rotor side flange 1304b) and a rear hub locking mechanism 116 straddling the rear hub 118. The rear hub 118 is able to be same as the front hub 114 and thus is not described in detail for the sake of brevity. In particular, because the rear and front hubs 114, 118 are similar or the same, the system 100 provides the advantage of enabling the same wheels/hubs to be used interchangeably as the front or rear wheel of the bicycle. In some embodiments, the non-rotor side of rear hub locking mechanism 116 is designed to operatively couple with a freewheel drive mechanism. Alternatively, the non-rotor side of rear hub locking mechanism 116 is able to couple to other types of drive mechanisms. As illustrated in FIGS. 13A-13D, the spokes and tire of the rear wheel/hub 118 are omitted for the sake of clarity.

The rear hub locking mechanism 116 is able to comprise a rotor side lock bolt 1306, a rotor side spacer 1308, a rotor side lock ring 1310, a rotor side bearing axle 1312, a rotor side bearing 1314, a rear hub bearing housing/rotor mount 1316, a rear hub through axle 1318, a hanger final lock bolt 1320, a non-rotor side lock bolt 1322, a replaceable/detachable hanger 1324, a hanger/bearing housing 1326, a hanger bearing 1328 (e.g. 17×26×7 mm), a hanger lock ring 1330, a non-rotor side spacer 1332, a first freewheel bearing 1334 (e.g. 17×26×5 mm), a freewheel body 1336, a second freewheel bearing 1338 (e.g. 19×28×5 mm) and a wave face axle 1340. The rear hub/wheel 118 is able to comprise a rotor side flange 1304a, a hollow tube 1302, and a non-rotor side flange 1304b. Alternatively, one or more of the above components are able to be omitted.

Figure 17B:
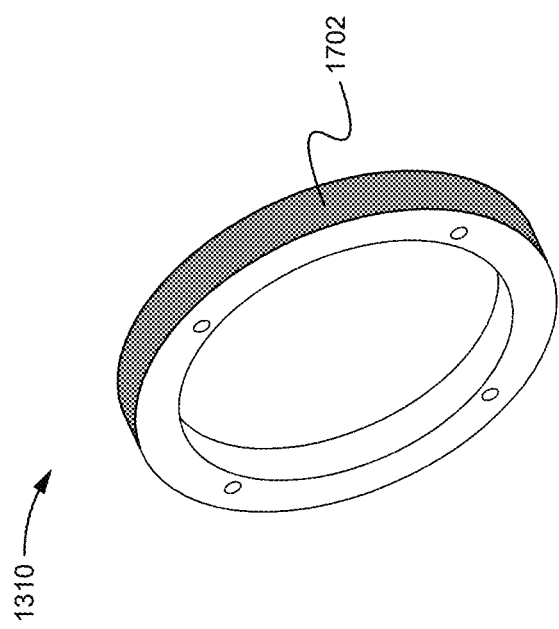
FIGS. 17A and 17B illustrate outside and inside perspective views, respectively, of a rotor side lock ring according to some embodiments.
Figure 17A:
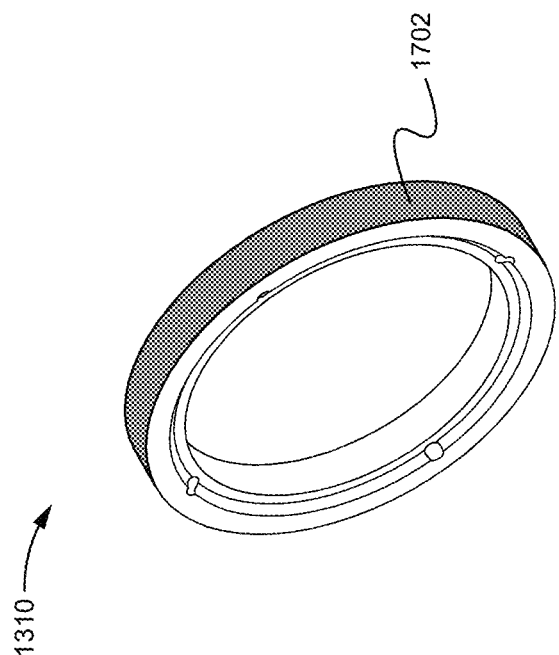

On the rotor side, the rotor side bearing 1314 is positioned around a base 1402 and abutting a terminal wall 1404 of the rotor side bearing axle 1312 (see FIGS. 14A and 14B). As shown in FIG. 15, the rotor side spacer 1308 has a central aperture 1502 having a size and shape that correspond to a shaft 1406 of the rotor side bearing axle 1312 such that the shaft 1406 is able to slide within the central aperture 1502 with a bottom 1504 of the rotor side spacer 1308 abutting a top face 1408 of the rotor side bearing axle 1312. Together, the rotor side bearing 1314, the rotor side spacer 1308 and the base 1402 of the rotor side bearing axle 1312 are positioned within the cavity 1602 (see FIG. 13D) of the rear hub bearing housing/rotor mount 1316, with the rotor side lock ring 1310 having an outer threaded portion 1702 (see FIGS. 17A and 17B) that threads into internal threads 1604 of the rear hub bearing housing/rotor mount 1316 on top of the rotor side bearing 1314 thereby holding all of the components within the cavity 1602.

Figure 16A:
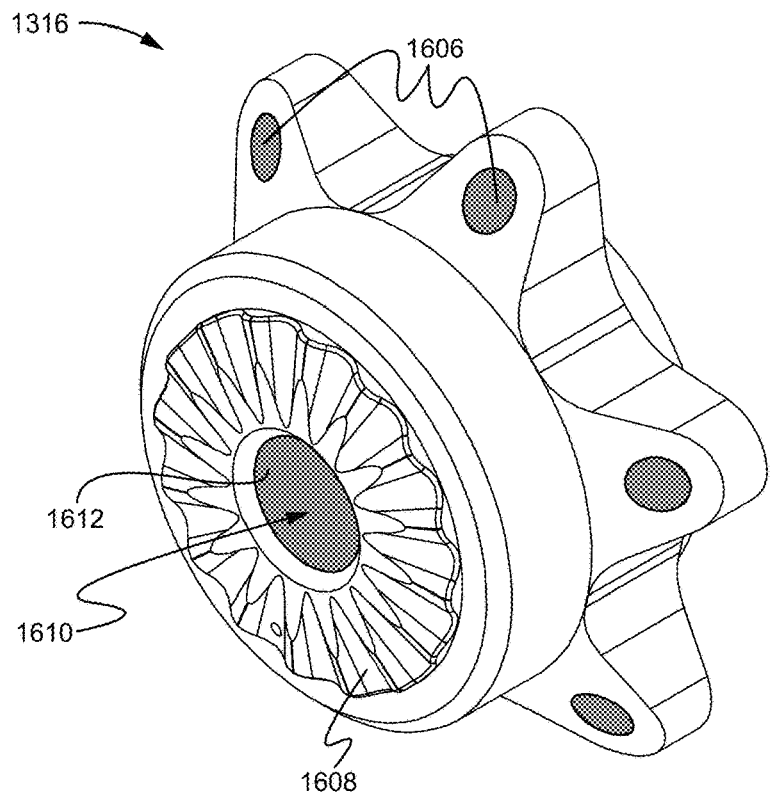
FIGS. 16A and 16B illustrate inside and outside perspective views, respectively, of a rear hub bearing housing/rotor mount according to some embodiments.
Figure 16B:
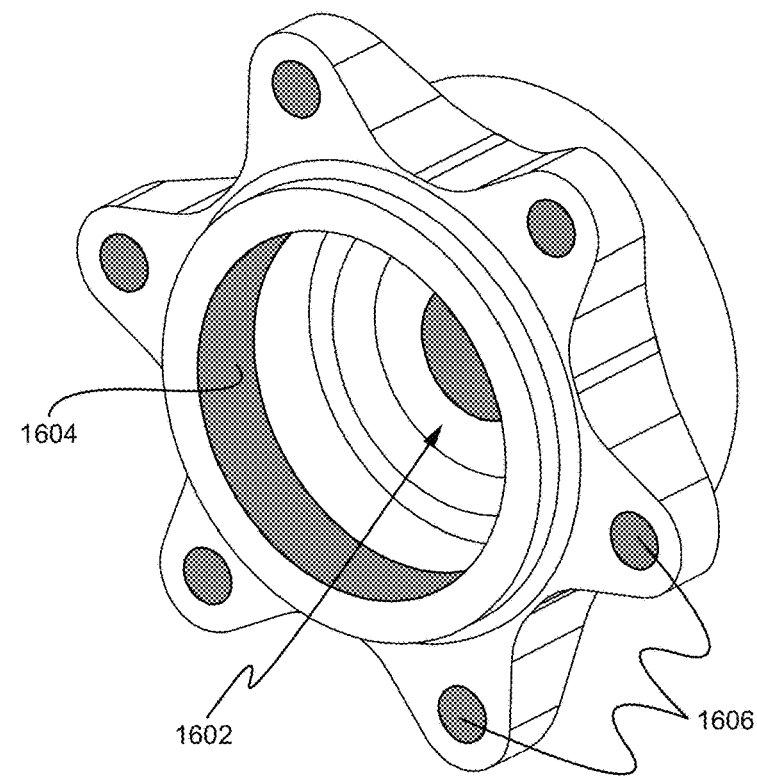

As shown in FIGS. 16A and 16B, the rear hub bearing housing/rotor mount 1316 is able to further comprise one or more rotor apertures 1606 for coupling with a rear brake rotor (not shown). Additionally, the rear hub bearing housing/rotor mount 1316 comprises a protruding splined face 1608 radially surrounding a central channel 1610. The splined face 1608 is able to be substantially similar to the splined face 710 of the front hub bearing housing/rotor mount 218. Specifically, each spline of splined face 1608 is able to be rounded and radially slant outwardly away from a center of the central channel 1610 such that a height of the spline closest to the central channel 1610 is greater than a height of the spline farthest from the central channel 1610. The angle, size and/or shape of the splined face 1608 is able to correspond to (and/or be congruent with) the recessed splined surface of the rotor side flange 1304a. As described above, the recessed splined surface of the rotor side flange 1304a is able to also be rounded, but instead radially slant inwardly toward a central opening such that when pressed against each other, the splines of the splined face 1608 fit within the gaps between the splines of the recessed splined surface of the rotor side flange 1304a and vice versa. Indeed, like with the front hub assembly 106, due to their radial formation, rounded edges and corresponding inward/outward angles, even when misaligned, compression of the splined faces against each other causes the faces (and thus the hub 118 and locking mechanism 116) to slide along the rounded edges and/or angles into proper alignment. Thus, the protruding splined face 1608 and/or the recessed splined surface of the flange 1304a provide the benefit of enabling easy alignment of the hub 118 and locking mechanism 116 when changing a tire/hub.

Figure 19A:
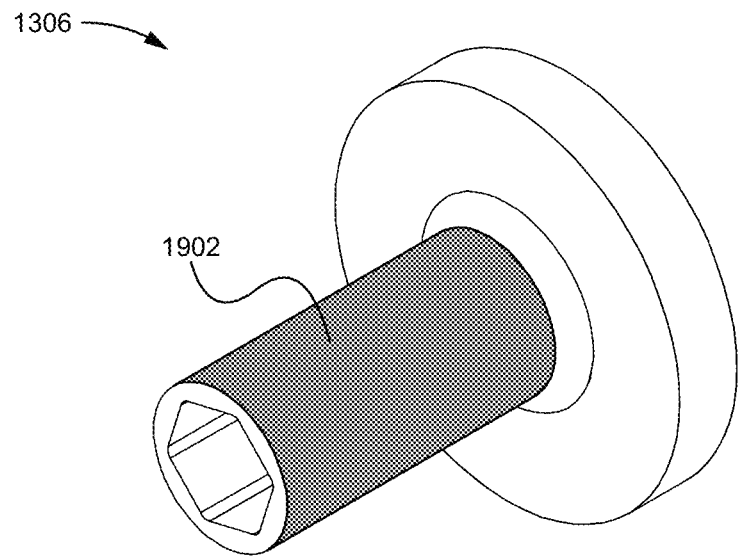
FIGS. 19A and 19B illustrate inside and outside perspective views, respectively, of a rotor side lock bolt according to some embodiments.
Figure 19B:
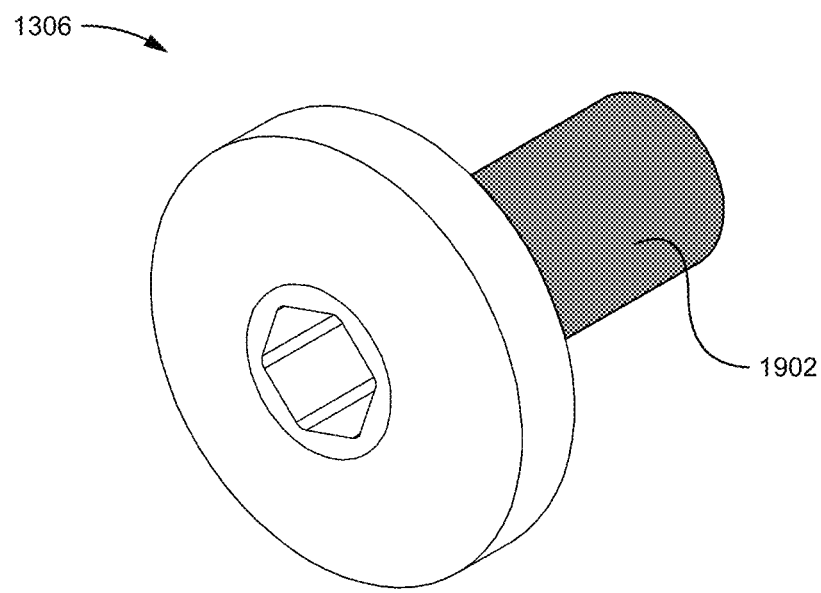

The rear fork end 108 is able to coupled to the rotor side bearing axle 1312 (see FIGS. 1E and 1F) and outer threads 1902 of the rotor side lock bolt 1306 (see FIGS. 19A and 19B) are able to thread into the inner threads 1410 within the shaft 1406 of the rotor side bearing axle 1312 to prevent the rear fork end 108 from sliding off the rotor side bearing axle 1312. The through axle 1318 is able to extend from the non-rotor side of the locking mechanism through central shafts of the flanges 1304a, 1304b and hollow tube 1302 and threadably couple to internal threads 1612 within the central channel 1610 of the rear hub bearing housing/rotor mount 1316 via end threads 1806 at the end of the through axle 1318. Thus, as the through axle 1318 is further threaded into the rear hub bearing housing/rotor mount 1316, the rear hub bearing housing/rotor mount 1316 is pulled against the outer face of the rotor side flange 1304a, which along with simultaneous compressing force against the wave face axle 1340 and/or the hanger final lock bolt 1320 (after the head 1802 contacts the top of the hanger final lock bolt 1320), causes the hub 118 to be fixed between the rear hub bearing housing/rotor mount 1316 and the wave face axle 1340. Conversely, as the through axle 1318 is unscrewed out of the rear hub bearing housing/rotor mount 1316, the pulling and compression forces are subsided and the hub 118 is able to be removed from between the rear hub bearing housing/rotor mount 1316 and the wave face axle 1340 (e.g. during a tire change process).

Figure 20A:
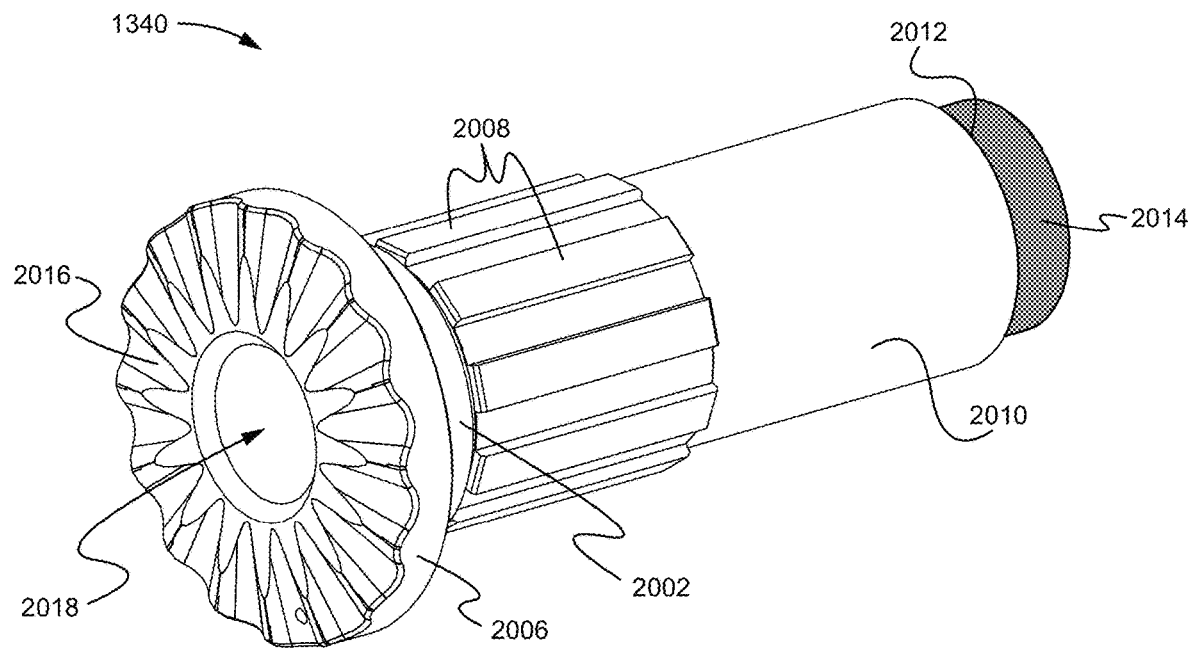
FIGS. 20A, 20B and 20C illustrate inside perspective, outside perspective and side cross-sectional views, respectively, of a wave face axle according to some embodiments.
Figure 20B:
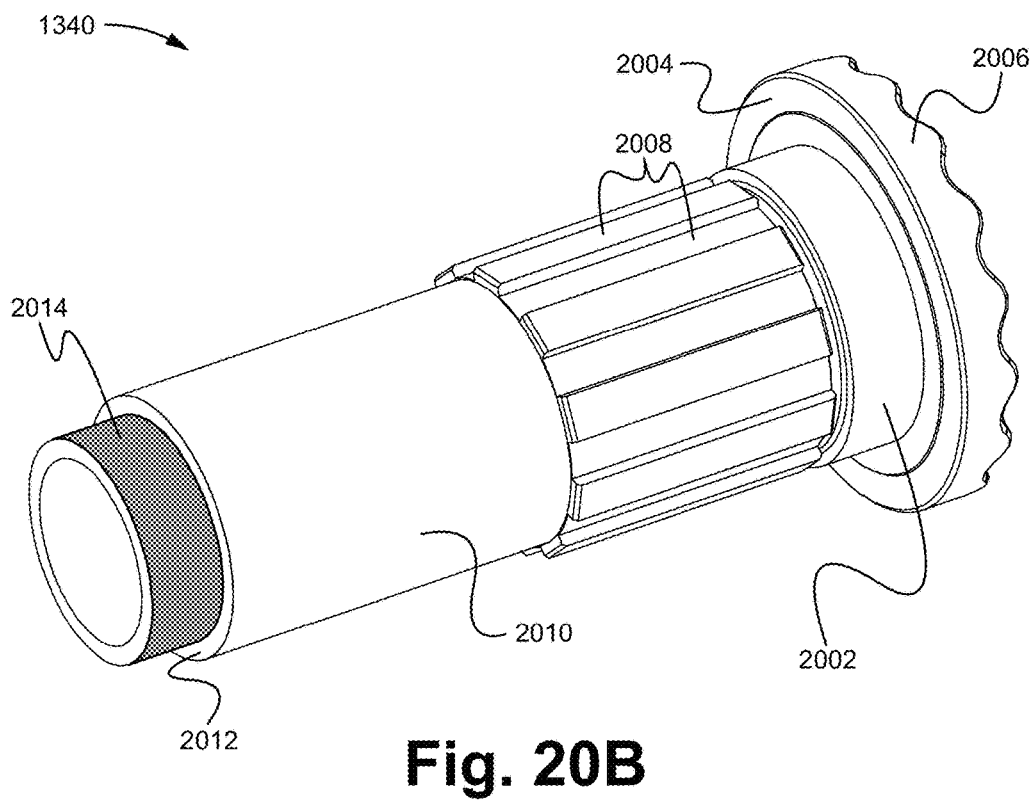
Figure 20C:
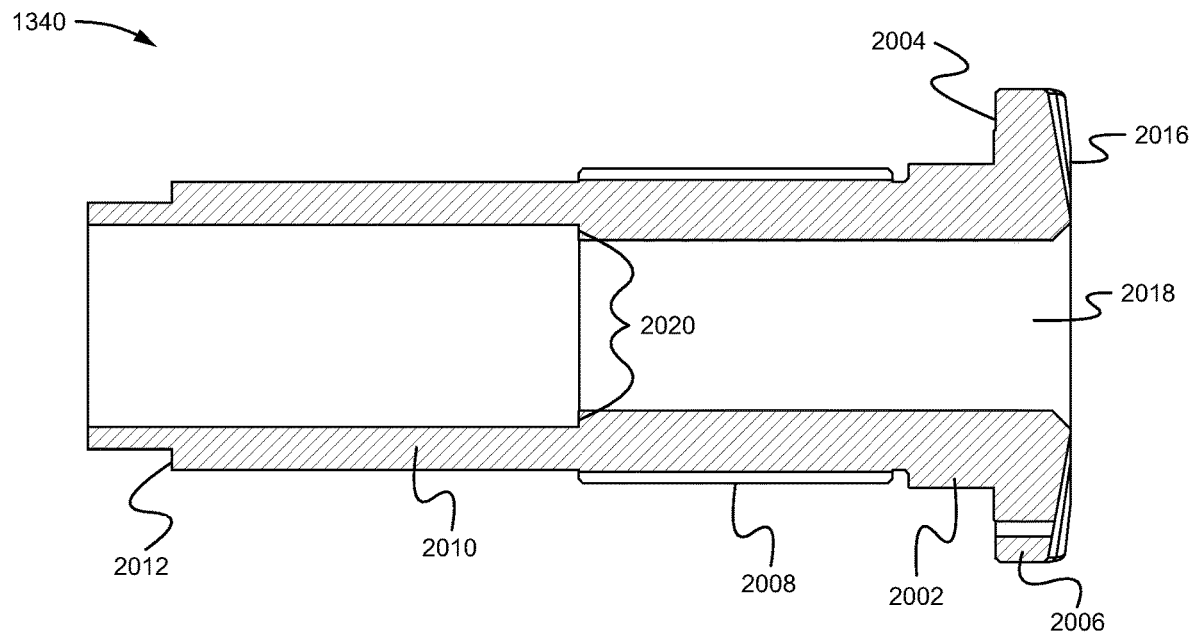
Figure 21A:
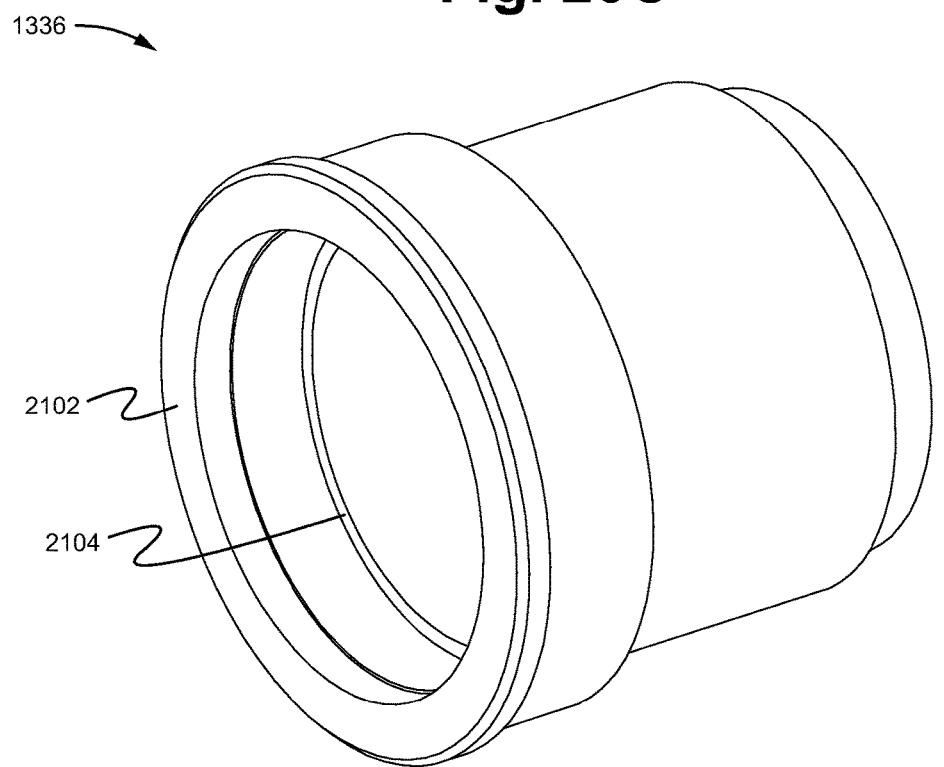
FIGS. 21A, 21B and 21C illustrate inside perspective, outside perspective and side cross-sectional views, respectively, of a freewheel body according to some embodiments.
Figure 21B:
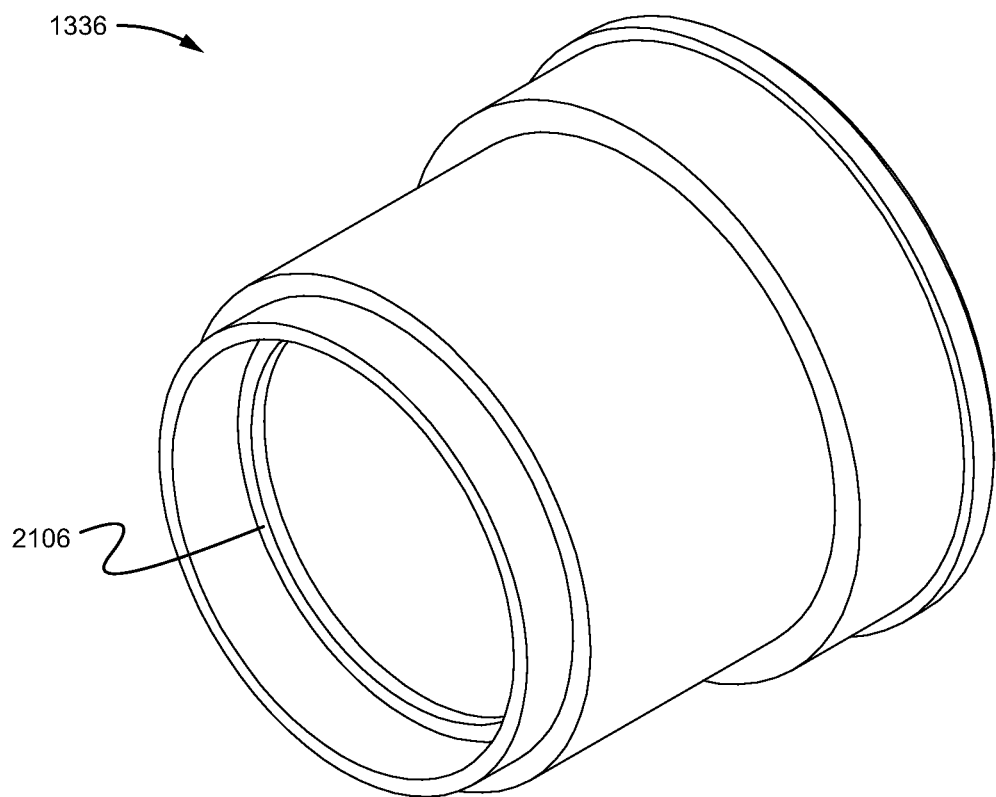
Figure 21C:
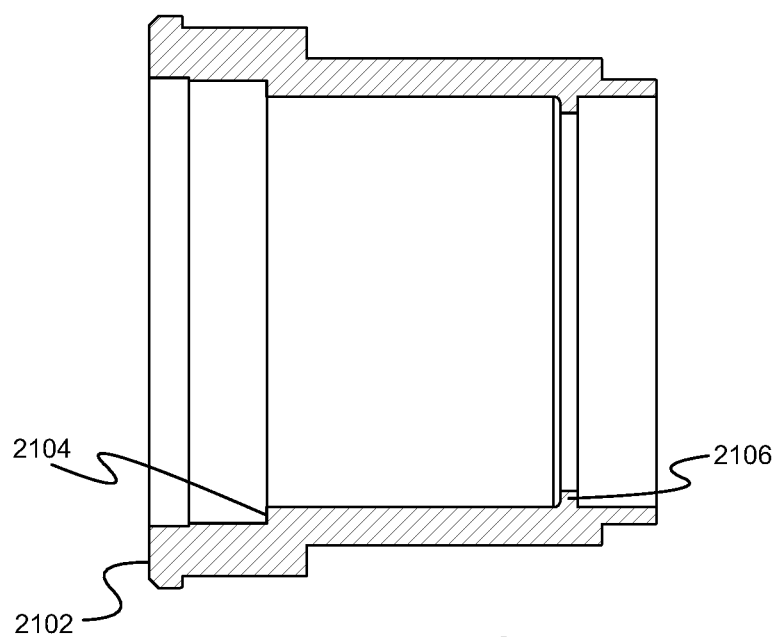

On the non-rotor side, the second freewheel bearing 1338 is positioned around a base 2002 of the wave face axle 1340 abutting a wall 2004 (see FIGS. 20A-C). The freewheel body 1336 (see FIGS. 21A-C) is positioned around the wave face axle 1340 such that a bottom rim 2102 of the freewheel body 1336 aligns with a bottom disk 2006 of the wave face axle 1340 and a lower ledge 2104 of the freewheel body 1336 blocks the second freewheel bearing 1338 from moving away from the wall 2004. The first freewheel bearing 1314 is positioned around an upper ledge 2106 of the freewheel body 1336 and on top of a plurality of splines 2008 of a shaft 2010 of the wave face axle 1340. The non-rotor side spacer 1332 is also positioned around the shaft 2010 of the wave face axle 1340 adjacent to the first freewheel bearing 1314 (e.g. to prevent the first freewheel bearing 1314 from sliding off of the shaft 2010 and/or out of the freewheel body 1336). In some embodiments, the exterior of the surface of the freewheel body 1336 includes a plurality of splines having a size, spacing, shape and of a quantity such that they enabling a gear cluster/cassette to be coupled to the freewheel body 1336 as a part of the drive mechanism of the system 100. Similarly, in some embodiments, the interior of the freewheel body 1336 is able to include one or more rachet mechanisms (e.g. see FIGS. 37-45) that engage with the splines 2008 of the wave face axle 1340 to enable the freewheel body 1336 to rotate in a first direction independent of the wave face axle 1340, but cause the wave face axle 1340 to receive rotational force from and rotate with the freewheel body 1336 when the freewheel body 1336 is rotated in the opposite direction (e.g. via forces imparted to the freewheel body by the drive mechanism). In other words, unlike conventional designs where axles are fixed with respect to the frame such that all bearings are being rotated against during pedalling, the wave face axle 1340 rotates with free wheel body 1336 (and the freewheel bearings 1338, 1334 therein) during forward pedalling. As a result, the system provides the advantage of enabling less resistance to the forward pedalling and less wear on the freewheel bearings 1338, 1334.

Figure 22A:
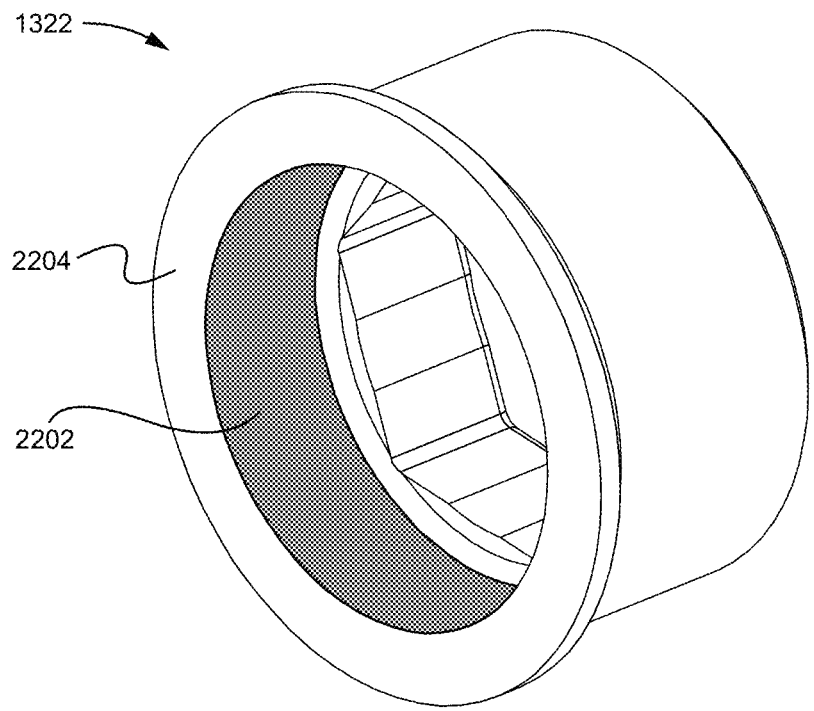
FIGS. 22A and 22B illustrate inside and outside perspective views, respectively, of a non-rotor side lock bolt according to some embodiments.
Figure 22B:
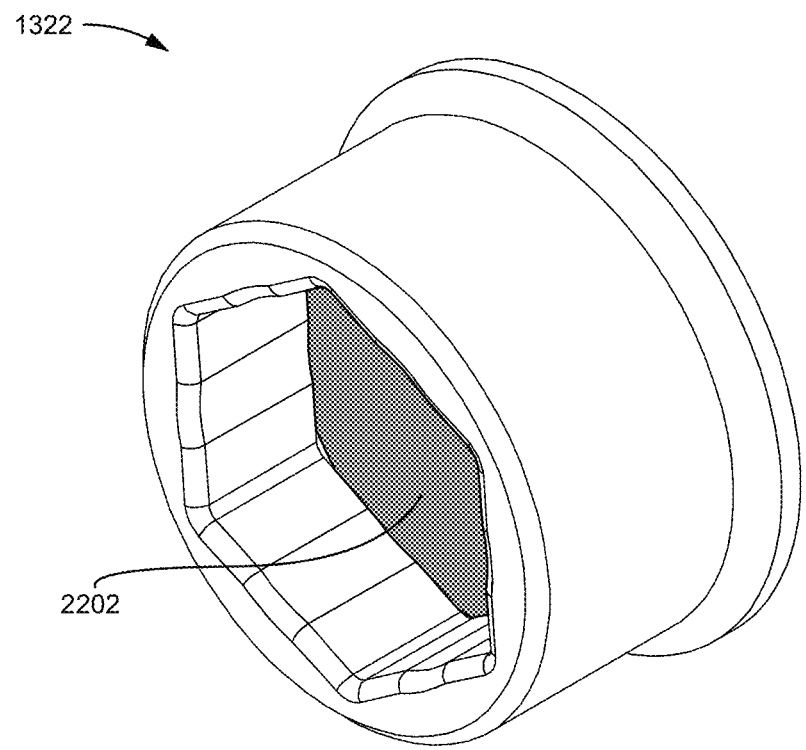

The hanger bearing 1328 is positioned around the shaft 2010 adjacent to the non-rotor side spacer 1332 and aligned with a bearing ledge 2012. As shown in FIGS. 22A and 22B, the non-rotor side lock bolt 1322 has an inner threaded portion 2202 that threads onto end threads 2014 of the shaft 2010 of the wave face axle 1340 such that a stop wall 2204 contacts the bearing ledge 2012 and/or the top of the hanger bearing 1328. As a result, the non-rotor side lock bolt 1322 is able to secure all of the hanger bearing 1328, the non-rotor side spacer 1332, the first freewheel bearing 1334, the freewheel body 1336 and the second freewheel bearing 1338 on the wave face axle 1340.

Figure 23A:
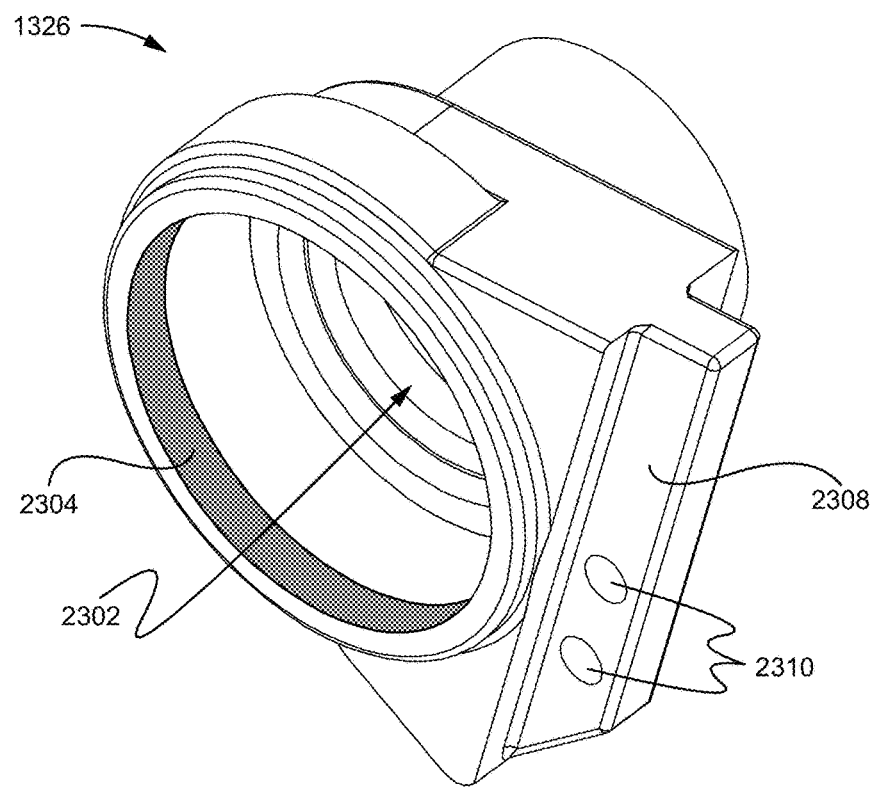
FIGS. 23A and 23B illustrate inside and outside perspective views, respectively, of a hanger/bearing housing according to some embodiments.
Figure 23B:
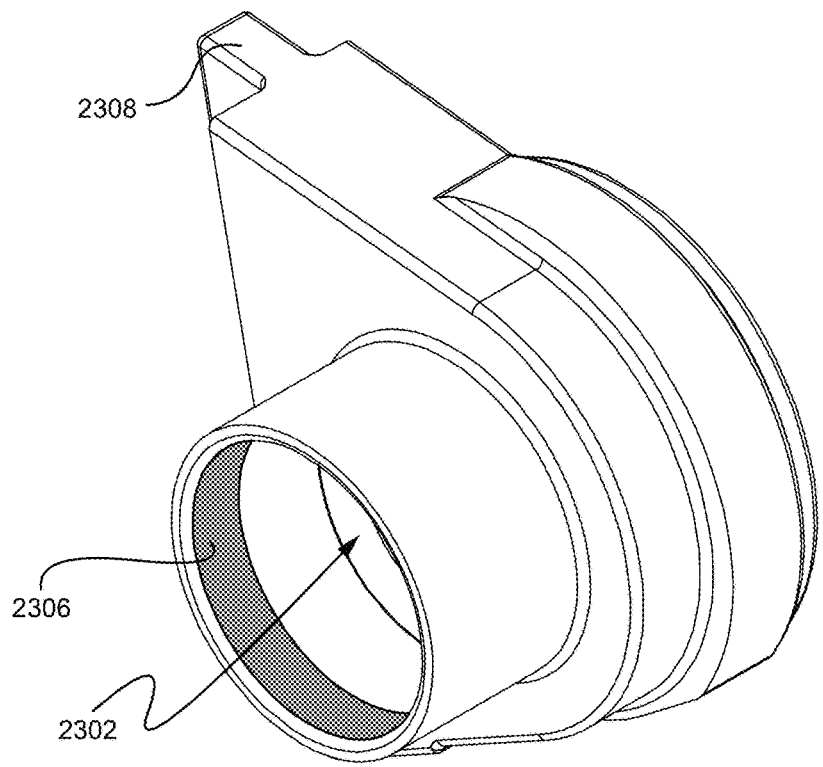
Figure 24A:
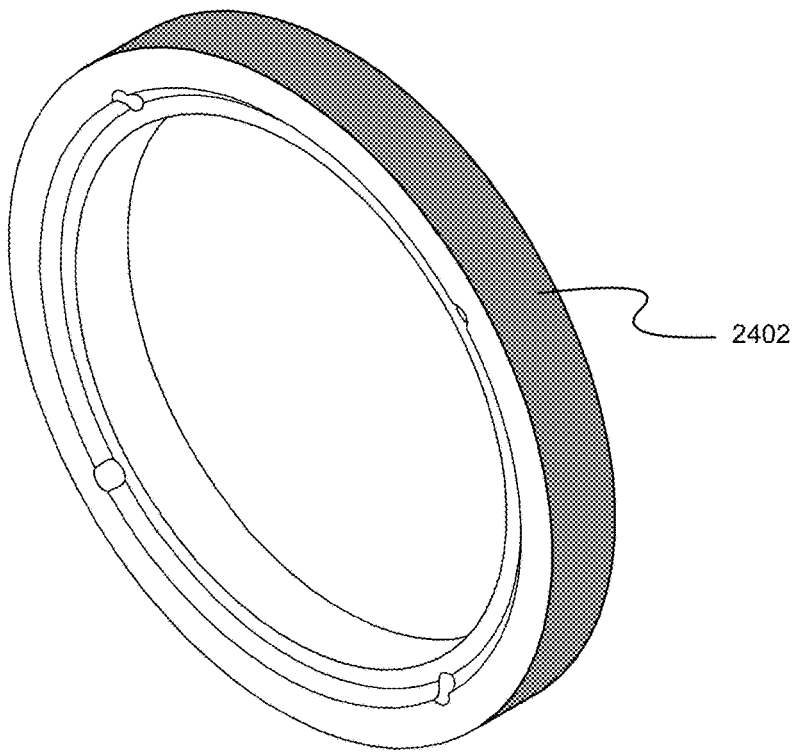
FIGS. 24A and 24B illustrate outside and inside perspective views, respectively, of a hanger lock ring according to some embodiments.
Figure 24B:
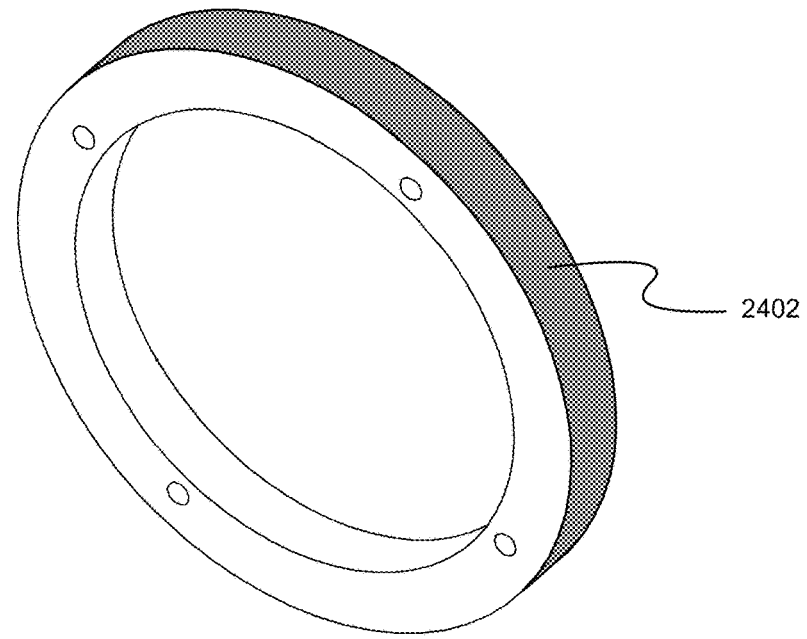

Together the hanger bearing 1328, the non-rotor side lock bolt 1322 and the end of the wave face axle 1340 are positioned within a bearing cavity 2302 (see FIGS. 23A and 23B) of the hanger/bearing housing 1326. In particular, the stop wall 2204 of the non-rotor side lock bolt 1322 is able to have a length such that the stop wall 2204 contacts a narrowed portion of the inner walls of the hanger/bearing housing 1326 keeping the lock bolt 1322 secure within the bearing cavity 2302. The hanger lock ring 1330 is then able to be positioned around the non-rotor side spacer 1332 with outer thread 2402 of the hanger lock ring 1330 (see FIGS. 24A and 24B) threaded into inner locking threads 2304 of the hanger/bearing housing 1326 thereby holding the hanger bearing 1328 within the bearing cavity 2302. Importantly, because the hanger bearing 1328 is housed in the hanger/bearing housing 1326 (instead of in the hub 118), larger bearings are able to be used that are able to better withstand the forces applied to the rear hub assembly 110. As a result, the use of a hybrid hanger/bearing housing 1326 improves the durability of the rear hub assembly 110.

Figure 25A:
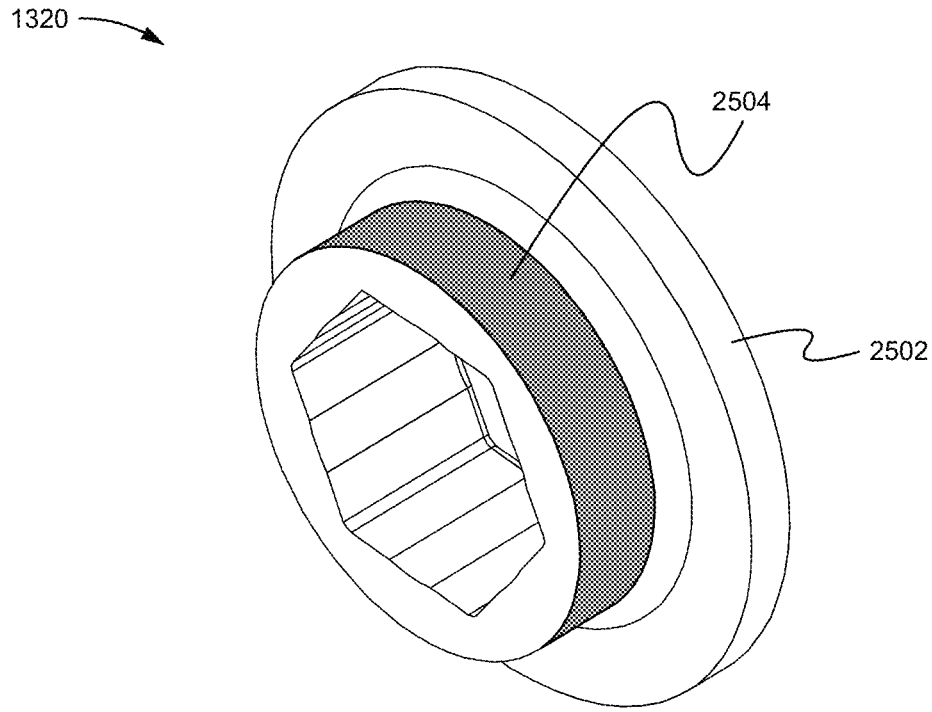
FIGS. 25A and 25B illustrate inside and outside perspective views, respectively, of a hanger final lock bolt according to some embodiments.
Figure 25B:
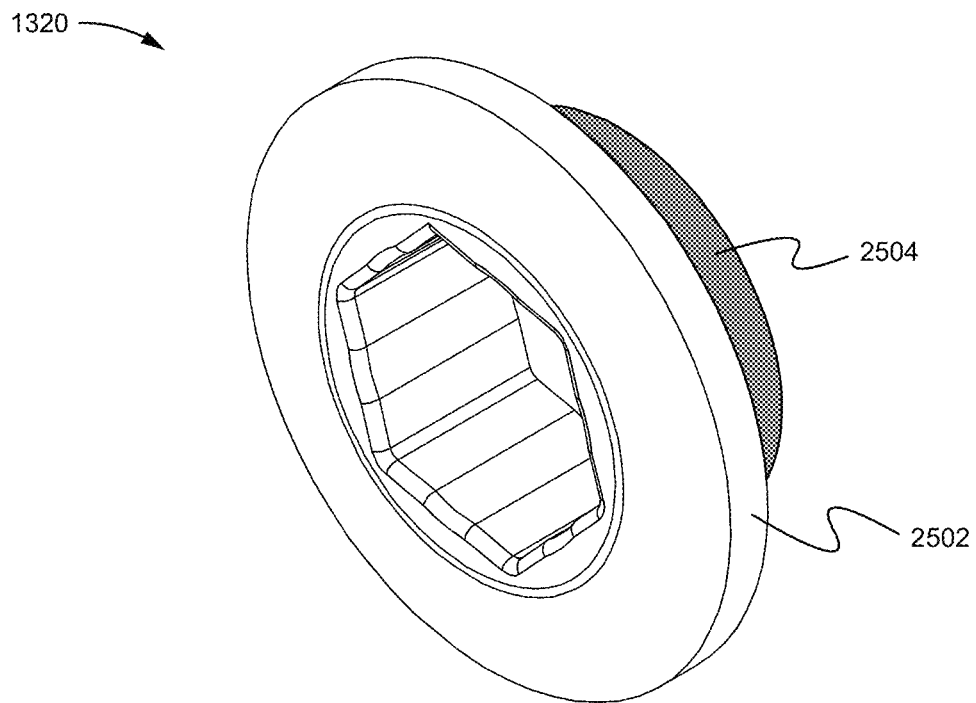
Figure 26A:
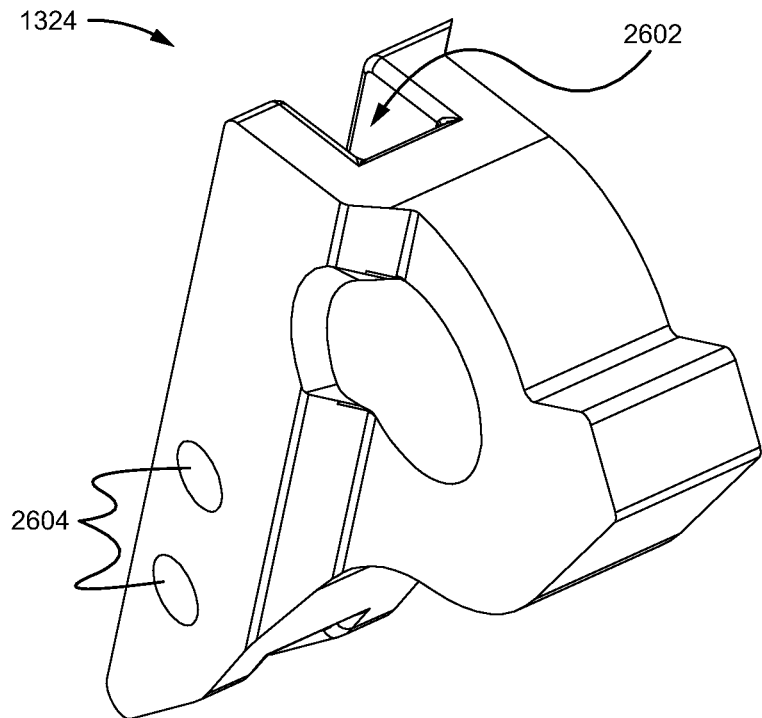
FIGS. 26A and 26B illustrate inside and outside perspective views, respectively, of a replaceable/detachable hanger according to some embodiments.
Figure 26B:
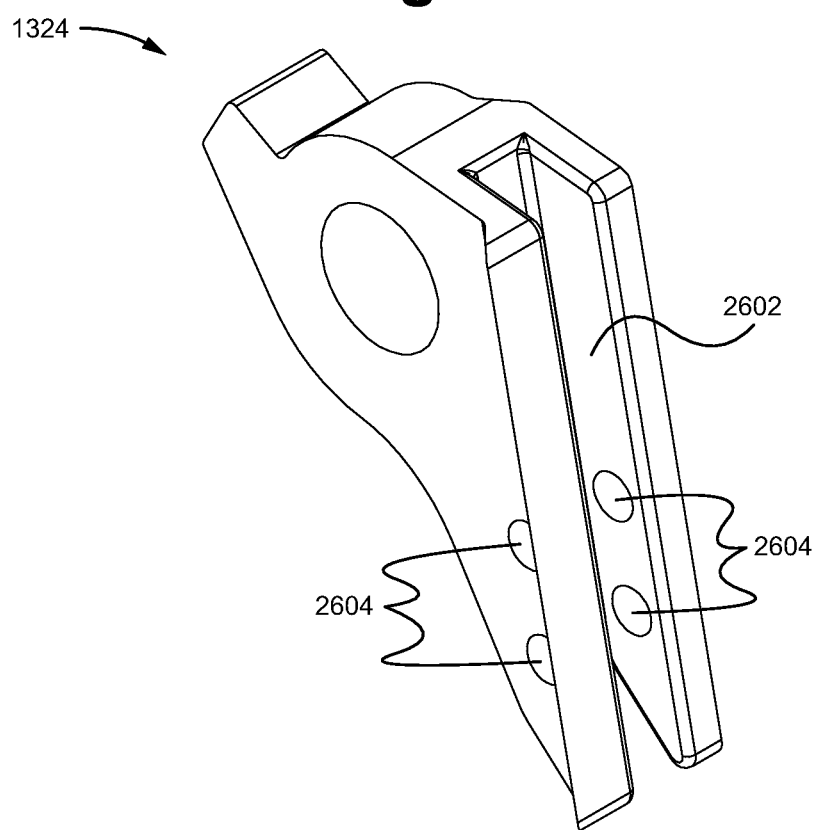
Figure 27A:
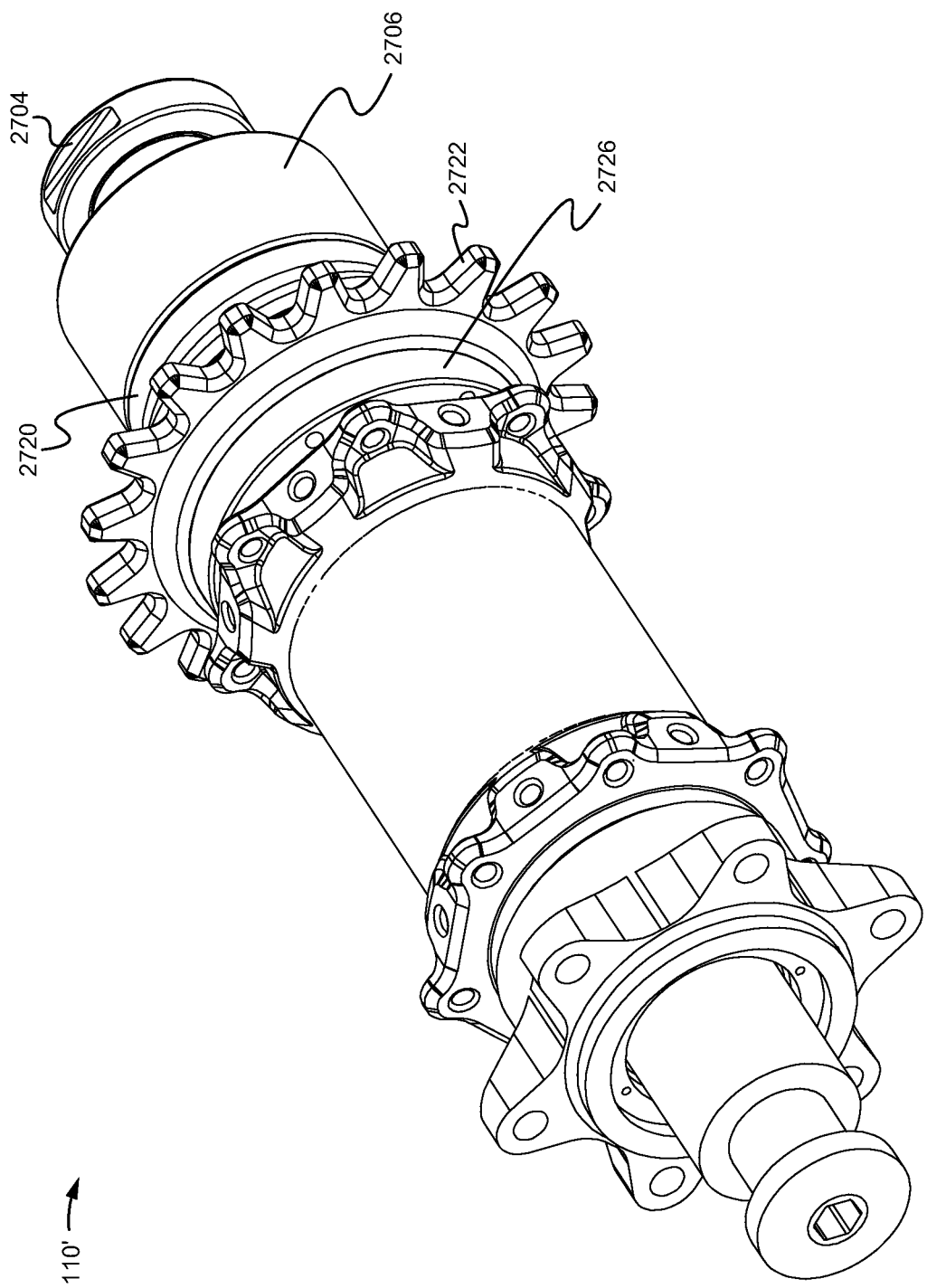
Figure 27D:
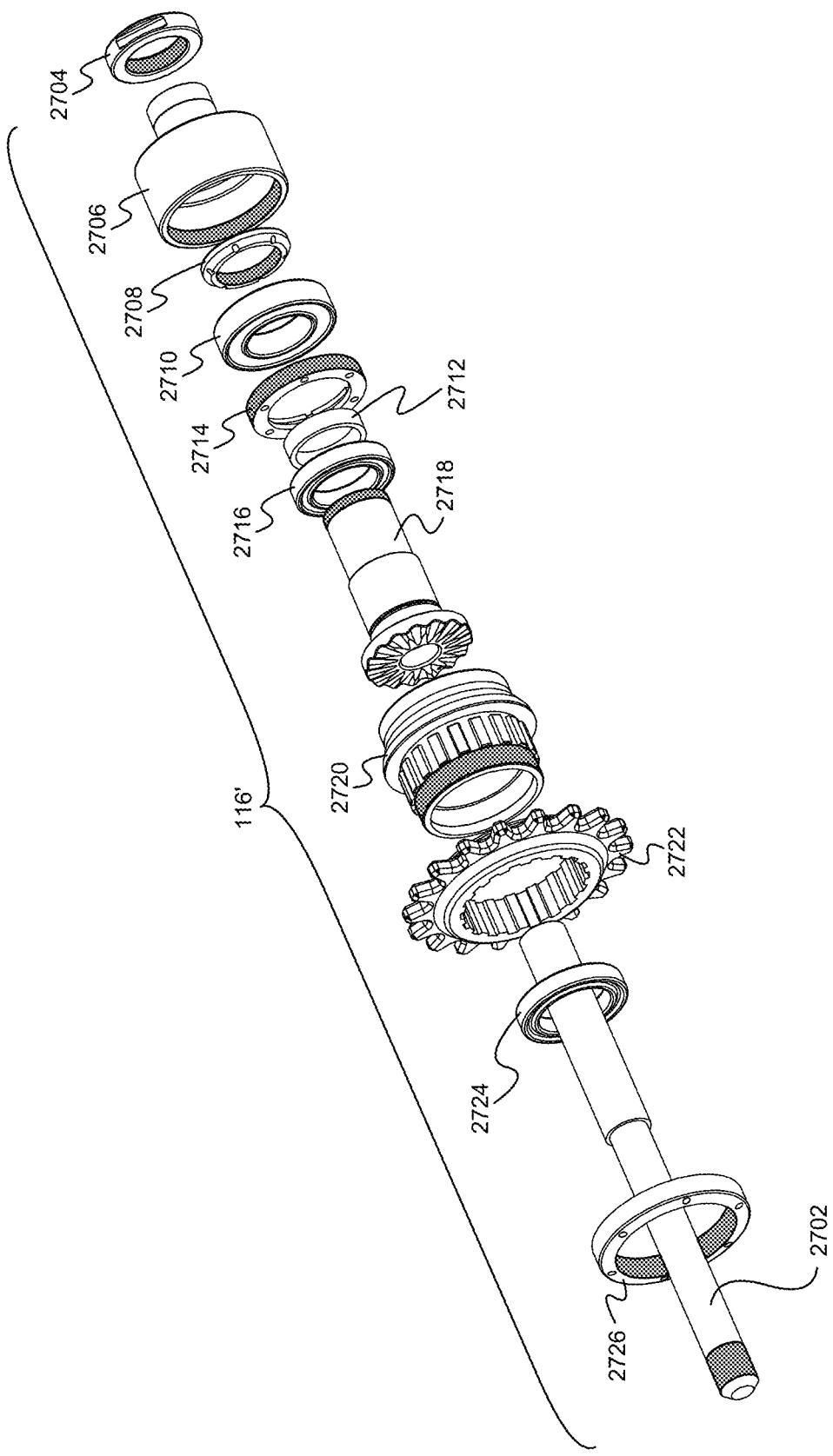

The hanger/bearing housing 1326 is able to further comprise a hanger coupling member 2308 having one or more coupling slots 2310 for receiving coupling pins (not shown). The replaceable hanger 1324 (see FIGS. 26A and 26B) is able to detachably couple to the hanger coupling member 2308 of the housing 1326 with the coupling member 2308 sliding into a coupling channel 2602 of the replaceable hanger 1324 until one or more coupling holes 2604 of the hanger 1324 align with the coupling slots 2310 of the housing 1326. Once aligned, pins are able to be positioned through the aligned slots 2310 and holes 2604 thereby detachably coupling the hanger 1324 to the hanger/bearing housing 1326. The size, shape and/or features of the replaceable hanger 1324 are able to vary in order to fit different types of bicycles (e.g. mountain bike, road bike, gravel bike, downhill bike, enduro mountain bike, racing bike and/or other types of bicycles). The rear fork end 108 is able to coupled to the hanger/bearing housing 1326. As shown in FIGS. 25A and 25B, the hanger final lock bolt 1320 has a head 2502 and a threaded stem 2504 that is threaded into inner threads 2306 of the hanger/bearing housing 1326 such that it abuts the top of the non-rotor side lock bolt 1322. As a result, the head 2502 of the hanger final lock bolt 1320 is able to prevent the rear fork end 108 from sliding off the hanger/bearing housing 1326.

The protruding splined face 2016 of the wave face axle 1340 is able to be substantially similar to the protruding splined face 1608 of the rear hub bearing housing/rotor mount 1316. The face 2016 is able to radially surrounding a central aperture 2018 and each spline is able to be rounded and radially slant outwardly away from a center of the aperture 2018 such that a height of the spline closest to the aperture 2018 is greater than a height of the spline farthest from the aperture 2018. The angle, size and/or shape of the splined face 2016 is able to correspond to (and/or be congruent with) the recessed splined surface of the non-rotor side flange 1304b. In particular, the recessed splined surface of the non-rotor side flange 1304b is able to also be rounded, but instead radially slant inwardly toward a central opening such that when pressed against each other, the splines of the splined face 2016 fit within the gaps between the splines of the recessed splined surface of the non-rotor side flange 1304b and vice versa. As described above, due to their radial formation, rounded edges and corresponding inward/outward angles, even when misaligned, compression of the splined faces against each other causes the faces (and thus the hub 118 and locking mechanism 116) to slide along the rounded edges and/or angles into proper alignment. Thus, the protruding splined face 2016 provides the benefit of enabling easy alignment of the two faces when changing a tire/hub.

Figure 18:
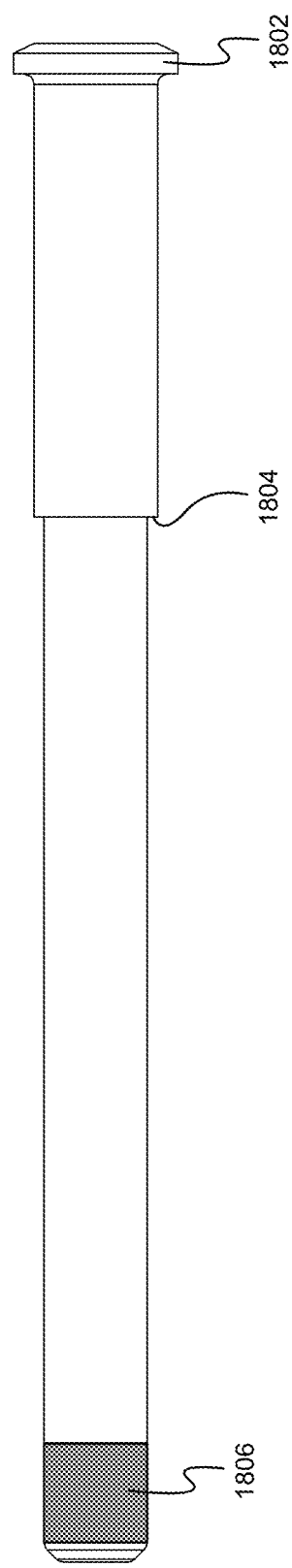
FIG. 18 illustrates a side view of a rear hub through axle according to some embodiments.

The rear through axle 1318 (see FIG. 18) is able to extend through central shafts of the hanger final lock bolt 1320, the non-rotor side lock bolt 1322, the wave face axle 1340, the flanges 1304a, 1304b and the hollow tube 1302 and threadably couple to internal threads 1610 of the rear hub bearing/housing rotor mount 1316 via end threads 1806 of the through axle 1318. In particular, as the axle 1318 is further threaded into the bearing/housing rotor mount 1316, the head 1802 of the through axle 1318 eventually contacts the top of the hanger final lock bolt 1320 and/or a lip 1804 of the axle 1318 eventually contacts an inner wall 2020 of the wave face axle 1340. As a result, as the through axle 1318 is even further threaded into the bearing/housing rotor mount 1316, splined face 1608 of the rotor mount 1316 is compressed against the splined face of the rotor side flange 1304a and the splined face 2016 of the wave face axle 1340 is compressed against the splined face of the non-rotor side flange 1306. These compression forces cause the hub 118 to be fixed between the wave face axle 1340 and the bearing housing/rotor mount 1316. Conversely, as the through axle 1318 is unscrewed, the compression forces are subsided and the hub 118 is able to be removed from between the wave face axle 1340 and the bearing housing/rotor mount 1316 (e.g. during a tire change process). In some embodiments, the lip 1804 is created by a discrete reduction in radius of the axle 1318 about its central axis such that an upper portion before the lip 1804 has a larger radius than a lower portion of the axle 1318 after the lip 1804. Alternatively, the axle 1318 is able to have the same or substantially similar radius immediately before and after the lip 1804, with the lip 1804 constituting a portion having a discrete increase in radius than the portions immediately before and after the lip 1804.

In operation, like with the front hub assembly 106, a current wheel/hub 118 is able to removed from the locking mechanism 116 by unscrewing and removing the through axle 1318 thereby releasing the compression between the splined surfaces of the flanges 1304a, 1304b and the splined surfaces 1608, 2016 of the locking mechanism 116. As a result, the unwanted wheel/hub 118 is able to be pulled out from between the splined surfaces and replaced with a new wheel/hub 118 at least semi-aligned between the splined surfaces 1608, 2016 of the locking mechanism 116. The through axle 1318 is then able to be reinserted and screwed into the bearing/housing rotor mount 1316. As the through axle 1318 is further threaded into bearing/housing rotor mount 1316, the splined surfaces 1608, 2016 are pushed against the outer recessed splined faces of the flanges 1304, which causes the hub 118 to be fixed between the bearing/housing rotor mount 1316 and the wave face axle 1340. When pulled up tight the wheel/hub 118 and the two sides of the locking mechanism 116 are able to act like a single rigid component capable of safely holding the wheel/hub 118 in place while the bike is in use. Additionally, like with the front hub assembly 106, due to the arrangement of the bearings 1328, 1334, 1338 and the through axle 1318, when the through axle 1318 is tightened no side loading is exerted onto the bearings 1328, 1334, 1338. Instead, the through axle 1318 only pulls the two sets of splined faces together and does not need to carry any of the transverse load exerted on the hub/wheel 118 by the weight of the rider and the riding conditions. Again, because the splines are radially projected towards a center point, when they are engaged they are both self-centering and when tightened together, they are able to withstand the required transverse loading exerted on the hub 118 (so the axle 1318 does not need to). As a result, the system 100 provides the benefit of not needing wheel bearings in the central hub 118 itself, but instead having all the forces transferred through the engaging splined faces to the bearings 1328, 1334, 1338.

After the coupling is complete, the bearings 1328, 1334, 1338 enable the through axle 1318, the non-rotor side lock bolt 1322, the wave face axle 1340, the freewheel body 1336, the rotor side lock ring 1310 and the rear hub bearing housing/rotor mount 1316 to all rotate together as the rear hub/wheel 118 rotates. In other words, when the wheel/hub 118 rotates (e.g. due to the drive mechanism causing the freewheel body 1336 to rotate in a drive direction) so will the through axle 1318 unlike a traditional through axle that remains stationery. The hanger final lock bolt 1320, the replaceable/detachable hanger 1324, the hanger/bearing housing 1326 and the hanger lock ring 1330 are affixed to one of the rear fork ends 108 of the frame 102 and thus do not rotate with the hub 118. Similarly, the rotor side lock bolt 1306, the rotor side spacer 1308 and the rotor side bearing axle 1312 are affixed to the other one of the rear fork ends 108 of the frame 102 and do not rotate with the hub 118.

Gearbox or Single Speed Rear Hub Assembly

FIGS. 27A, 27B, 27C and 27D illustrate a perspective view, a front view, a cross-sectional front view and an exploded non-rotor side perspective view, respectively, of a rear hub assembly 110' according to some embodiments. As shown in FIGS. 27A-27D, the rear hub assembly 110' comprises the rear hub 118' and a rear hub locking mechanism 116' straddling the rear hub 118'. The rear hub 118' and the rotor side of the rear hub locking mechanism 116' are able to be the same as the rear hub 116 and the rotor side of the rear hub locking mechanism 116. Thus, the rear hub 118' and the rotor side of the rear hub locking mechanism 116' are not described in detail for the sake of brevity. In particular, similar to the rear hub 118, because the rear and front hubs 114, 118' are similar or the same, the system 100 provides the advantage of enabling the same wheels/hubs to be used interchangeably as the front or rear wheel of the bicycle. In some embodiments, the non-rotor side of rear hub locking mechanism 116' is designed to operatively couple with a gearbox drive mechanism. Alternatively, the non-rotor side of rear hub locking mechanism 116' is able to couple to other types of drive mechanisms such as a single speed gear drive mechanism. As illustrated in FIGS. 27A-27D, the spokes and tire of the rear wheel/hub 118' are omitted for the sake of clarity.

The non-rotor side of the rear hub locking mechanism 116' is able to comprise a gearbox through axle 2702, a non-rotor side lock nut 2704, a non-rotor side bearing housing 2706, an axle lock nut 2708, a large bearing 2710, a bearing spacer 2712, a bearing lock ring 2714, a first gearbox bearing 2716, a gearbox wave face axle 2718, a gearbox housing 2720, a gearbox interface gear 2722, a second gearbox bearing 2724 and a gearbox housing lock ring 2726. Alternatively, one or more of the above components are able to be omitted.

Figure 28A:
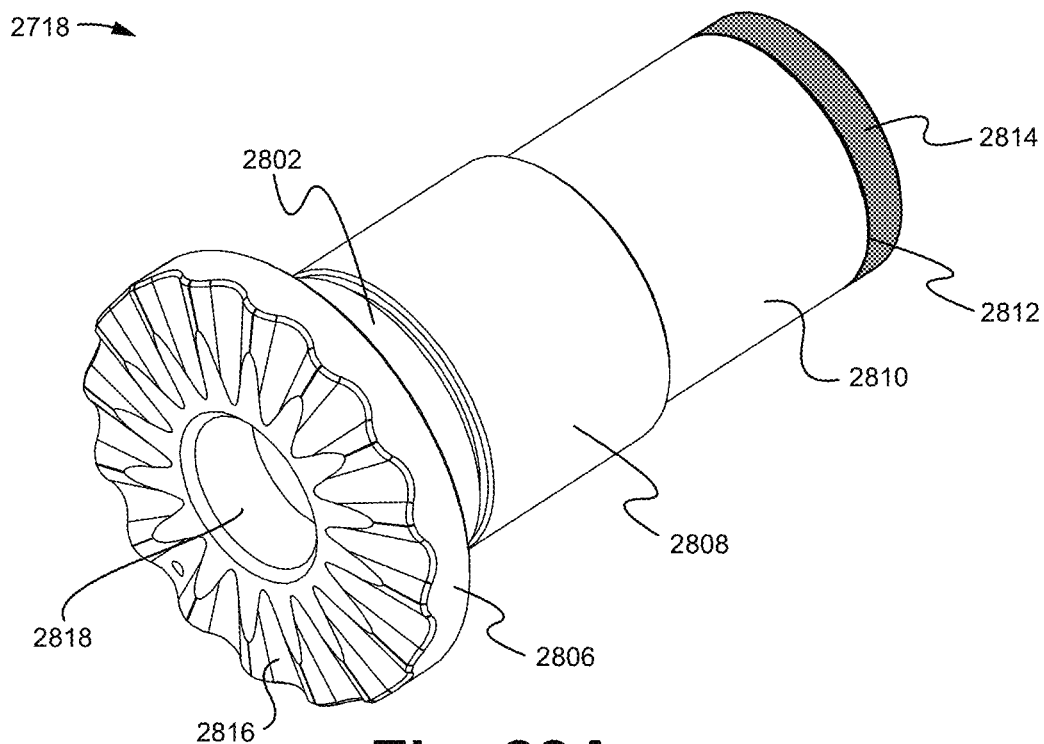
FIGS. 28A, 28B and 28C illustrate inside perspective, outside perspective and side cross-sectional views, respectively, of a gearbox wave face axle according to some embodiments.
Figure 28B:
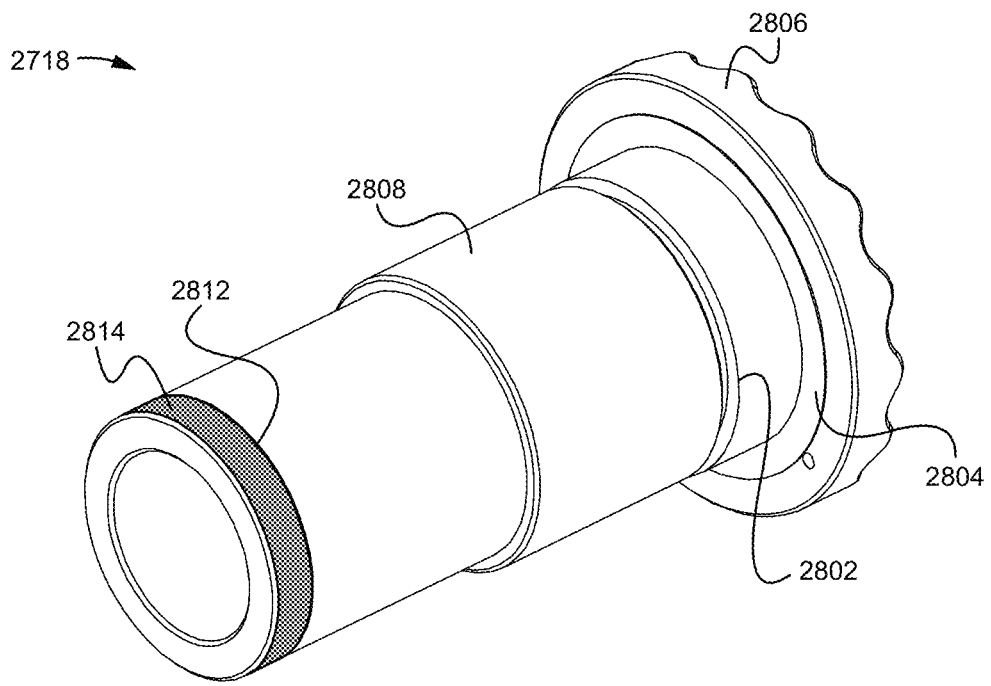
Figure 28C:
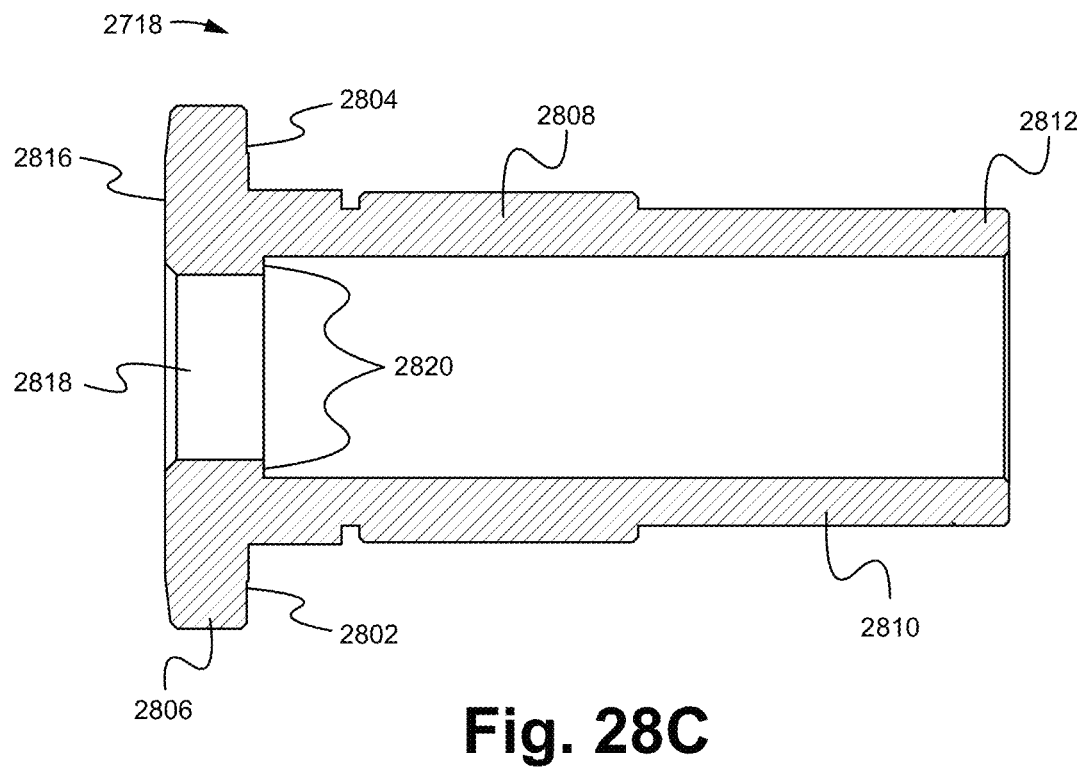
Figure 29A:
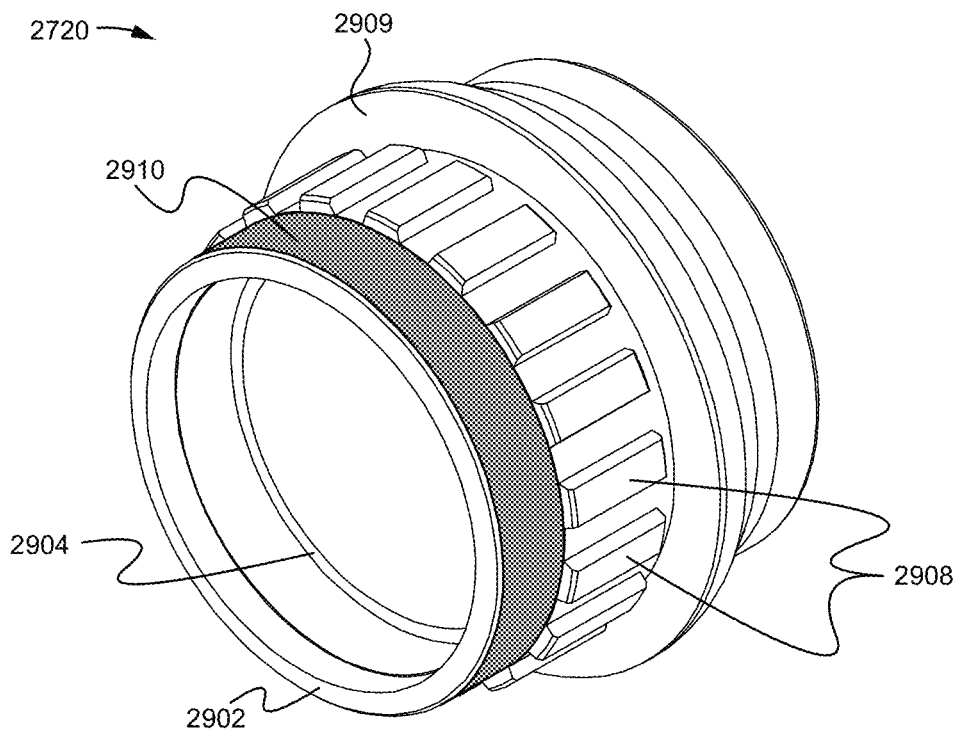
FIGS. 29A, 29B and 29C illustrate inside perspective, outside perspective and side cross-sectional views, respectively, of a gearbox housing according to some embodiments.
Figure 29B:
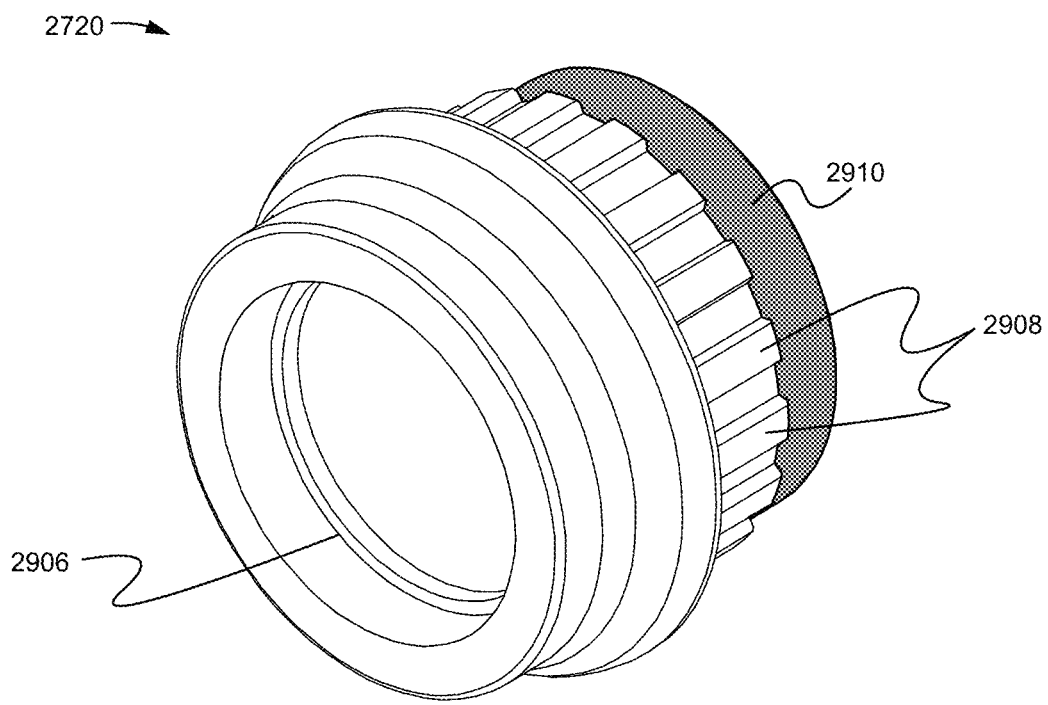
Figure 29C:
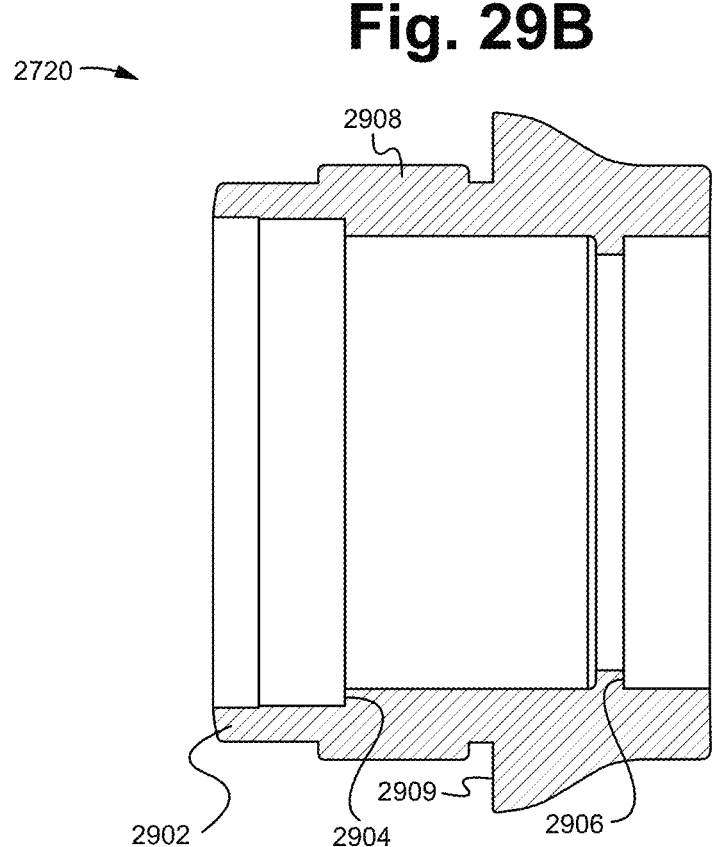
Figure 30A:
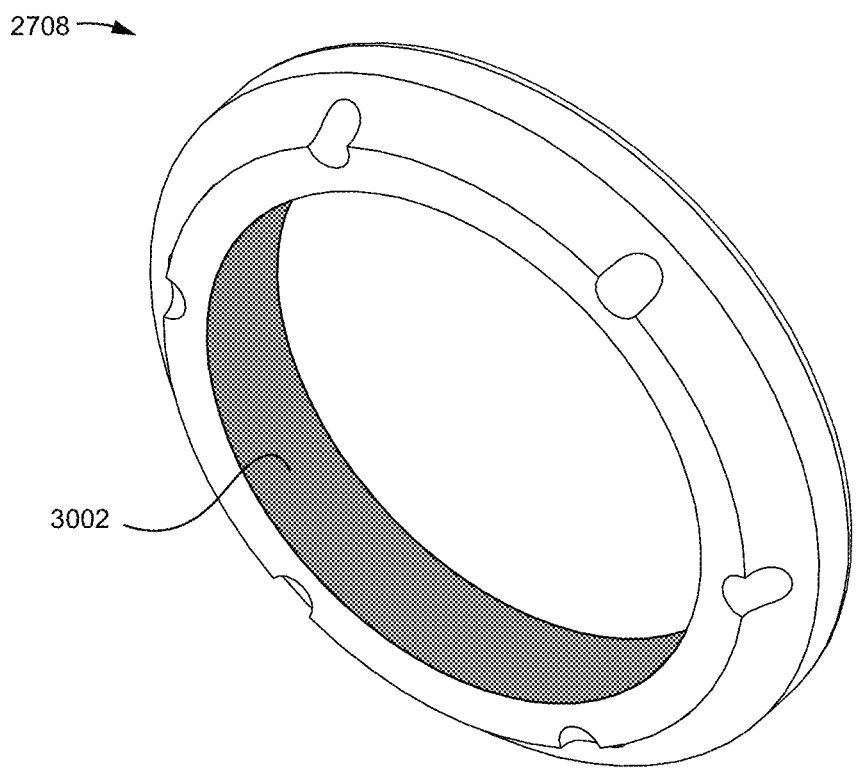
FIGS. 30A and 30B illustrate inside and outside perspective views, respectively, of an axle lock nut according to some embodiments.
Figure 30B:
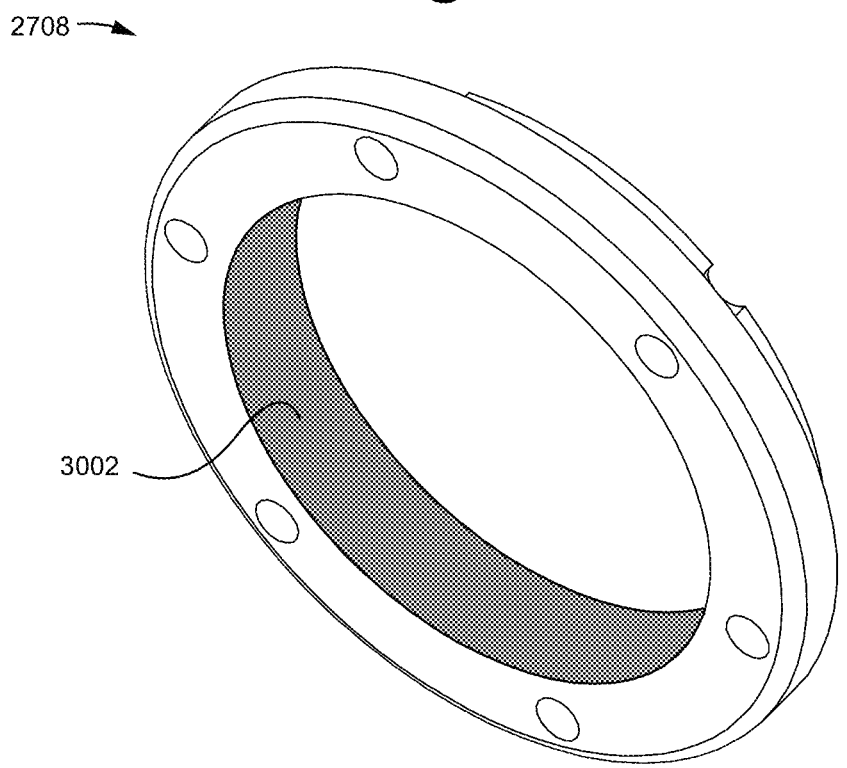

The second gearbox bearing 2724 is positioned around a base 2802 of the gearbox wave face axle 2718 abutting a wall 2804 (see FIGS. 28A-C). The gearbox housing 2720 is positioned around the gearbox wave face axle 2718 such that a bottom rim 2902 of the gearbox housing 2720 (see FIGS. 29A-C) at least partially surrounds a bottom disk 2806 of the wave face axle 1340 and a lower ledge 2904 of the gearbox housing 2720 blocks the second gearbox bearing 2724 from moving away from the wall 2804. The first gearbox bearing 2716 is positioned around an upper ledge 2906 of the gearbox housing 2720 and on top of an interface surface 2808 of a shaft 2810 of the gearbox wave face axle 2718. In some embodiments, the interface surface 2808 is able to be splined or otherwise contoured to rotatably engage with the gearbox housing 2720 (and/or rachet mechanisms within the gearbox housing 2720). The bearing spacer 2712 and the large bearing 2710 are also positioned around the shaft 2810 of the gearbox wave face axle 2718, with the bearing spacer 2712 between the first gearbox bearing 2716 and the large bearing 2710 (e.g. to provide a space between the first gearbox bearing 2716 and the large bearing 2710). The axle lock nut 2708 is threadably coupled to end threads 2814 on the tip 2812 of the gearbox wave face axle 2718 via inner threads 3002 (see FIGS. 30A and 30B). As a result, the axle lock nut 2708 is able to prevent the large bearing 2710, the first gearbox bearing 2716, the second gearbox bearing 2724, the bearing spacer 2712 and the gearbox housing 2720 from sliding off of the shaft 2810 of the gearbox wave face axle 2718.

Figure 32A:
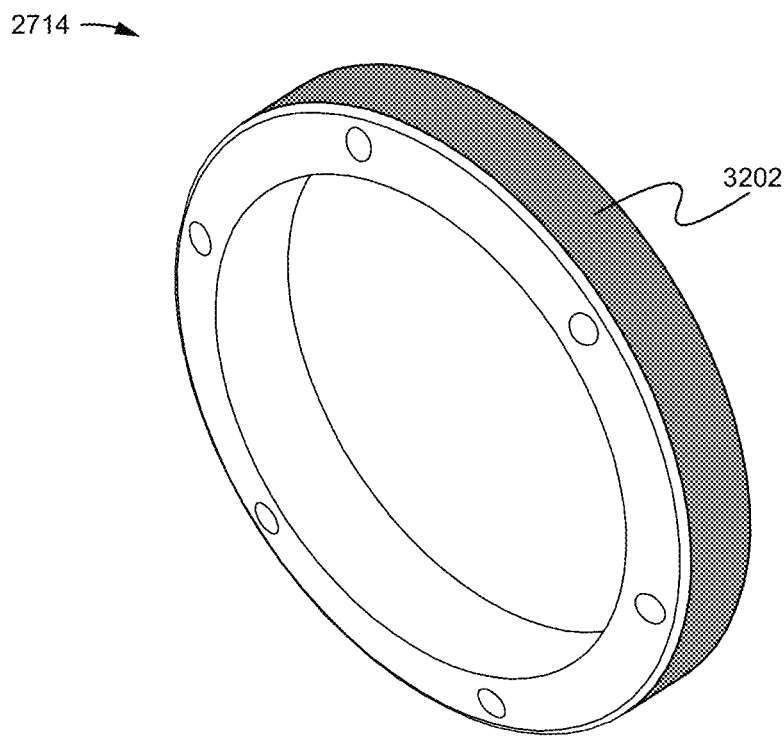
FIGS. 32A and 32B illustrate inside and outside perspective views, respectively, of a bearing lock ring according to some embodiments.
Figure 32B:
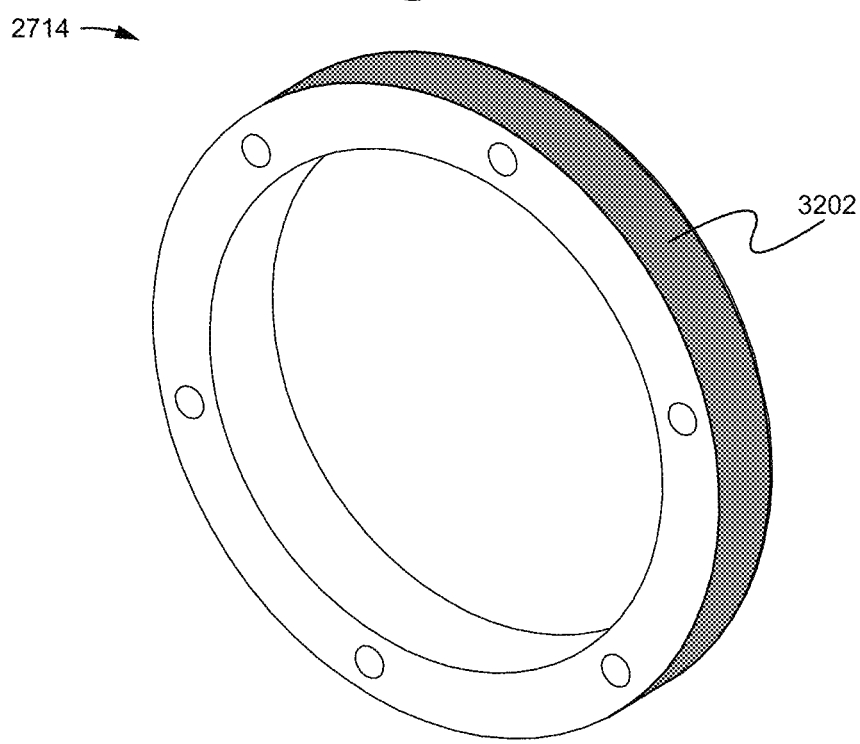
Figure 33A:
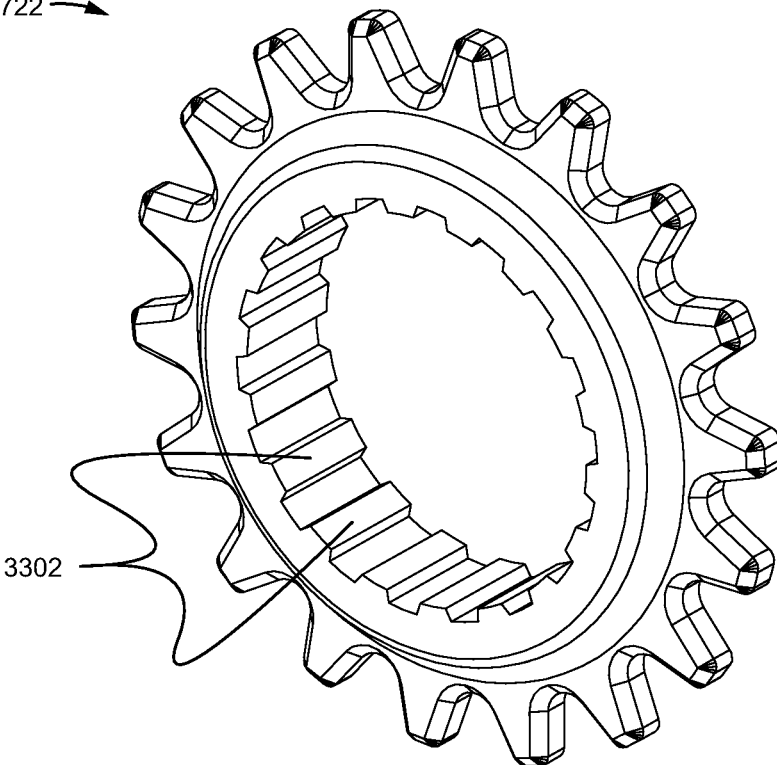
FIGS. 33A and 33B illustrate inside and outside perspective views, respectively, of a gearbox interface gear according to some embodiments.
Figure 33B:
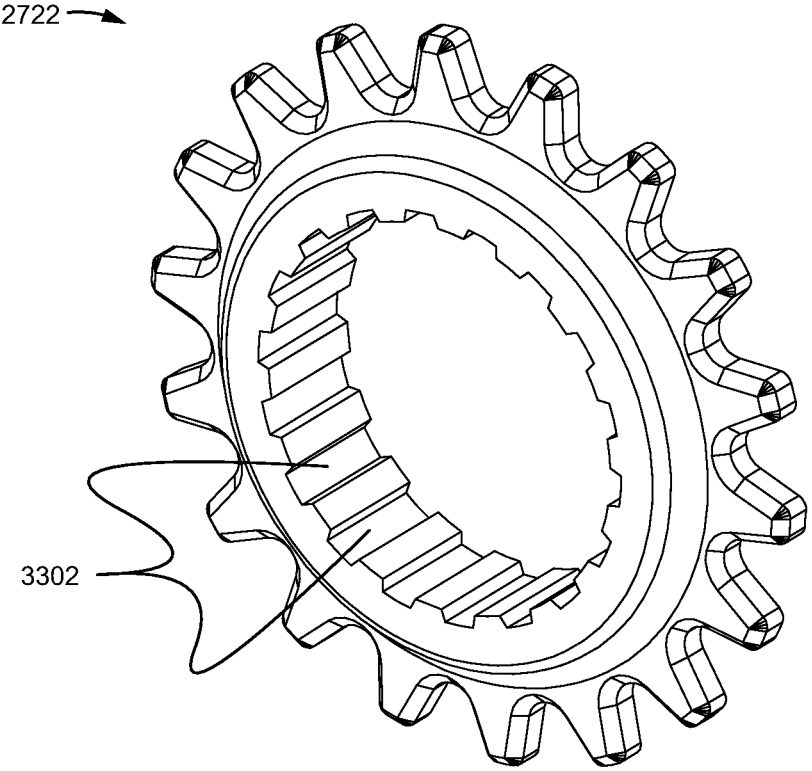

The tip 2812 of the gearbox wave face axle 2718, the axle lock nut 2708 and the large bearing 2710 are all positioned within a cavity 3102 of the non-rotor side bearing housing 2706 (see FIGS. 31A-C). In particular, when positioned within the cavity 3102, the large bearing 2710 is adjacent to a bearing stop wall 3104 and the axle lock nut 2708 is slid within a lock nut channel 3106 of the housing 2706. The bearing lock ring 2714 is positioned around the bearing spacer 2712 and has outer threads 3202 (see FIGS. 32A and 32B) that are able to be threaded into inner threads 3108 of the non-rotor side bearing housing 2706 thereby securing the tip 2812 of the gearbox wave face axle 2718, the axle lock nut 2708 and the large bearing 2710 within the cavity 3102 of the non-rotor side bearing housing 2706. As shown in FIGS. 33A and 33B, the interface gear 2722 has a plurality of inner splines 3302 that correspond to a plurality of outer splines 2908 of the gearbox housing 2720 such that the interface gear 2722 is able to slide onto a perimeter of the gearbox housing 2720 until it reaches a gear stop wall 2909 with the outer splines 2908 interlocked with the inner splines 3302.

Figure 34A:
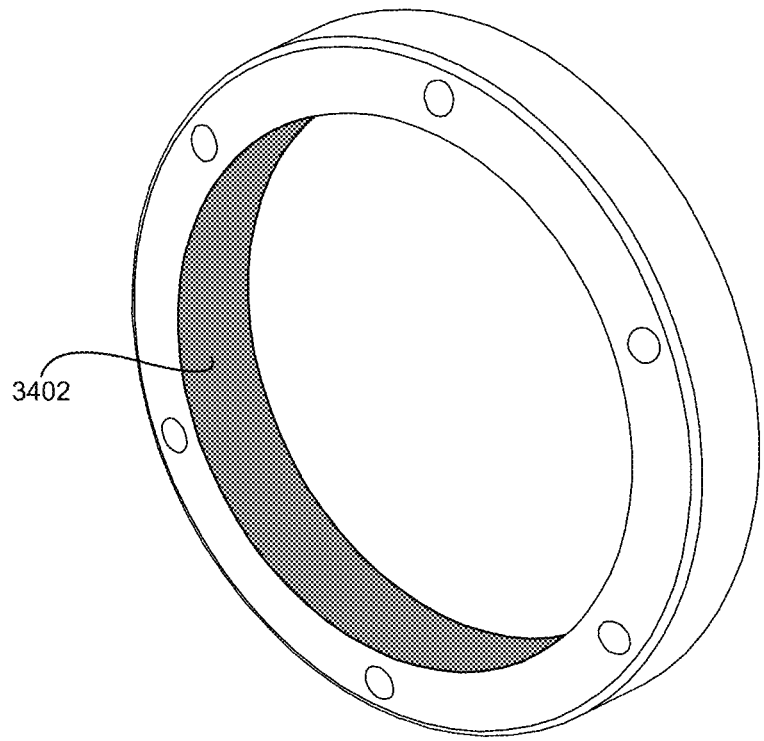
FIGS. 34A and 34B illustrate inside and outside perspective views, respectively, of a gearbox housing lock ring according to some embodiments.
Figure 34B:
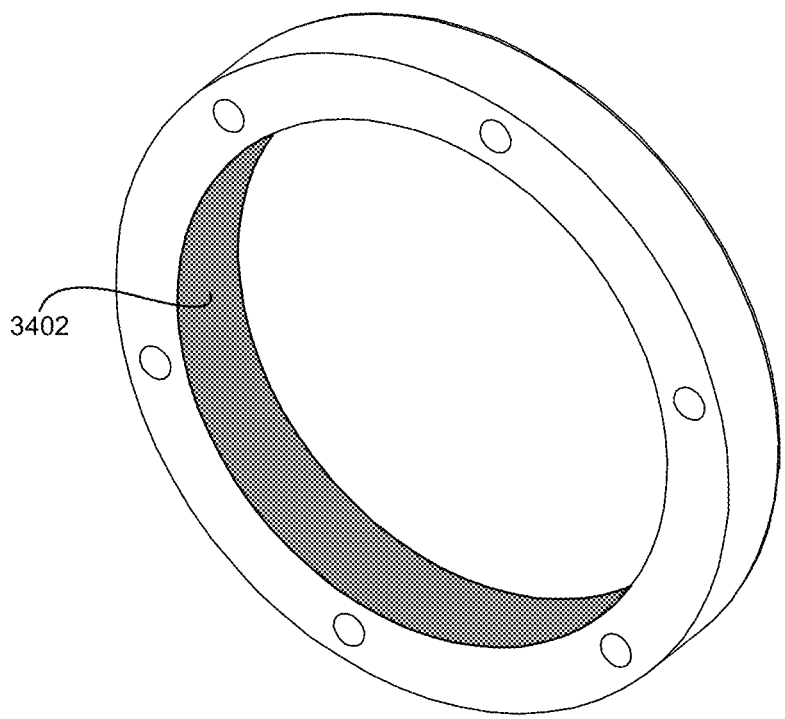

As a result of this interlocking of splines, rotation of the interface gear 2722 will cause matching rotation of the gearbox housing 2720. As shown in FIGS. 34A and 34B, the gearbox housing lock ring 2726 has inner threading 3402 such that the lock ring 2726 is able to be threaded onto outer rim threading 2910 of the gearbox housing 2720 thereby holding the interface gear 2722 against the gear stop wall 2909. In some embodiments, the interface gear 2722 is configured to couple with a gearbox or other drive mechanism of the system 100 via a bicycle chain. Similarly, in some embodiments, the interior of the gearbox housing 2720 is able to include one or more rachet mechanisms (e.g. see FIGS. 37-45) that engage with the interface surface 2808 (e.g. in the form of splines) of the gearbox wave face axle 2718 to enable the gearbox housing 2720 to rotate in a first direction independent of the gearbox wave face axle 2718, but cause the gearbox wave face axle 2718 to receive rotational force from and rotate with the gearbox housing 2720 when the gearbox housing 2720 is rotated in the opposite direction (e.g. via forces imparted to the gearbox housing by the drive mechanism via the interface gear 2722). Indeed, unlike conventional designs where axles are fixed with respect to the frame such that all bearings are being rotated against during pedalling, the gearbox wave face axle 2718 rotates with the gearbox housing 2720 (and the gearbox bearings 2724, 2716 therein) during forward pedalling. As a result, the system provides the advantage of enabling less resistance to the forward pedalling and less wear on the gearbox bearings 2724, 2716.

Figure 35B:
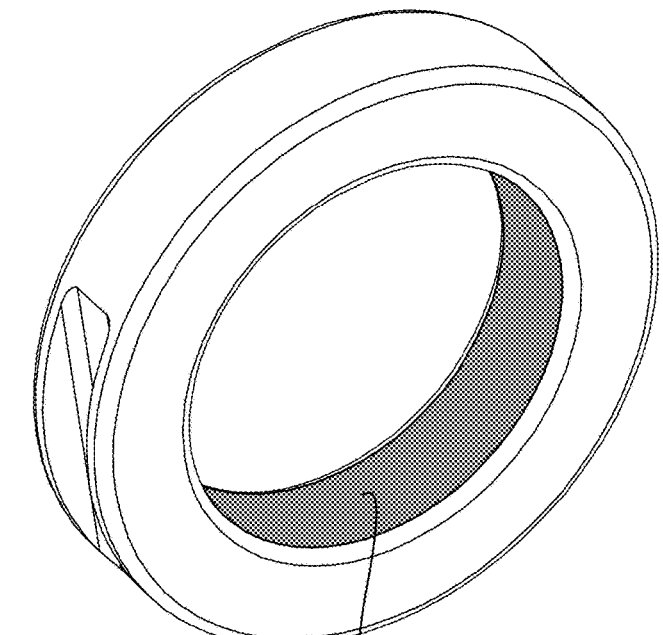
FIGS. 35A and 35B illustrate inside and outside perspective views, respectively, of a non-rotor side lock nut according to some embodiments.
Figure 35A:
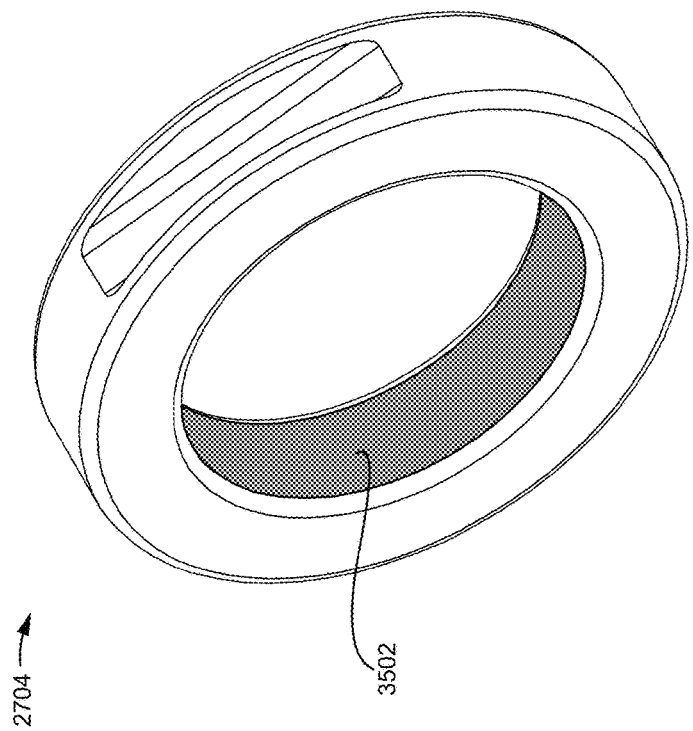

The rear fork end 108 is able to couple to a neck 3110 of the non-rotor side bearing housing 2706. The non-rotor side lock nut 2704 (see FIGS. 35A and 35B) is then able to thread onto external neck threading 3112 of the non-rotor side bearing housing 2706 via threading 3502 in order to secure the rear fork end 108 on the neck 3110.

The protruding splined face 2816 of the gearbox wave face axle 2718 is able to be substantially similar to the protruding splined face 2016 of the wave face axle 1340 described above. The face 2816 is able to radially surrounding a central aperture 2818 and each spline is able to be rounded and radially slant outwardly away from a center of the aperture 2818 such that a height of the spline closest to the aperture 2818 is greater than a height of the spline farthest from the aperture 2818. The angle, size and/or shape of the splined face 2816 is able to correspond to (and/or be congruent with) the recessed splined surface of the non-rotor side flange. In particular, the recessed splined surface of the non-rotor side flange is able to also be rounded, but instead radially slant inwardly toward a central opening such that when pressed against each other, the splines of the splined face 2816 fit within the gaps between the splines of the recessed splined surface of the non-rotor side flange and vice versa. As described above, due to their radial formation, rounded edges and corresponding inward/outward angles, even when misaligned, compression of the splined faces against each other causes the faces (and thus the hub 118' and locking mechanism 116') to slide along the rounded edges and/or angles into proper alignment. Thus, the protruding splined face 2816 provides the benefit of enabling easy alignment of the two faces when changing a tire/hub.

Figure 36:
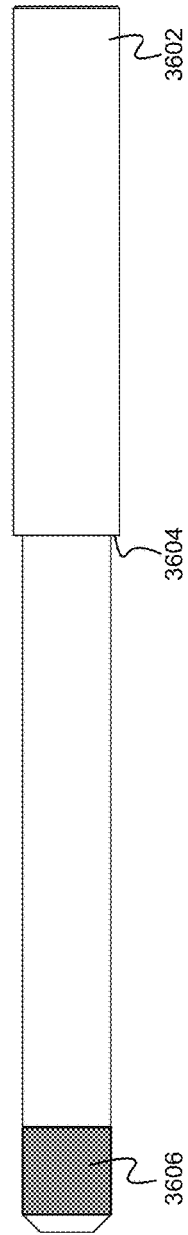
FIG. 36 illustrates a side view of a gearbox through axle according to some embodiments.

The through axle 2702 (see FIG. 36) is able to extend through central shafts of the gearbox wave face axle 2718, the flanges and the hollow tube and threadably couple to internal threads of the rear hub bearing/housing rotor mount via end threads 3606 of the through axle 2702. In particular, as the axle 2702 is further threaded into the bearing/housing rotor mount, a head 3602 of the through axle 2702 approaches the tip of the non-rotor side bearing housing 2706 and a lip 3604 of the through axle 2702 eventually contacts an inner wall 2820 of the gearbox wave face axle 2718. As a result, as the through axle 2702 is even further threaded into the bearing/housing rotor mount, a splined face of the rotor mount is compressed against the splined face of the rotor side flange and the splined face 2816 of the gearbox wave face axle 2718 is compressed against the splined face of the non-rotor side flange. These compression forces cause the hub 118 to be fixed between the gearbox wave face axle 2718 and the bearing housing/rotor mount. Conversely, as the through axle 2702 is unscrewed, the compression forces are subsided and the hub 118' is able to be removed from between the wave face axle 2718 and the bearing housing/rotor mount (e.g. during a tire change process). In some embodiments, the lip 3604 is created by a discrete reduction in radius of the through axle 2702 about its central axis such that an upper portion before the lip 3604 (including the head 3602) has a larger radius than a lower portion of the through axle 2702 after the lip 3604. Alternatively, the through axle 2702 is able to have the same or substantially similar radius immediately before and after the lip 3604, with the lip 3604 constituting a portion having a discrete increase in radius than the portions immediately before and after the lip 3604.

In operation, like with the front hub assembly 106, a current wheel/hub 118' is able to removed from the locking mechanism 116' by unscrewing and removing the through axle 2702 thereby releasing the compression between the splined surfaces of the flanges and the splined surfaces of the locking mechanism 116'. As a result, the unwanted wheel/hub 118' is able to be pulled out from between the splined surfaces and replaced with a new wheel/hub 118' at least semi-aligned between the splined surfaces of the locking mechanism 116'. The through axle 2702 is then able to be reinserted and screwed into the bearing/housing rotor mount. As the through axle 2702 is further threaded into bearing/housing rotor mount, the splined surfaces are pushed against the outer recessed splined faces of the flanges, which causes the hub 118' to be fixed between the bearing/housing rotor mount and the gearbox wave face axle 2718. When pulled up tight the wheel/hub 118' and the two sides of the locking mechanism 116' are able to act like a single rigid component capable of safely holding the wheel/hub 118' in place while the bike is in use. Additionally, like with the front hub assembly 106, due to the arrangement of the bearings 2710, 2716, 2724 and the through axle 2702, when the through axle 2702 is tightened no side loading is exerted onto the bearings 2710, 2716, 2724. Instead, the through axle 2702 only pulls the two sets of splined faces together and does not need to carry any of the transverse load exerted on the hub/wheel 118' by the weight of the rider and the riding conditions. Again, because the splines are radially projected towards a center point, when they are engaged they are both self-centering and when tightened together, they are able to withstand the required transverse loading exerted on the hub 118' (so the through axle 2702 does not need to). As a result, the system 100 provides the benefit of not needing wheel bearings in the central hub 118' itself, but instead having all the forces transferred through the engaging splined faces to the bearings 2710, 2716, 2724.

After the coupling is complete, the bearings 2710, 2716, 2724 enable the through axle 2702, the axle lock nut 2708, the bearing spacer 2712, the gearbox wave face axle 2718, the gearbox housing 2720, the gearbox interface gear 2722, the gearbox housing lock ring 2726 and/or the rear hub bearing housing/rotor mount to all rotate together as the rear hub/wheel 118' rotates. In other words, when the wheel/hub 118' rotates (e.g. due to the drive mechanism causing the gearbox housing 2720 to rotate in a drive direction) so will the through axle 2702 unlike a traditional through axle that remains stationary. The non-rotor side lock nut 2704, the non-rotor side bearing housing 2706 and/or the bearing lock ring 2714 are affixed to one of the rear fork ends 108 of the frame 102 and thus do not rotate with the hub 118'. Similarly, the rotor side lock bolt, the rotor side spacer and the rotor side bearing axle are affixed to the other one of the rear fork ends 108 of the frame 102 and do not rotate with the hub 118'.

Ratchet Mechanism

Figure 37A:
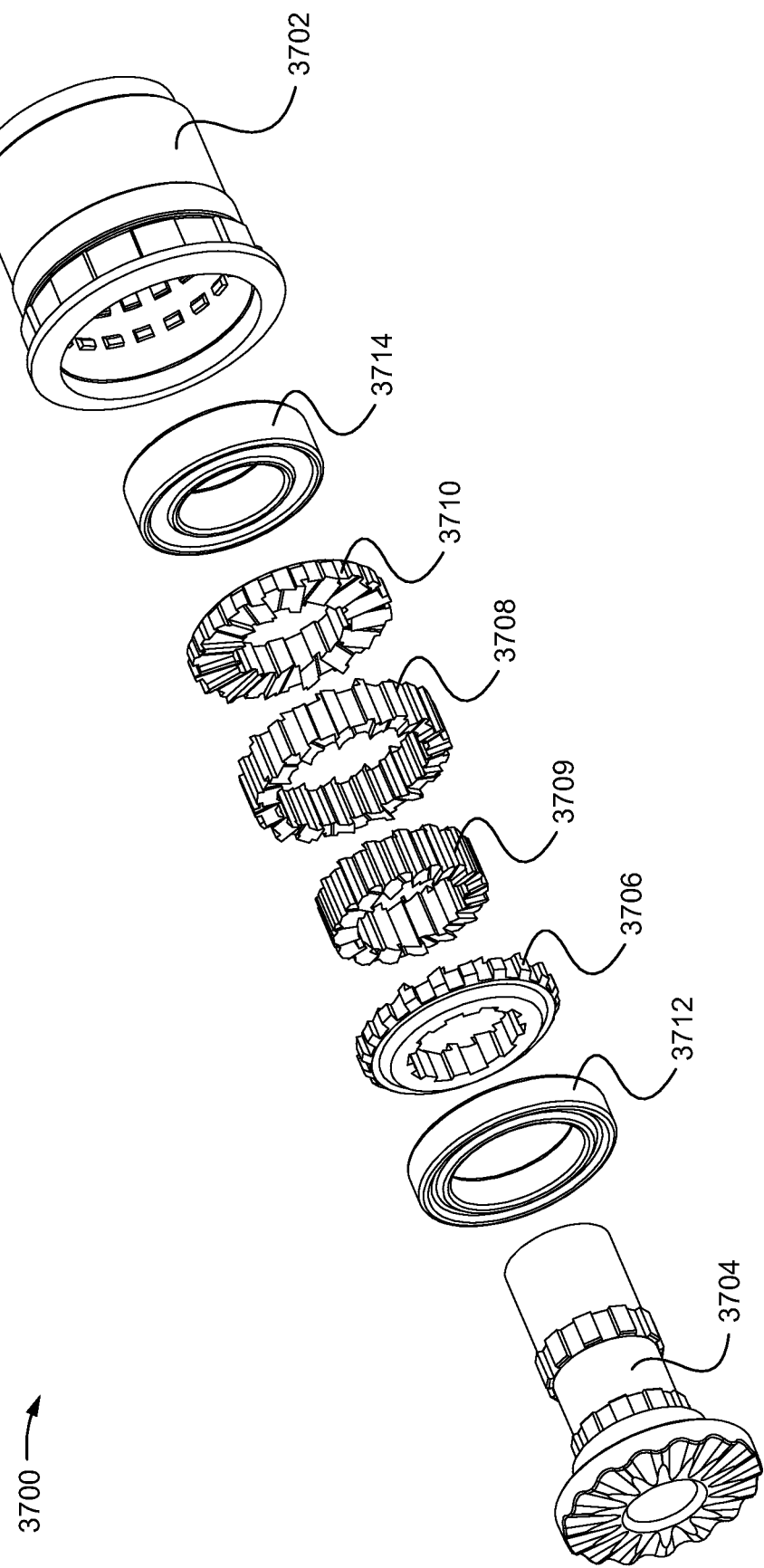
FIGS. 37A, 37B and 37C illustrate exploded perspective, side and side cross-sectional views, respectively, of a ratchet mechanism according to some embodiments.
Figure 37B:
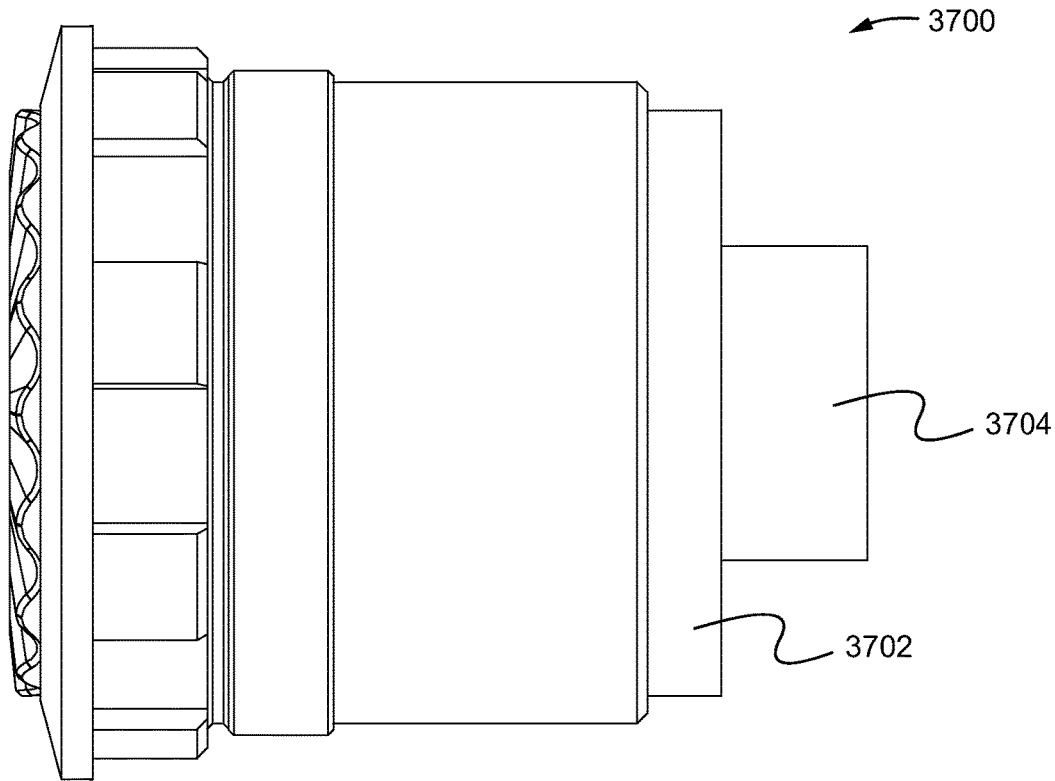
Figure 37C:
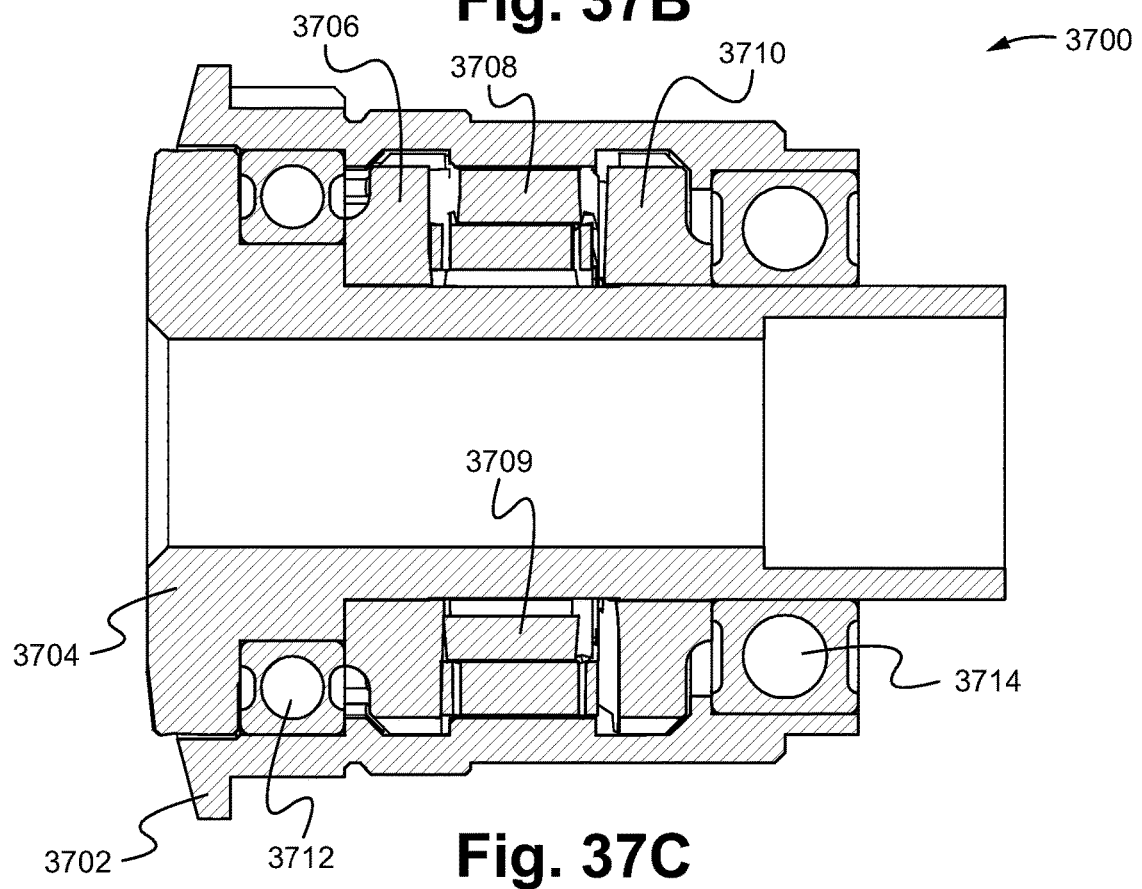

FIGS. 37A, 37B and 37C illustrate exploded perspective, side and side cross-sectional views, respectively, of a ratchet mechanism 3700 according to some embodiments. This ratchet mechanism 3700 is able to be incorporated into any of the rear hub assemblies described herein (with the inside of freewheel/gearbox housing 1336, 2720 and the portions of the wave face axles 1340, 2718 corresponding to the ratchet mechanism 3700 and the outside of the freewheel/gearbox housing 1336, 2720 being the same so as to couple to the desired drive mechanism). As shown in FIGS. 37A, 37B and 37C, the ratchet mechanism 3700 comprises a ratchet housing 3702, a ratchet wave face axle 3704, a first unidirectional gear 3706, an outer ratchet gear 3708, an inner ratchet gear 3709, a second unidirectional gear 3710, a first ratchet bearing 3712 and a second ratchet bearing 3714. The ratchet housing 3702 is able to be substantially similar to the freewheel housing 1336 and the ratchet wave face axle 3704 is able to be substantially similar to the wave face axle 1340 except for the differences described herein.

The first ratchet bearing 3712 is positioned around a base 3802 of the ratchet wave face axle 3704 adjacent a stop wall 3804 (see FIGS. 38A-C). The first unidirectional gear 3706 is positioned around a shaft 3810 of the ratchet wave face axle 3704 with inner gear splines 4002 of the gear 3706 sliding between a first set of ratchet splines 3806 of the ratchet wave face axle 3704 adjacent to the base 3802. Similarly, the second unidirectional gear 3710 is positioned around the shaft 3810 of the ratchet wave face axle 3704 with inner gear splines 4102 of the gear 3710 sliding between a second set of ratchet splines 3808 of the ratchet wave face axle 3704. The second ratchet bearing 3714 is positioned around the shaft 3810 of the ratchet wave face axle 3704 adjacent to the second set of ratchet splines 3808 and the second unidirectional gear 3710. As a result, rotation of one or both of the unidirectional gears 3706, 3710 causes the ratchet wave face axle 3704 to similarly rotate and vice versa.

The inner ratchet gear 3709 is positioned around the shaft 3810 of the ratchet wave face axle 3704 between the first unidirectional gear 3706 and the second unidirectional gear 3710. In particular, the inner ratchet gear 3709 is able to have internal splines 4302 that enable the gear 3709 to get by the second set of ratchet splines 3808 when sliding onto the shaft 3810. The outer ratchet gear 3708 is positioned around the inner ratchet gear 3709 with an inner ridges 4202 of the outer ratchet gear 3708 fitting within outer trenches 4304 of the inner ratchet gear 3709. Alternatively, in some embodiments the inner ratchet gear 3709 and the outer ratchet gear 3708 are able to be combined into a single contiguous gear having the features of both gears 3708 and 3709.

Figure 39A:
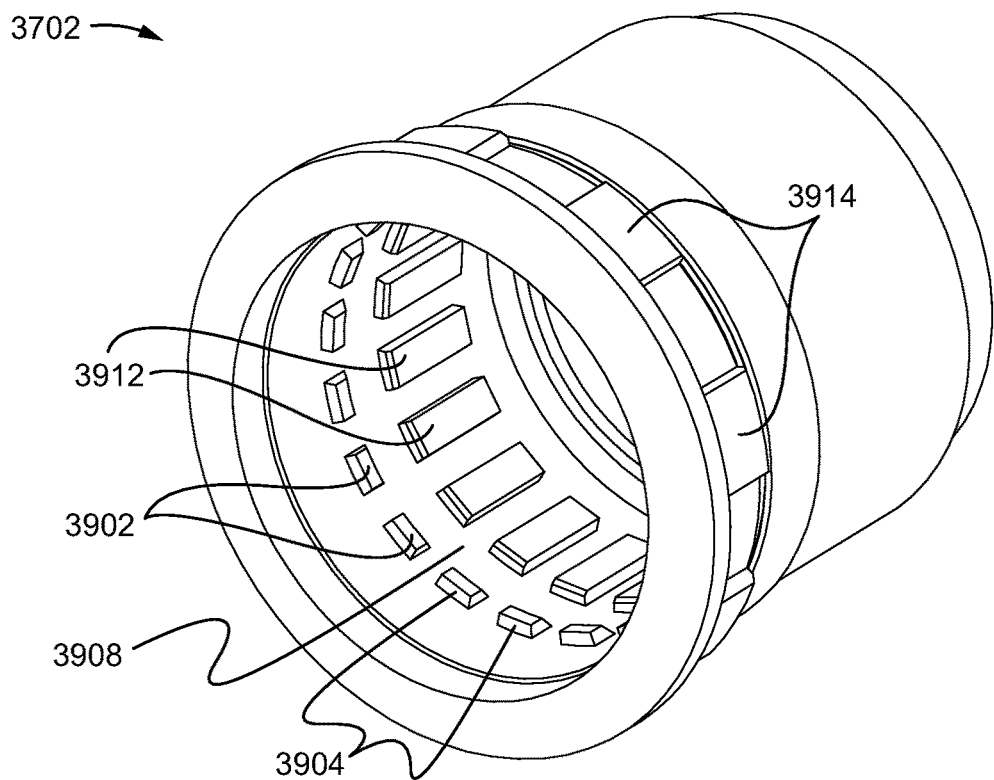
FIGS. 39A, 39B and 39C illustrate inside perspective, outside perspective and side cross-sectional views, respectively, of a ratchet housing according to some embodiments.
Figure 39B:
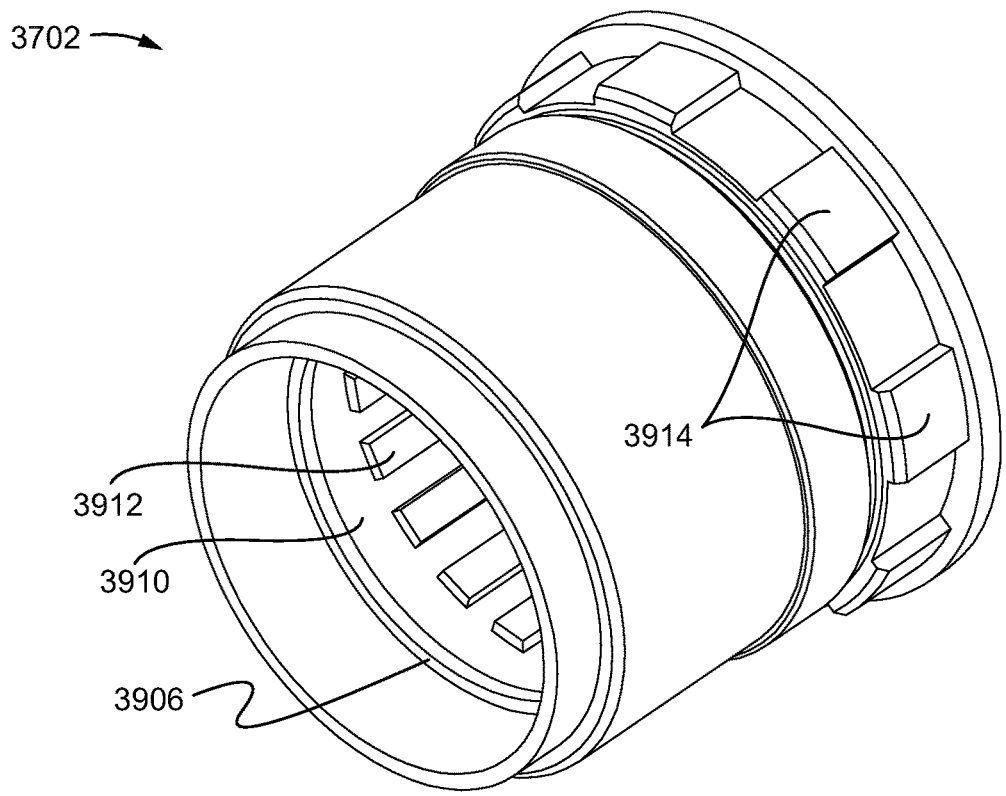
Figure 39C:
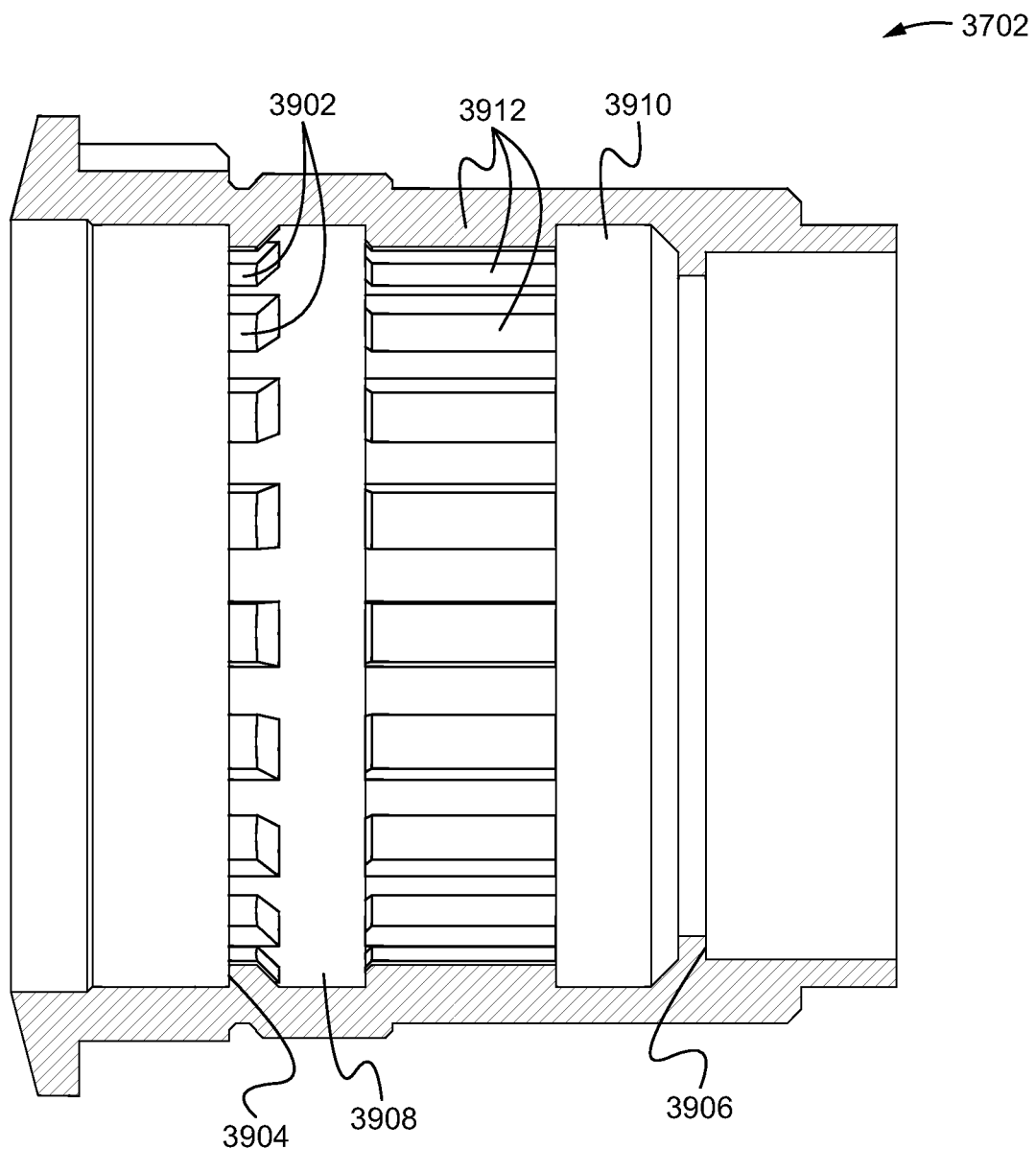

The ratchet housing 3702 is positioned around the first unidirectional gear 3706, the outer ratchet gear 3708, the inner ratchet gear 3709, the second unidirectional gear 3710, the first ratchet bearing 3712 and the second ratchet bearing 3714. Specifically, the ratchet housing 3702 comprises a set of skinny splines 3902 that together form a discontinuous rim 3904 that holds the first ratchet bearing 3712 against the stop wall 3804. Similarly, the ratchet housing 3702 has a continuous rim 3906 that separates the second unidirectional gear 3710 from the second ratchet bearing 3714. The freewheel housing also includes a first channel 3908 for receiving the first unidirectional gear 3706 and a second channel 3910 for receiving the second unidirectional gear 3710. Between the channels 3908, 3910, the ratchet housing 3702 includes a plurality of thick splines 3912 that complement the outer splines 4204 of the outer ratchet gear 3708 such that when the ratchet housing 3702 is positioned around the outer ratchet gear 3708, the thick splines 3912 are positioned between the outer splines 4204. As a result, rotation of the ratchet housing 3702 causes the outer ratchet gear 3708 (and the inner ratchet gear 3709) to similarly rotate. As shown in FIGS. 39A-39C, the outer surface of the ratchet housing 3702 is able to include outer housing splines 3914 that are configured to couple with a gear cluster/cassette to be coupled to the housing 3702 as a part of the drive mechanism of the system 100. Alternatively, the outside of the housing 3702 is able to be substantially similar to the outside of the gearbox housing 2720 to facilitate coupling with a single speed or gearbox drive mechanism of the system 100. In any case, the coupling of the drive mechanism with the outer surface of the ratchet housing 3702 causes the ratchet housing 3702 (and the inner and outer ratchet gears 3708, 3709) to be rotated by the drive mechanism (e.g. due to pedalling of and/or operation of an electric motor of the bicycle).

Figure 40D:
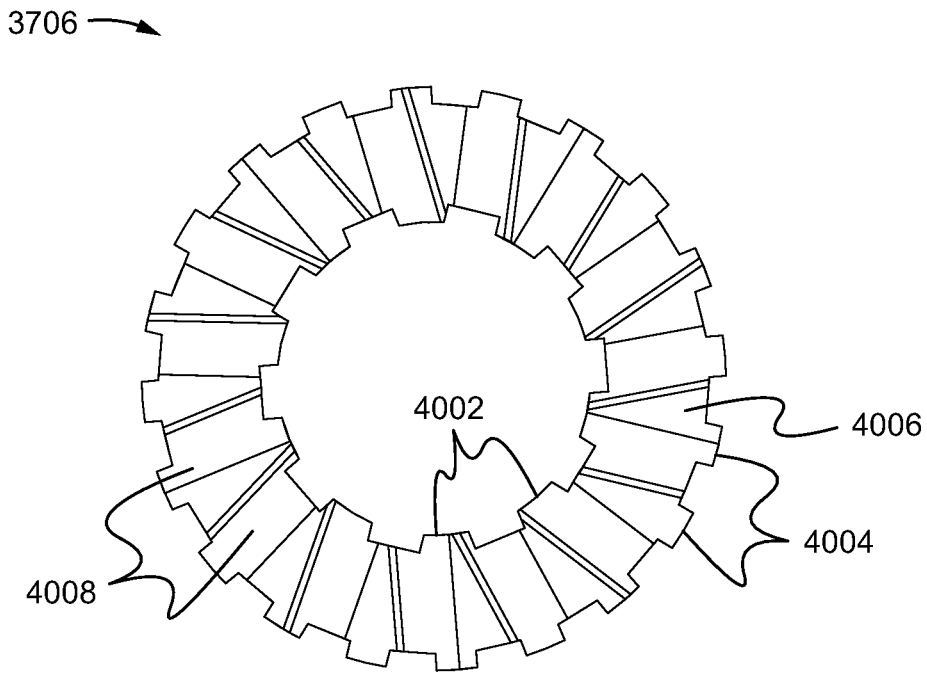
Figure 40E:
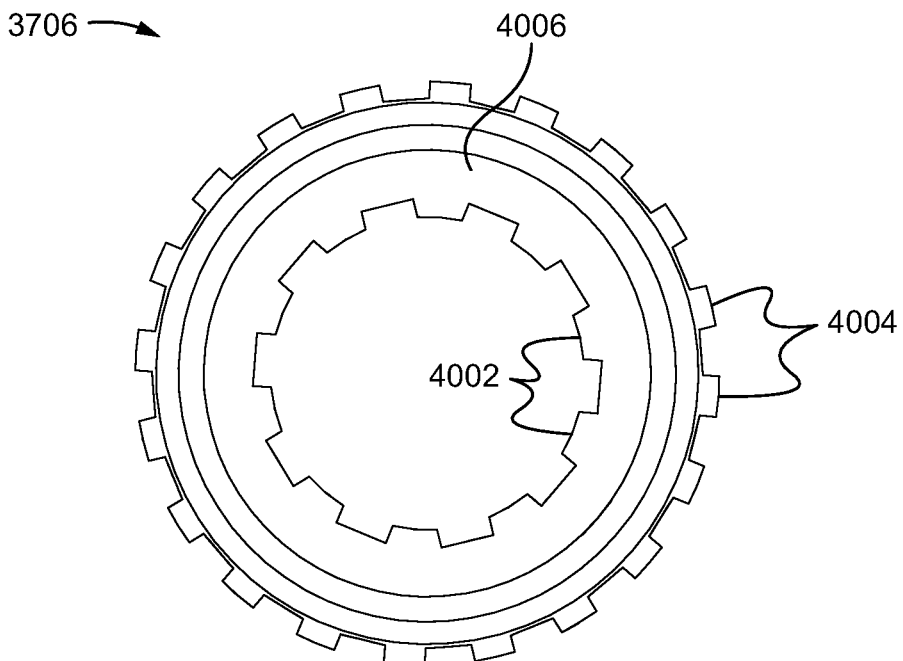

Now looking at the first and second unidirectional gears 3706, 3710, in addition to their inner splines 4002, 4102, the each have a plurality of outer splines 4004, 4104 that protrude from their ring bodies 4006, 4106 and enable the unidirectional gears 3706, 3710 to slide past the skinny and thick splines 3902, 3912 of the housing 3702 in order to be positioned within the channels 3908, 3910. As shown in FIGS. 40B and 40D, the first unidirectional gear 3706 includes a plurality of first teeth or ramps 4008 that protrude from the body 4006 and increase in thickness from a bottom to a top of the ramp 4008. As shown in FIG. 40D, for the first unidirectional gear 3706 the ramps 4008 angle upwards in a counter clockwise direction around the ring body 4006. Further, as shown in FIGS. 40A-40D, in portions where the ramps 4008 overlap with (or are adjacent to) the inner or outer splines 4002, 4004, the ramps 4008 extend over the splines 4002, 4004 (such that ramps 4008 in those locations are wider than ramps 4008 that do not overlap with one or both of the inner and outer splines 4002, 4004).

Figure 41A:
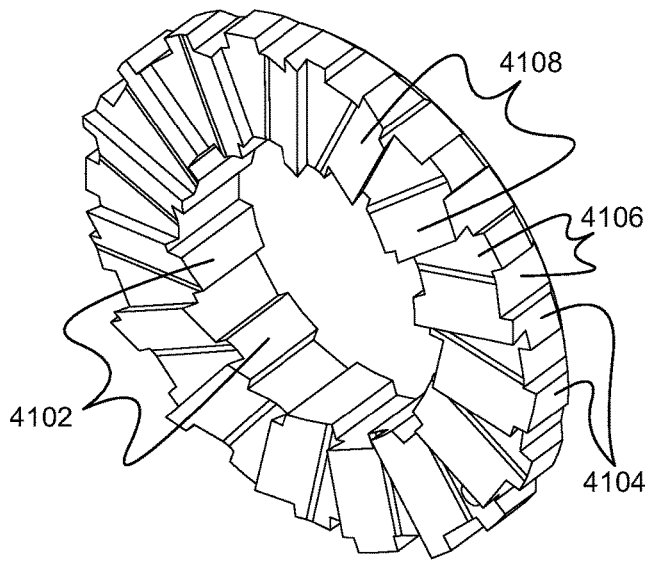
FIGS. 41A, 41B, 41C, 41D and 41E illustrate inside perspective, outside perspective, side, inside and outside views, respectively, of a second unidirectional gear according to some embodiments.
Figure 41B:
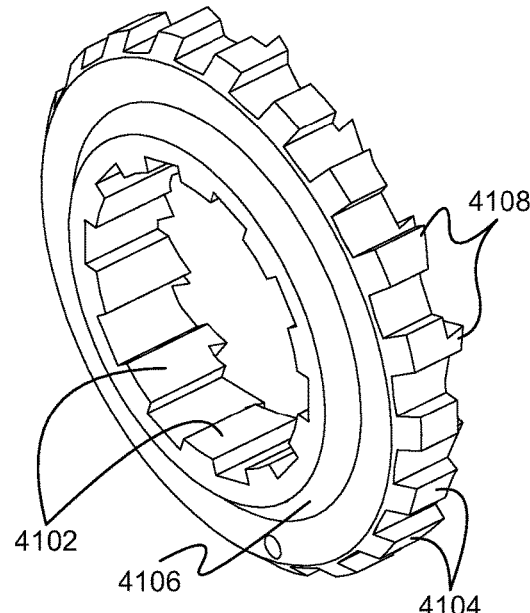
Figure 41C:
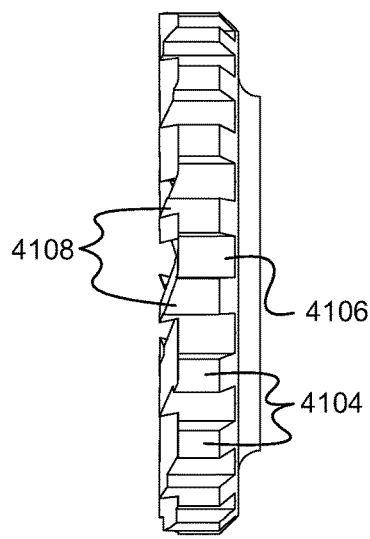
Figure 41D:
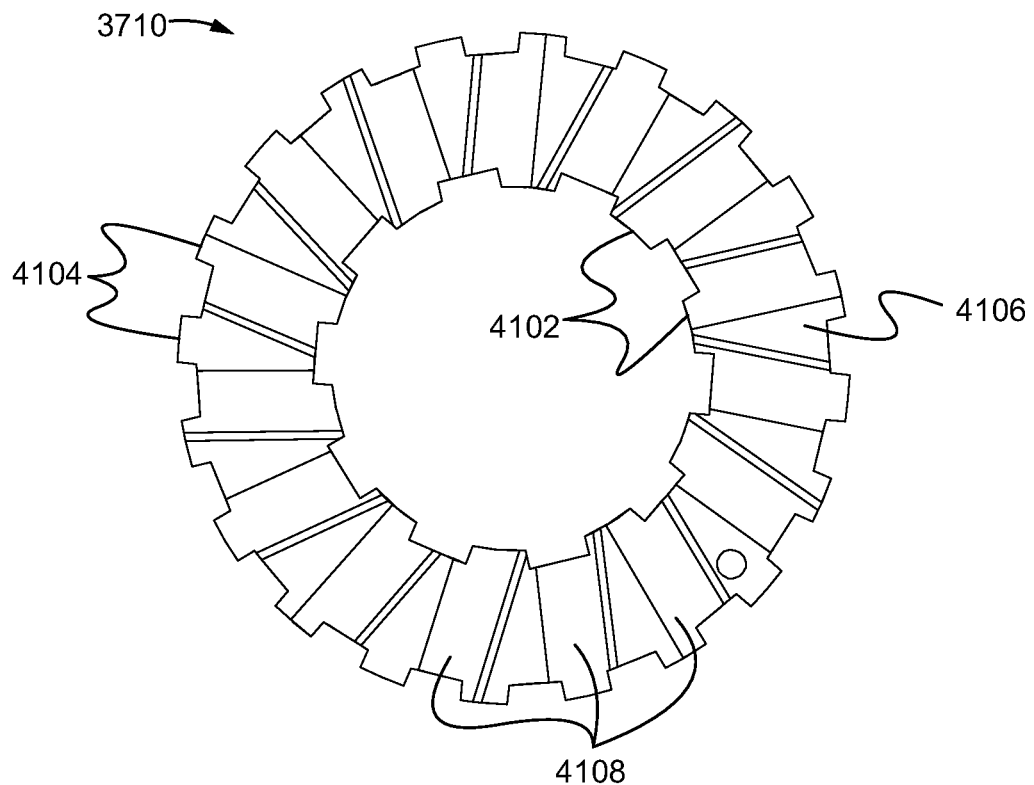
Figure 41E:
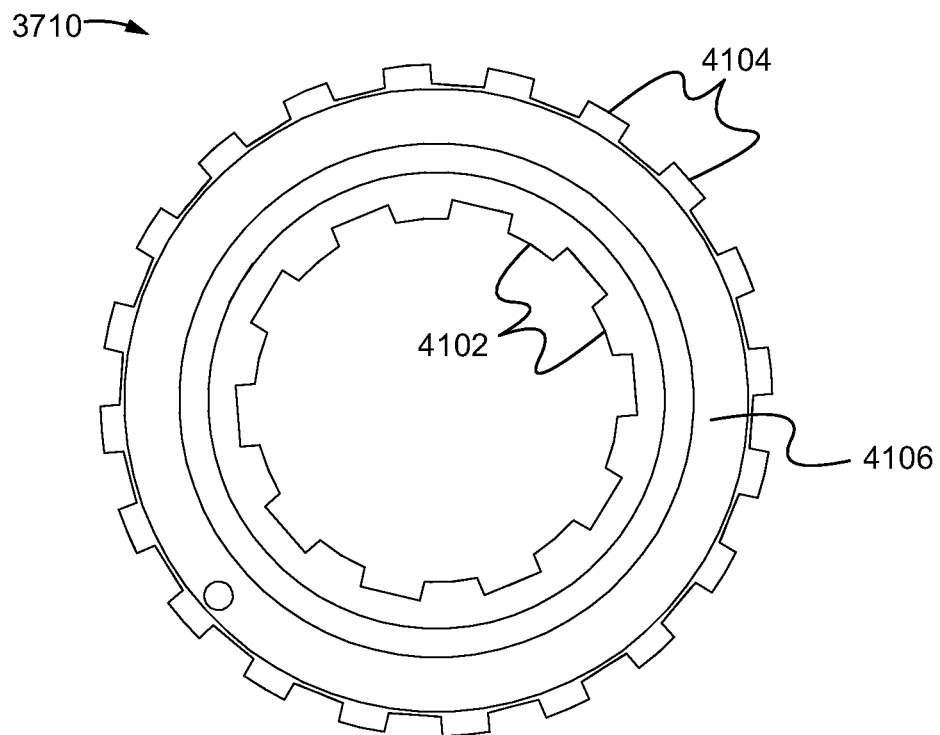

Similarly, as shown in FIGS. 41B and 41D, the second unidirectional gear 3710 includes a plurality of first gear teeth or ramps 4108 that protrude from the body 4106 and increase in thickness from a bottom to a top of the gear ramp 4108. As shown in FIG. 41D, for the second unidirectional gear 3710 (unlike the first unidirectional gear 3706) the gear ramps 4108 angle upwards in a clockwise direction around the ring body 4106. Further, as shown in FIGS. 41A-41D, in portions where the gear ramps 4108 overlap with (or are adjacent to) the inner or outer splines 4102, 4104, the gear ramps 4108 extend over the splines 4102, 4104 (such that gear ramps 4108 in those locations are wider than gear ramps 4108 that do not overlap with one or both of the inner and outer splines 4102, 4104).

Figure 44A:
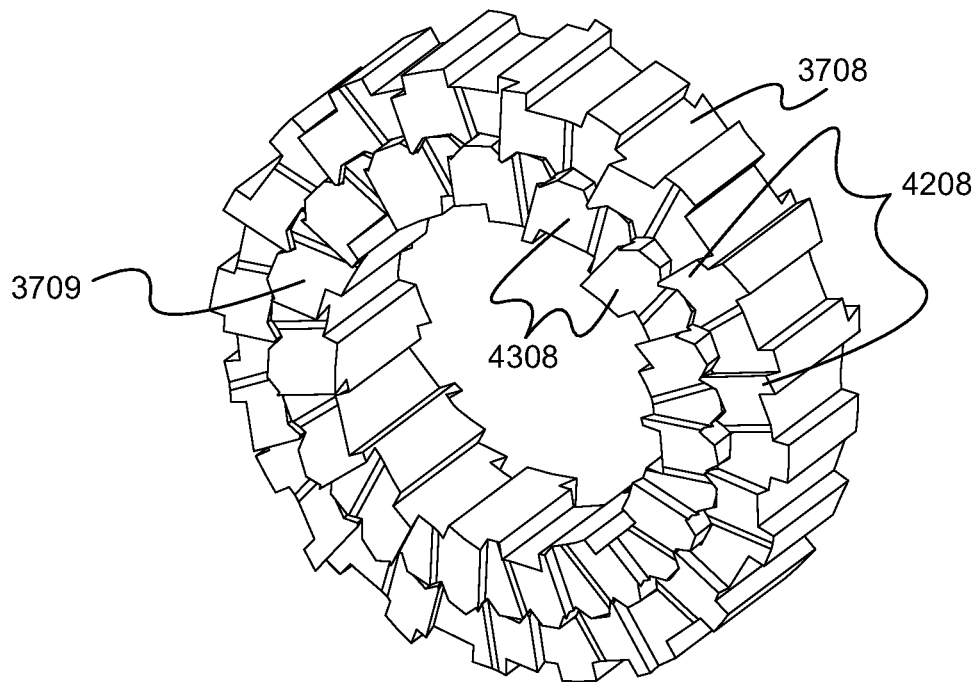
FIGS. 44A and 44B illustrate inside perspective and inside views, respectively, of the outer and inner ratchet gears as aligned in the ratchet housing according to some embodiments.
Figure 44B:
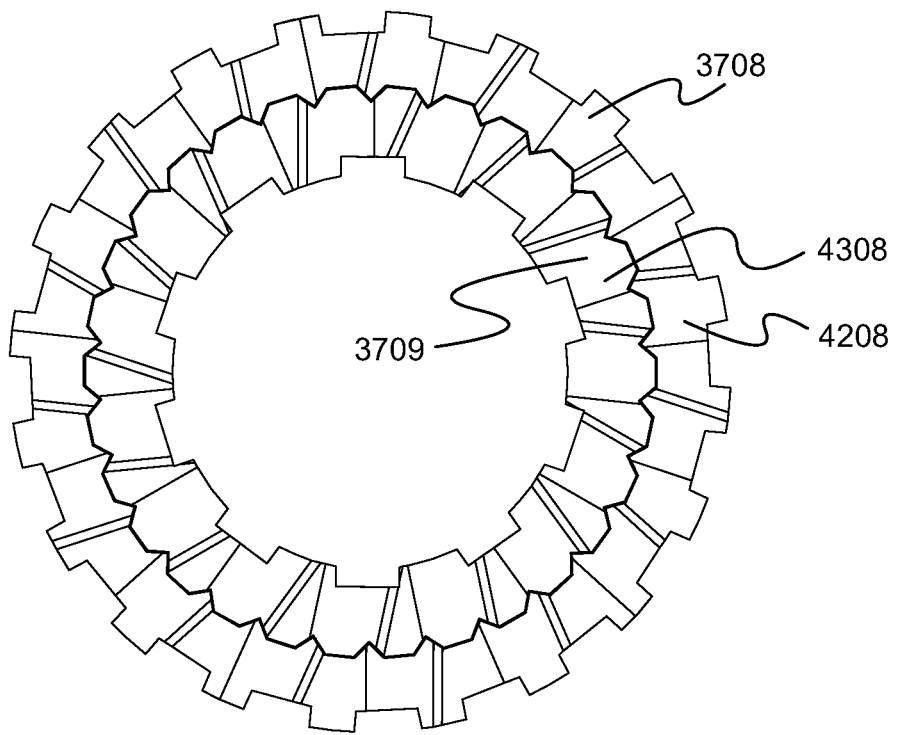

As shown in FIGS. 42A-42C and 43A-43C, the inner and outer ratchet gears 3708, 3709 include a plurality of inner and outer ratchet teeth or ramps 4208, 4308 that protrude from both sides of the inner and outer ratchet gear bodies 4206, 4306 and increase in thickness from a bottom to a top of the ratchet ramp 4208, 4308. As shown in FIGS. 42A and 43A, the ratchet ramps 4208, 4308 angle upwards in a clockwise direction around a first side of the ratchet bodies 4206, 4306 and angle upwards in a counter-clockwise direction around a second side of the ratchet bodies 4206, 4306 (opposite the first side). Further, as shown in FIGS. 42A-42C and 43A-43C, in portions where the ratchet ramps 4208, 4308 overlap with (or are adjacent to) the outer splines 4202, the inner ridges 4204, the inner splines 4302 and/or the outer trenches 4304, the ratchet ramps 4208, 4308 extend over the splines/ridges/trenches 4202, 4204, 4302, 4304 (such that ratchet ramps 4208, 4308 in those locations are wider than ratchet ramps 4208, 4308 that do not overlap with one or both of the splines/ridges/trenches 4202, 4204, 4302, 4304). Finally, as shown in FIGS. 44A and 44B, when the inner ratchet gear 3709 is positioned within the outer ratchet gear 3708, the ratchet ramps 4208 of the outer ratchet gear 3708 are able to be offset from the ratchet ramps 4209 of the outer ratchet gear 3709. Alternatively, the ratchet ramps 4208, 4308 of the inner and outer ratchet gears 3708, 3709 are able to be aligned such that together they form a wider ratchet ramps.

Figure 45A:
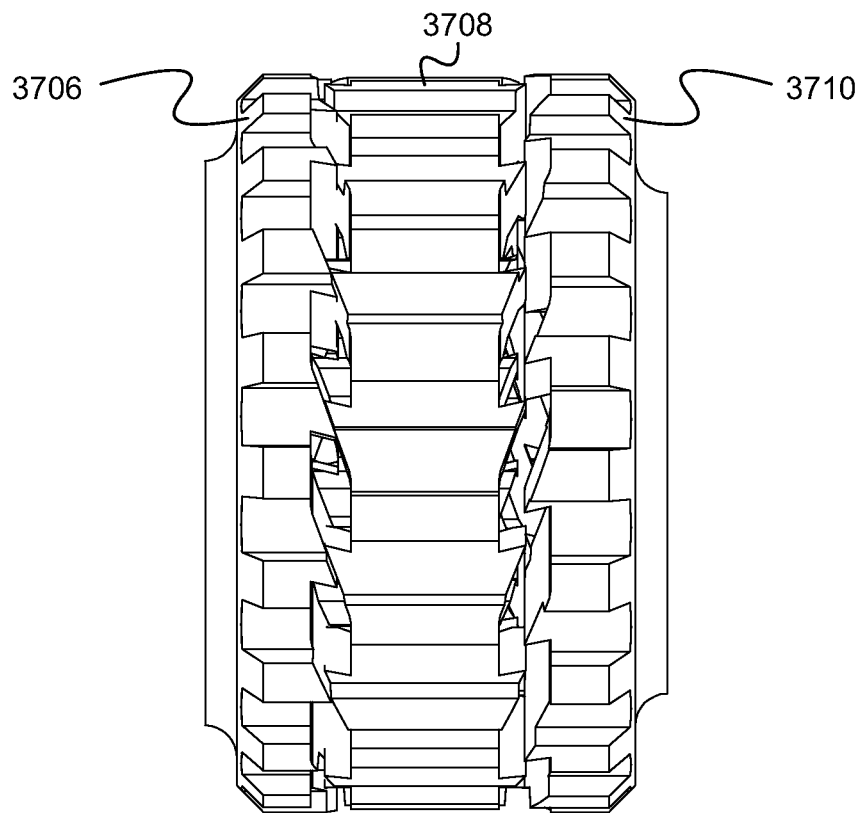
FIGS. 45A and 45B illustrate side and inside perspective views, respectively, of the first unidirectional gear, the outer ratchet gear, the inner ratchet gear and the second unidirectional gear as aligned in the ratchet housing according to some embodiments.
Figure 45B:
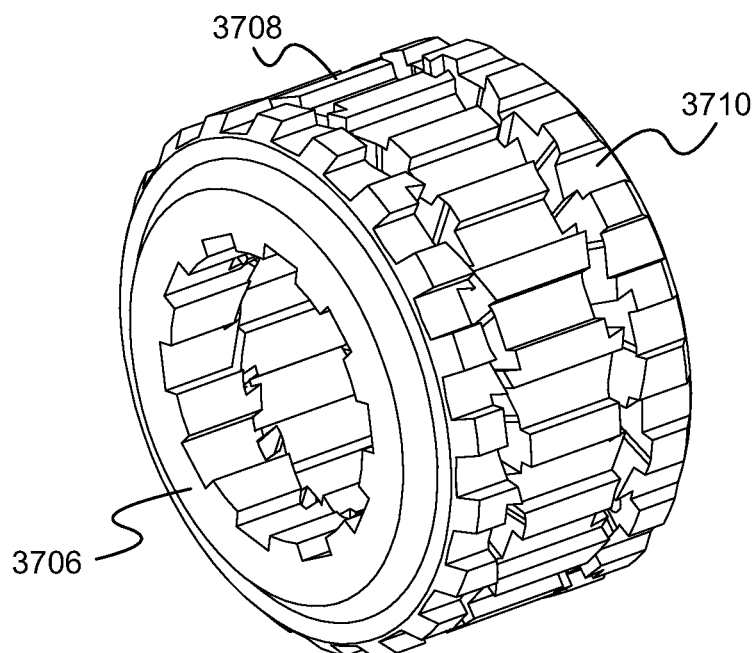

When positioned adjacent to each other within the housing 3702, as shown in FIGS. 45A and 45B, the ratchet ramps 4208, 4308 are angled oppositely to the gear ramps 4008, 4108 adjacent to them (with the gear ramps 4008, 4108 being sufficiently wide to be adjacent to both inner and the outer ratchet ramps 4208, 4308 on one side of the ratchet gears 3708, 3709, respectively). In particular, the width of the gear ramps 4008, 4108 (from the inside edge of the inner splines 4002, 4102 to the outside edge of the outer splines 4004, 4104) is able to match a width of the inner and outer ratchet gears 3708, 3709 from an outer edge of the outer splines 4204 to an inner edge of the inner splines 4302. As a result, when the ratchet gears 3708, 3709 are rotated in a first direction (with the lower end of the ratchet ramps 4208, 4308 leading), the ratchet ramps 4208, 4308 are able to slide past the gear ramps 4008, 4108 enabling the ratchet housing 3702 and the ratchet gears 3708, 3709 to rotate independent of the unidirectional gears 3706, 3710 (and the ratchet wave face axle 3704). In contrast, when the ratchet gears 3708, 3709 are rotated in the opposite direction (with the higher end of the ratchet ramps 4208, 4308 leading), the ratchet ramps 4208, 4308 catch the gear ramps 4008, 4108 and thus cause the gear ramps 4008, 4108 (and the wave face axle 3704) to rotate with the ratchet gears 3708, 3709 (and the ratchet housing 3702).

As a result, in operation, as the ratchet housing 3702 is rotated in the first direction (e.g. due to forces received from the drive mechanism), the ratchet ramps 4208, 4308 are able to slide past the gear ramps 4008, 4108 enabling the ratchet housing 3702 and the ratchet gears 3708, 3709 to rotate independent of the unidirectional gears 3706, 3710. As the ratchet housing 3702 is rotated in the opposite/drive direction (e.g. due to opposite forces received from the drive mechanism), the ratchet ramps 4208, 4308 catch onto the gear ramps 4008, 4108 causing the wave face axle 3704 and the unidirectional gears 3706, 3710 to rotate together with the housing 3702 and the ratchet gears 3708, 3709 such that the force from the drive mechanism is transferred to the hub coupled to the wave face axle 3704. This ratchet mechanism 3700 provides the benefit of not needing to using springs which often wear out and cause failure of the ratchet.

FIG. 46 illustrates a method of operating bicycle system 100 according to some embodiments. As shown in FIG. 46, a wheel hub (e.g. 118, 118') is positioned between a pair of rear faces of a rear locking mechanism (e.g. 116, 116') at the step 4602. As described above, the rear faces are each able to include a central rear axle aperture and rear waved locking splines, wherein the rear waved locking splines radially undulate about the central rear axle aperture. The wheel hub is coupled to the rear locking mechanism at the step 4604. In some embodiments, the coupling is able to comprise detachably coupling a rear axle to a first of the pair of rear faces through the central rear axle aperture, a tube of the wheel hub, central flange apertures of outer flange faces of a pair of flanges of the wheel hub, and a second of the pair of rear faces, thereby compressing the rear waved locking splines against waved hub splines of the outer flange faces, wherein the waved hub splines complement the rear waved locking splines.

In some embodiments, the method further comprises decoupling the wheel hub from the rear locking mechanism by detaching the rear axle and removing the wheel hub from between the pair of rear faces; positioning the wheel hub between a pair of front faces of a front locking mechanism, the front faces each including a central front axle aperture and front waved locking splines, wherein the front waved locking splines radially undulate about the central rear axle aperture; and/or coupling the wheel hub to the front locking mechanism by detachably coupling a front axle to a first of the pair of front faces through the central front axle aperture, the tube, the central flange apertures, and a second of the pair of front faces, thereby compressing the front waved locking splines against the waved hub splines. In some embodiments, the front waved locking splines protrude out from the pair of rear faces and the waved hub splines of the wheel hub are recessed into the outer flange faces. In some embodiments, the front waved locking splines are non-perpendicular to a central axis of the central rear axle apertures such that the front waved locking splines taper from an inside end proximate the central rear axle apertures to an outside end distal from the central rear axle apertures. In some embodiments, a thickness of the front waved locking splines increases in a direction of a center of the central rear axle apertures from the outside end to the inside end. In some embodiments, a thickness of the waved hub splines increases in a direction of a center of the central flange apertures from an outer end distal from the central flange apertures to an inner end proximate the central flange apertures. In some embodiments, the flanges each include a plurality of spoke faces having spoke apertures for coupling with spokes of a wheel. In some embodiments, a portion of the spoke faces are perpendicular to a central axis of the tube and a remainder of the spoke faces are non-perpendicular to the central axis.

FIG. 47 illustrates a method of operating bicycle system 100 according to some embodiments. As shown in FIG. 47, a rear locking mechanism 116, 116' is provided at the step 4702. A rear hub 118, 118' is positioned between the splined faces of the wave face axle and the rotor mount housing at the step 4704. The through axle 1318, 2702 is positioned through the hollow shaft of the wave face axle and a central channel the rear hub at the step 4706. The through axle 1318, 2702 is detachably coupled within a central aperture of the rotor mount housing at the step 4708. As a result, when the locking mechanism is coupled to the hub, the wave face axle rotates with the rear hub as the rear hub rotates about the through axle. Thus, the method provides the advantage of reducing wear on the bearings. In some embodiments, the method further comprises removably positioning the gearbox interface gear around the non-rotor housing such that the housing splines slide between the interface gear splines. In some embodiments, the method further comprises threadably coupling a gearbox housing lock ring to a threaded portion of the exterior surface of the non-rotor housing such that the gearbox housing lock ring blocks the interface gear splines from sliding out from between the housing splines.

FIG. 48 illustrates a method of operating a front hub apparatus of a bicycle system 100 according to some embodiments. As shown in FIG. 48, a front locking mechanism 112 is provided at the step 4802. A front hub 114 is positioned between the splined faces of the splined face plate 222 and the rotor mount housing 218 at the step 4804. The through axle 206 is positioned through a central hole 712 of the rotor mount housing 218 and a central channel 212 of the front hub 114 at the step 4806. The through axle 1318, 2702 is detachably coupled within a central aperture 316 of the splined face plate 222 at the step 4808. As a result, the front locking mechanism is able to securely detachably couple to the front hub via the splined faces. In some embodiments, the method further comprises threading a face plate lock ring 224 onto a stem 302 extending from the base 306 of the splined face plate 222, wherein the face plate lock ring 224 blocks the non-rotor-side bearing 228 from sliding of the base 306 of the splined face plate 222. In some embodiments, the method further comprises threading a non-rotor side bearing housing lock ring 220 onto the non-rotor bearing housing 226 thereby holding the non-rotor-side bearing 228, as coupled with the splined face plate 222 and the splined face plate lock ring 224, within the inner chamber 1102 of the non-rotor-side bearing housing 226.

Freewheel Rear Hub Assembly Including Direct Mount Derailleur

Figure 49A:
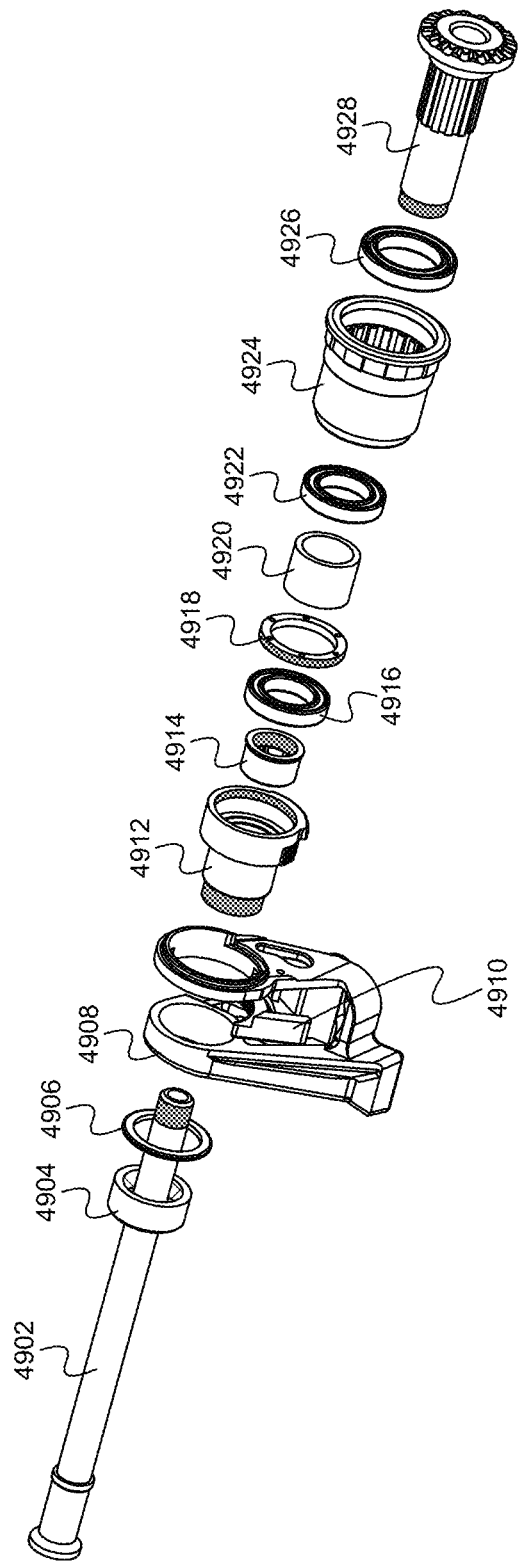
FIG. 49A illustrates an exploded perspective view of a non-rotor side locking mechanism including a direct mount derailleur according to some embodiments.
Figure 49B:
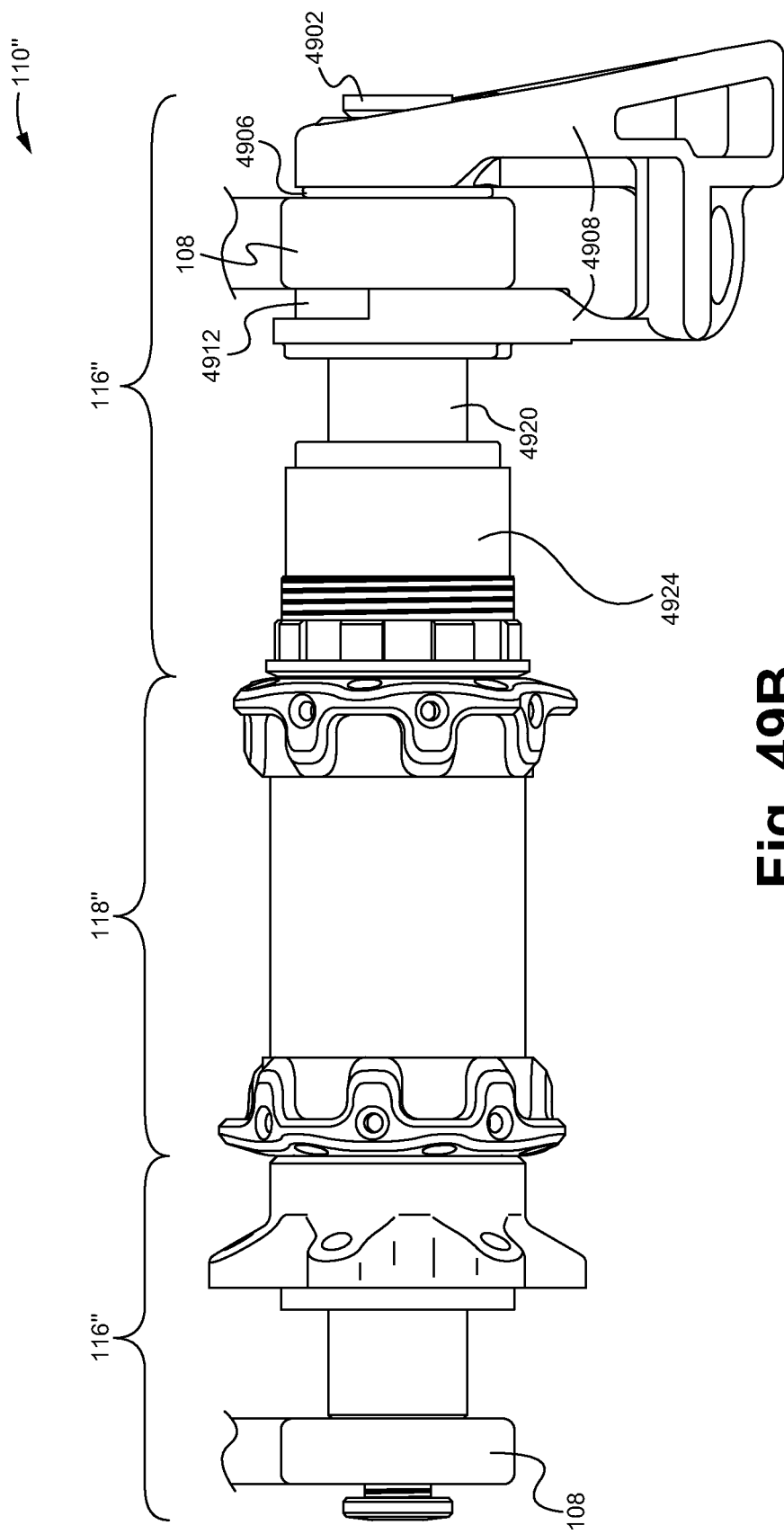
FIGS. 49B and 49C illustrate front and cross-sectional views of the rear hub assembly including a direct mount derailleur, respectively, according to some embodiments.
Figure 49C:
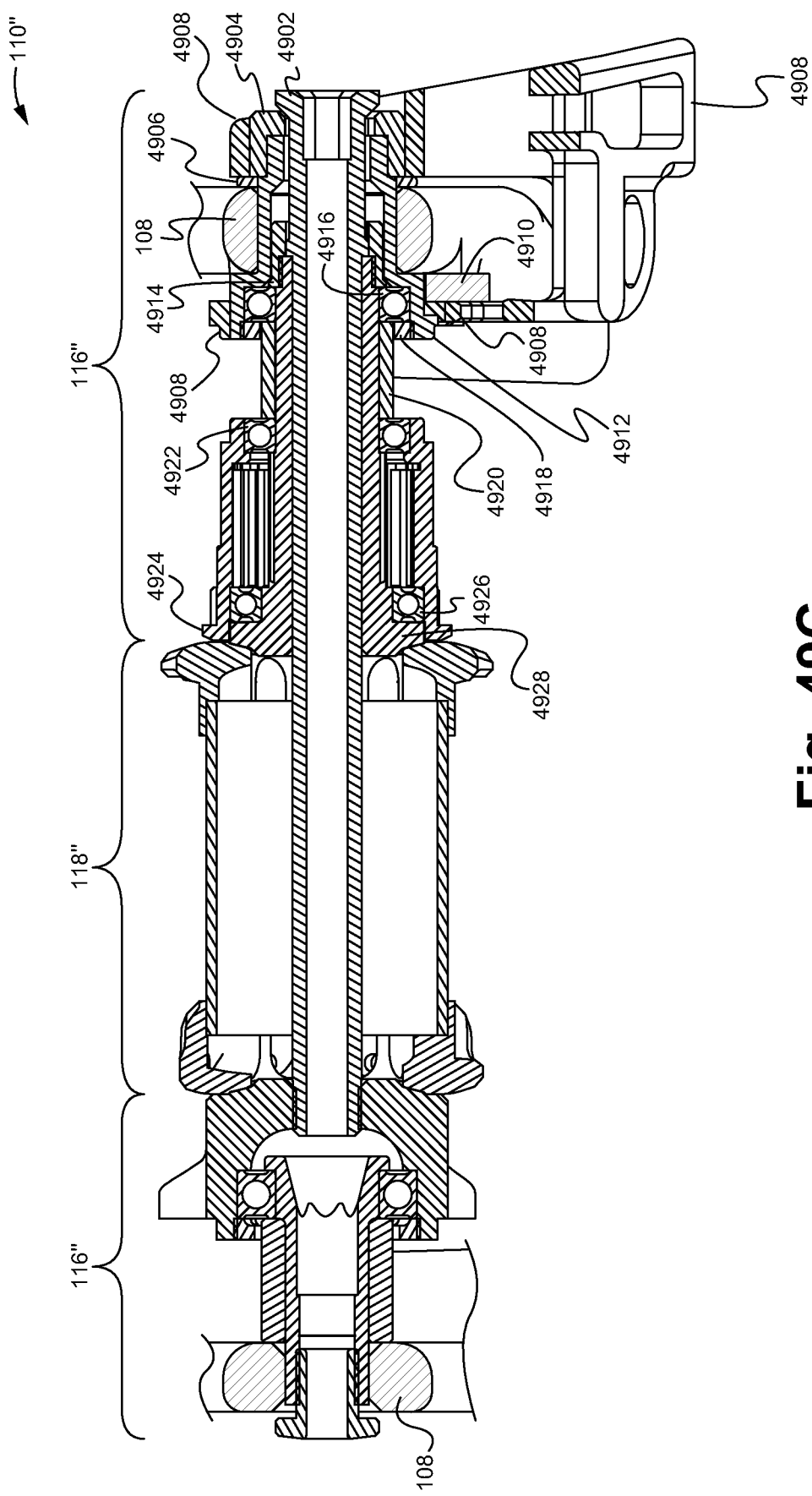

FIGS. 49A, 49B and 49C illustrate a non-rotor side locking mechanism exploded perspective view, a front view and a cross-sectional front view, respectively, of the rear hub assembly 110" including a direct mount derailleur assembly according to some embodiments. As shown in FIGS. 49A-49C, the rear hub assembly 110" comprises the rear hub 118" and a rear hub locking mechanism 116" straddling the rear hub 118" with the rear fork ends 108 coupled with each side of the locking mechanism 116". The rear hub 118" and the rotor side of the rear hub locking mechanism 116" are able to be the same as the rear hub 118, 118' and the rotor side of the rear hub locking mechanism 116, 116'. Thus, the rear hub 118" and the rotor side of the rear hub locking mechanism 116" are not described in detail for the sake of brevity. In particular, similar to the rear hub 118, because the rear and front hubs 114, 118" are similar or the same, the system 100 provides the advantage of enabling the same wheels/hubs to be used interchangeably as the front or rear wheel of the bicycle.

As illustrated in FIGS. 49A-49C, a linkage mechanism, p-knuckle and chain guard arrangement of the direct mount derailleur assembly, and the spokes, rim and tire of the rear wheel/hub 118" are omitted for the sake of clarity. In particular, it should be noted that although FIGS. 49A-49C and FIGS. 52A-52I only illustrate a top portion of the derailleur assembly (e.g. including the mounting base or b-knuckle and/or other components for coupling the mounting base of the direct mount derailleur assembly to the fork ends 108 and/or locking mechanism 116"), it is understood that the bottom of the assembly (i.e. a bottom of the mounting base 4908) is coupled to (or integrated with) a p-knuckle via a linkage mechanism with a chain guard arrangement being coupled to the p-knuckle all for effectuating the gear shifting function of the derailleur. In particular, the chain guard arrangement is connected (rotatably about a rotary axle (P-axle)) to the p-knuckle enabling tension on the bicycle chain to be adjusted/maintained, and the linkage mechanism enables controlled axial shifting of the chain guard arrangement in order to cause the chain to move from one sprocket to another sprocket (e.g. of a cassette).

As further shown in FIGS. 49A-49C, the non-rotor side of the rear hub locking mechanism 116" is able to comprise a rear hub through axle 4902, a final outside lock bolt 4904, an outside spacer 4906, a derailleur mounting base 4908, a tension setter 4910, a non-rotor side derailleur coupling housing 4912, a non-rotor side lock bolt 4914, a derailleur housing bearing 4916, a housing lock ring 4918, a non-rotor side spacer 4920, a first freewheel bearing 4922, a freewheel body 4924, a second freewheel bearing 4926 and a wave face axle 4928. Alternatively, one or more of the above components are able to be omitted. In some embodiments, the non-rotor side of rear hub locking mechanism 116" is designed to operatively couple with a gearbox drive mechanism. Alternatively, the non-rotor side of rear hub locking mechanism 116" is able to couple to other types of drive mechanisms such as a single speed gear drive mechanism. The non-rotor side lock bolt 4914, the derailleur housing bearing 4916, the housing lock ring 4918, the non-rotor side spacer 4920, the first freewheel bearing 4922, the freewheel body 4924 and the second freewheel bearing 4926 are able to be the same as the non-rotor side lock bolt 1322, the hanger bearing 1328, the hanger lock ring 1330, the non-rotor side spacer 1332, the first freewheel bearing 1334, the freewheel body 1336 and the second freewheel bearing 1338, respectively, and thus are not described in detail for the sake of brevity.

FIGS. 50A and 50B illustrate top inside perspective and top outside perspective views, respectively, of the final outside lock bolt 4904 according to some embodiments. As shown in FIGS. 50A and 50B, the lock bolt 4904 comprises an inner chamber 5002, a threaded inside wall 5004, an axle aperture 5006 and a blocking flange 5008. The inner chamber 5002 and threaded inside wall 5004 are for receiving and threadably coupling to the threaded portion of the top section 5302 of the non-rotor side derailleur coupling housing 4912. The axle aperture 5006 is sized to be larger than the shaft (at the threaded portion 5606), but smaller than the head 5602 of the rear hub through axle 4902 such that the shaft is able to extend through the aperture 5006 until the head 5602 reaches the perimeter of the axle aperture 5006.

FIGS. 50C and 50D illustrate top inside perspective and top outside perspective views, respectively, of a final outside lock bolt 4904' having a blocking flange according to some embodiments. As shown in FIGS. 50C and 50D, the lock bolt 4904' is the same as the lock bolt 4904 except that it further comprises a blocking flange 5008. In particular, the blocking flange 5008 is configured for contacting both the top outer ledge 5318 of the non-rotor side derailleur coupling housing 4912 and a side of the outside spacer 4906 (as it is positioned around the housing 4912 and between the blocking flange 5008 and the dropout 108). Further, the blocking flange 5008 is able to fit within a blocking flange recess 5214 of the outside coupling arm 5202b of the derailleur mounting base 4908'.

FIG. 51 illustrates a top inside perspective view of the outside spacer 4906 according to some embodiments. As shown in FIG. 51, the outside spacer 4906 includes a central opening 5102 having a diameter that is slightly larger than a diameter of outer surface of the middle section 5304 the housing 4912. Further, the outside spacer 4906 has a width that is substantially equal to a distance between the blocking flange 5008 and the fork end 108 when coupled together.

FIGS. 52A-52I illustrate top inside perspective, top outside perspective, front side, back side, inside, outside, inside cross-sectional, outside cross-sectional and top views of the derailleur mounting base 4908, respectively, according to some embodiments. As shown in FIGS. 52A-52I, the derailleur mounting base 4908 comprises an inside coupling arm 5202a having an inside coupling arm aperture 5204a, an outside coupling arm 5202*b* having an outside coupling arm aperture 5204*b*, and a bridge 5216 coupling the inside arm and the outside arm 5202*a/b* together with the apertures 5204*a/b* being coaxial. The inside coupling arm 5202*a* is able to comprise a ridge cutout 5205, a housing slot 5206, a tension setter ramp 5208 and a tension setter end wall 5210, wherein the ramp 5208 and the end wall 5210 define an area for receiving an adjustment member 5404 of the tension setter 4910. Although as shown in FIGS. 52A-52I, the ramp 5208 has a cutout portion for receiving a coupling pin through a pin hole, the cutout portion and pin hole are able to be omitted such that the ramp 5208 has the same width along its entire length.

The ridge cutout 5205 enables the outer ridges 5310 of the housing 4912 to slide through the aperture 5204*a* of the inside arm 5202*a* when the housing 4912 is being inserted into the aperture 5204*a*. The housing slot 5206 is configured to receive a bottom lip 5308 of the housing 4912 when the housing 4912 is positioned through the aperture 5204*a* of the inside arm 5202*a*. As a result, the housing slot 5206 is able to ensure that the housing 4912 is correctly oriented within the apertures 5204*a/b* and/or prevent the housing from rotating within the apertures 5204*a/b*. Further, as described below, when assembled the discontinuous ramp 5208 is positioned within the adjustment slot of the tension setter 4910 such that the ridged surface of the adjustment member 5404 face toward the housing 4912 (as positioned through the aperture 5204*a* of the inside arm 5202*a*) and the outer ridges 5310 of the housing 4912 face toward the ridged surface of the adjustment member 5404. Thus, the ramp 5208 holds the ridged surface of the adjustment member 5404 against the outer ridges 5310 thereby enabling the selective rotation/sliding of the tension setter 4910 about the housing 4912 and/or mounting base 4908.

Figure 52A:
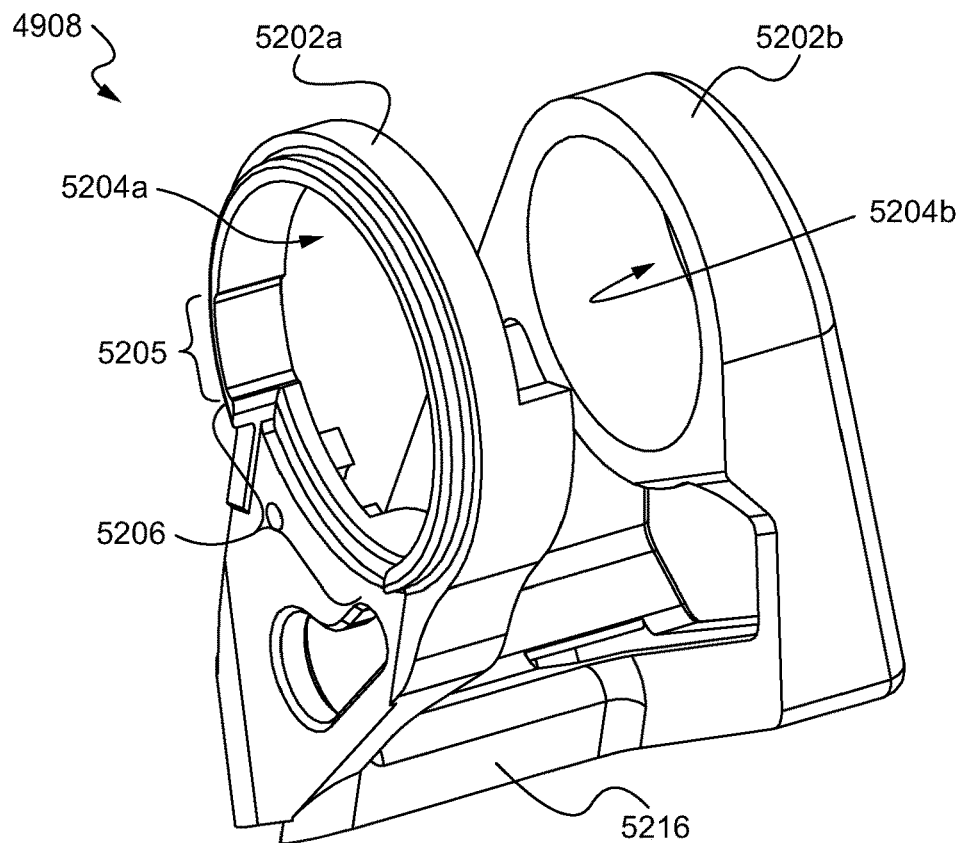
FIGS. 52A, 52B, 52C, 52D, 52E, 52F, 52G, 52H and 52I illustrate top inside perspective, top outside perspective, front side, back side, inside, outside, inside cross-sectional, outside cross-sectional and top views of the derailleur mounting base, respectively, according to some embodiments.
Figure 52B:
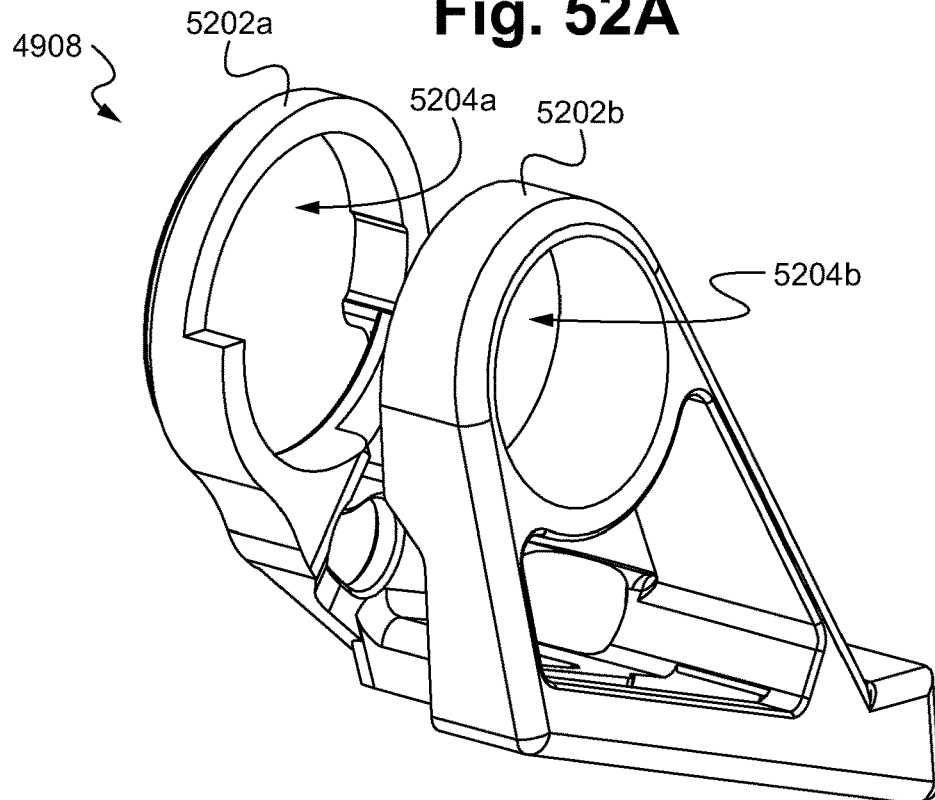
Figure 52C:
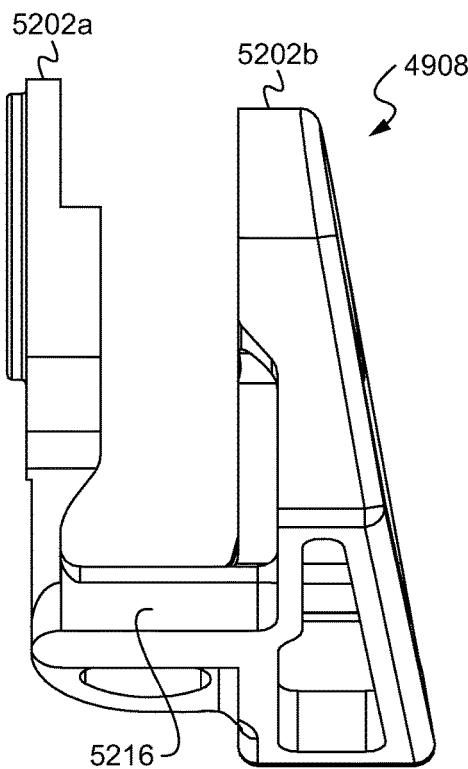
Figure 52D:
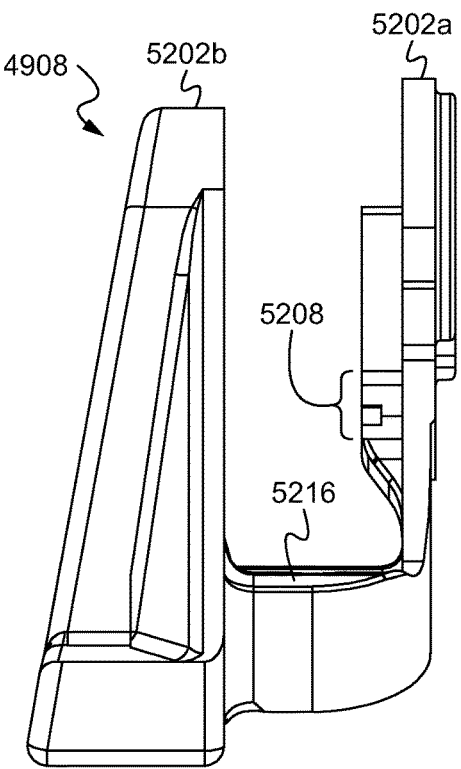
Figure 52E:
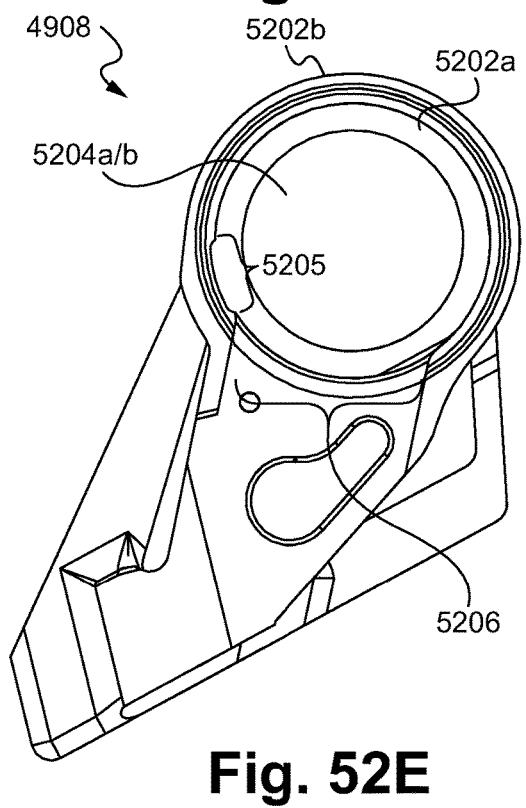
Figure 52F:
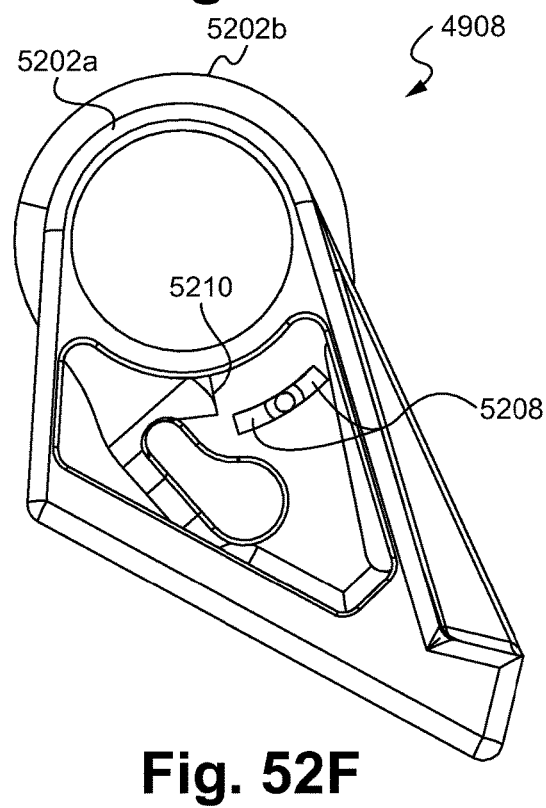
Figure 52G:
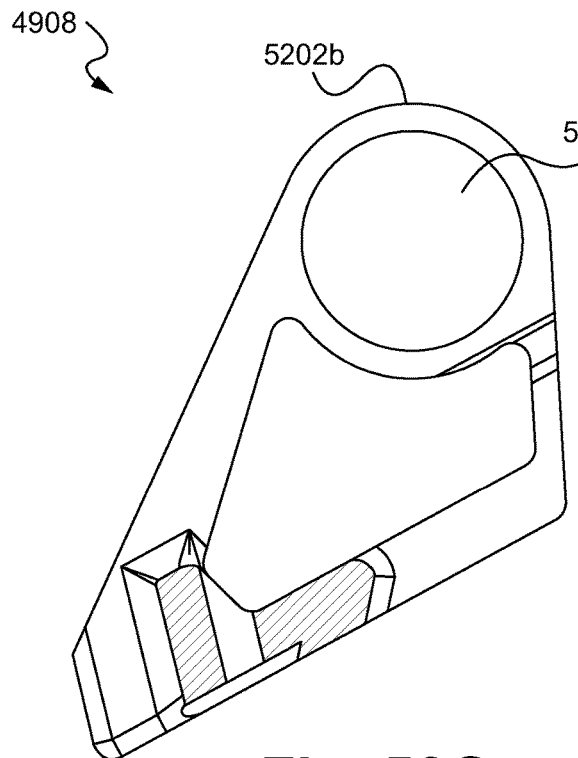
Figure 52H:
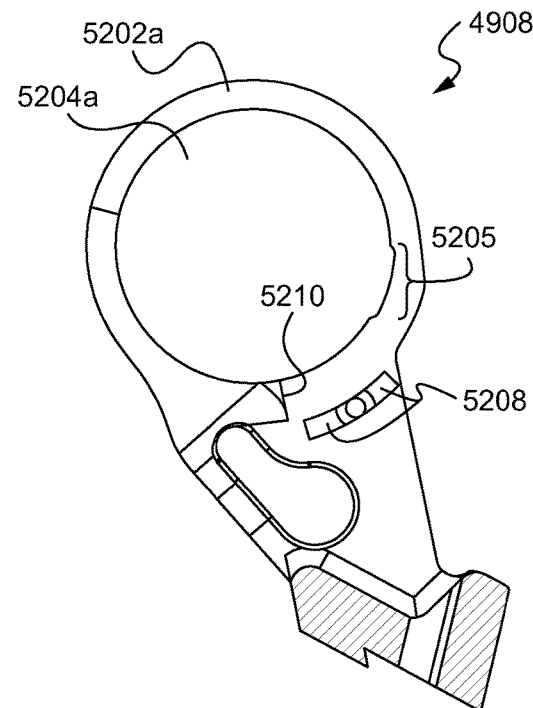
Figure 52I:
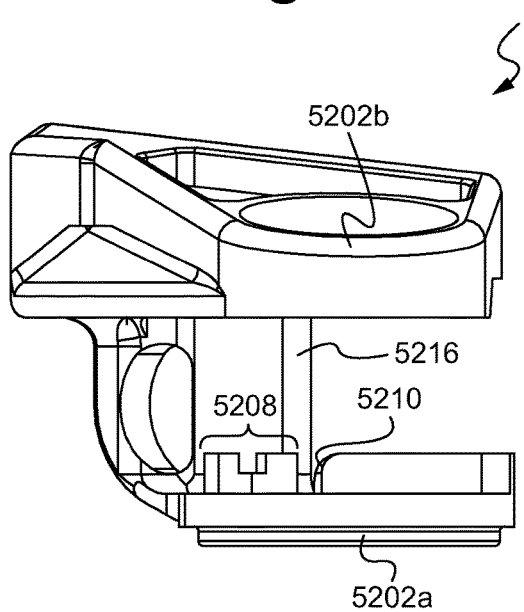
Figure 52J:
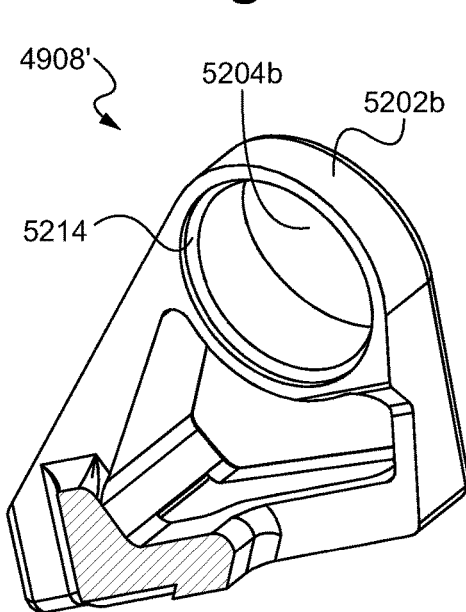
FIG. 52J illustrates a cross-sectional top inside perspective view of a mounting base according to some embodiments.
Figure 53A:
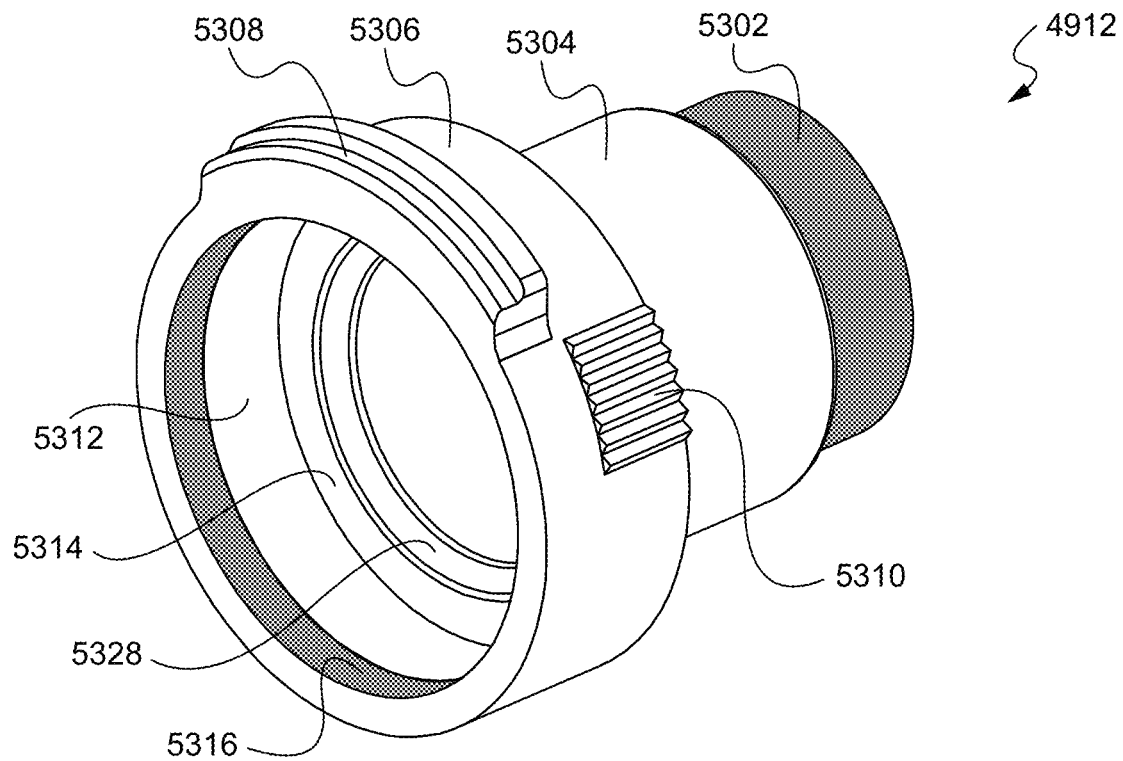
Figure 53B:
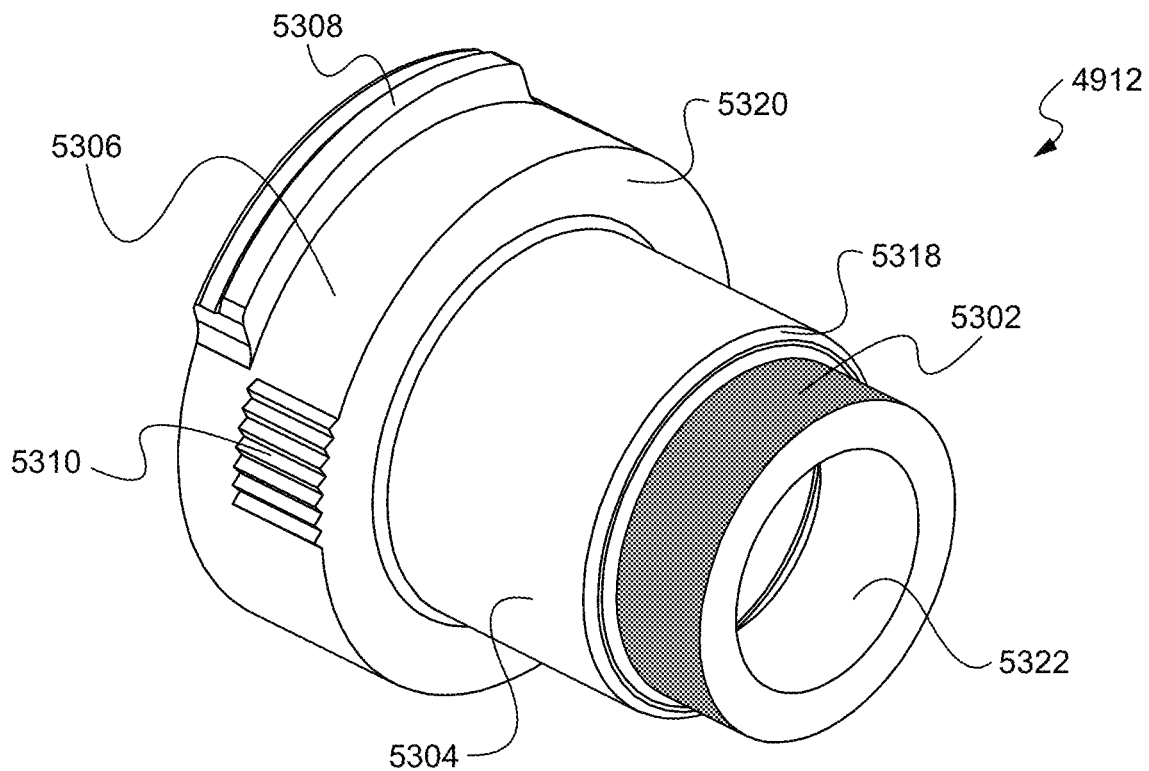

FIG. 52J illustrates a cross-sectional top inside perspective view of a mounting base 4908' according to some embodiments. The mounting base 4908' is able to be the same as the mounting base 4908 except for the differences described herein. Specifically, as shown in FIG. 52*j* the outside coupling arm 5202*b* of the mounting base 4908' further comprises a flange recess 5214 for receiving the blocking flange 5008 of the lock bolt 4904'. In particular, as described below, the flange recess 5214 helps center the lock bolt 4904' within the aperture 5204*b* of the outside coupling arm 5202*b* and/or prevent the lock bolt 4904' from sliding too far into the aperture 5204*b*.

FIGS. 53A-53E illustrate top inside perspective, top outside perspective, side, side cross-section and top views of the non-rotor side derailleur coupling housing 4912, respectively, according to some embodiments. As shown in FIGS. 53A-53E, the non-rotor side derailleur coupling housing 4912 comprises a threaded top section 5302, a middle section 5304 and a bottom section 5306 having a protruding bottom lip 5308 and a plurality of ridges forming a ridged portion 5310. As described above, the protruding bottom lip 5308 is configured to fit within the housing slot 5206 such that the housing 4912 is unable to rotate with respect to the mounting base 4908. The inside of the bottom section 5306 is able to include a bottom chamber 5312, an inner threaded portion 5306, a bottom straight ledge 5314 and a bottom angled ledge 5328. The middle section 5304 extends from a bottom outer ledge 5320 to a top outer ledge 5318. The inside of the middle section 5304 is able to include a middle chamber 5326 and a top angled ledge 5324. The inside of the threaded top section 5302 is able to include a top chamber 5322.

Figures 54A, 54B:
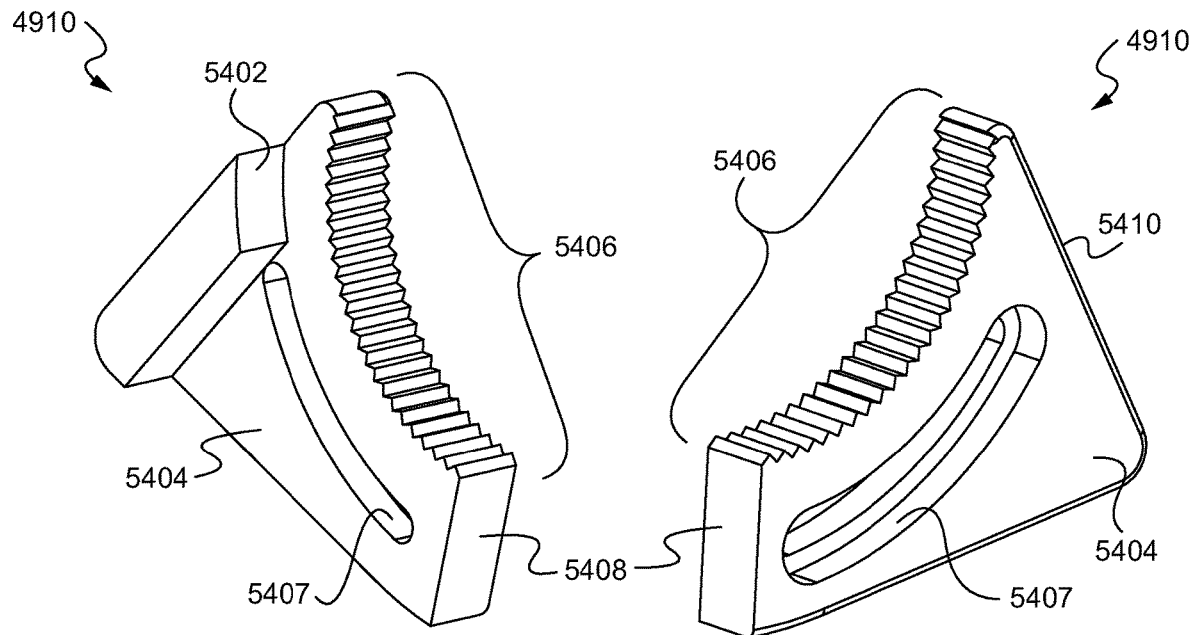
FIGS. 54A, 54B, 54C, 54D, 54E and 54F illustrate top inside perspective, top outside perspective, inside, outside, front and back views of the tension setter, respectively, according to some embodiments.
Figures 54C, 54D:
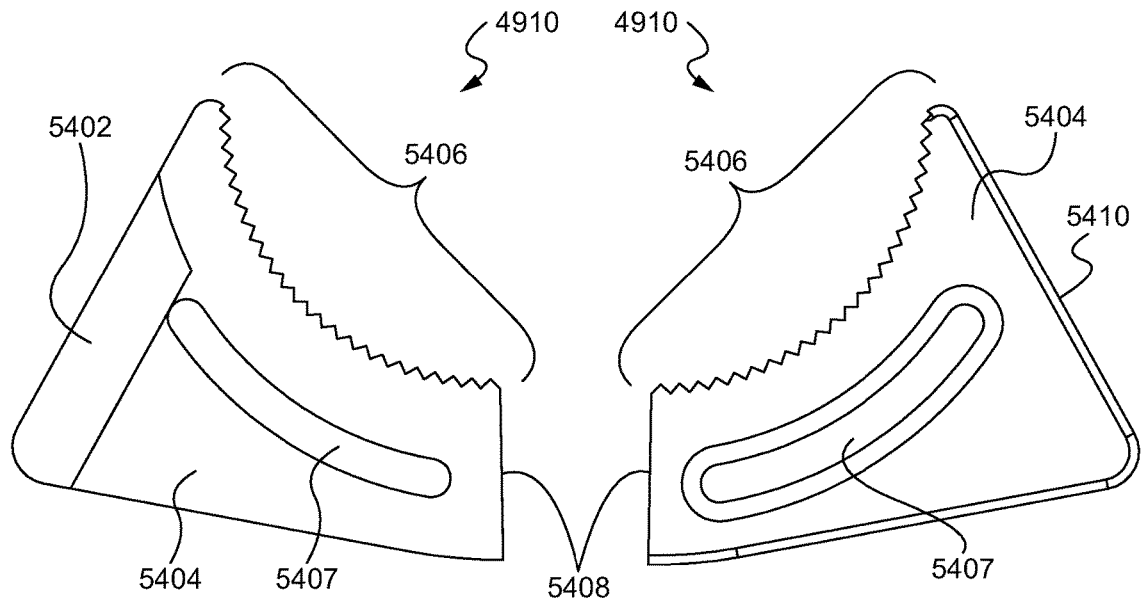
Figure 54E:
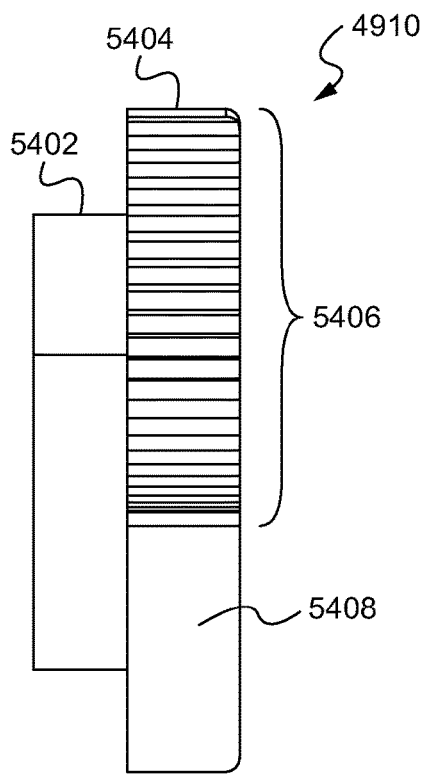
Figure 54F:
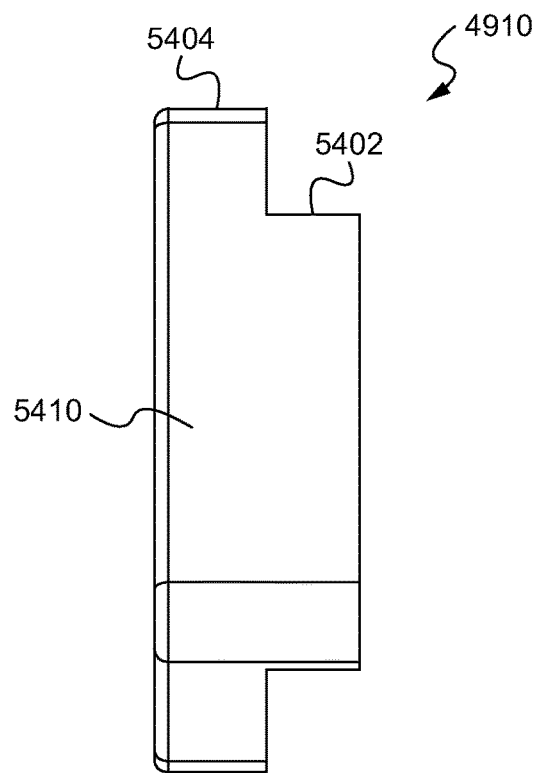
Figure 54G:
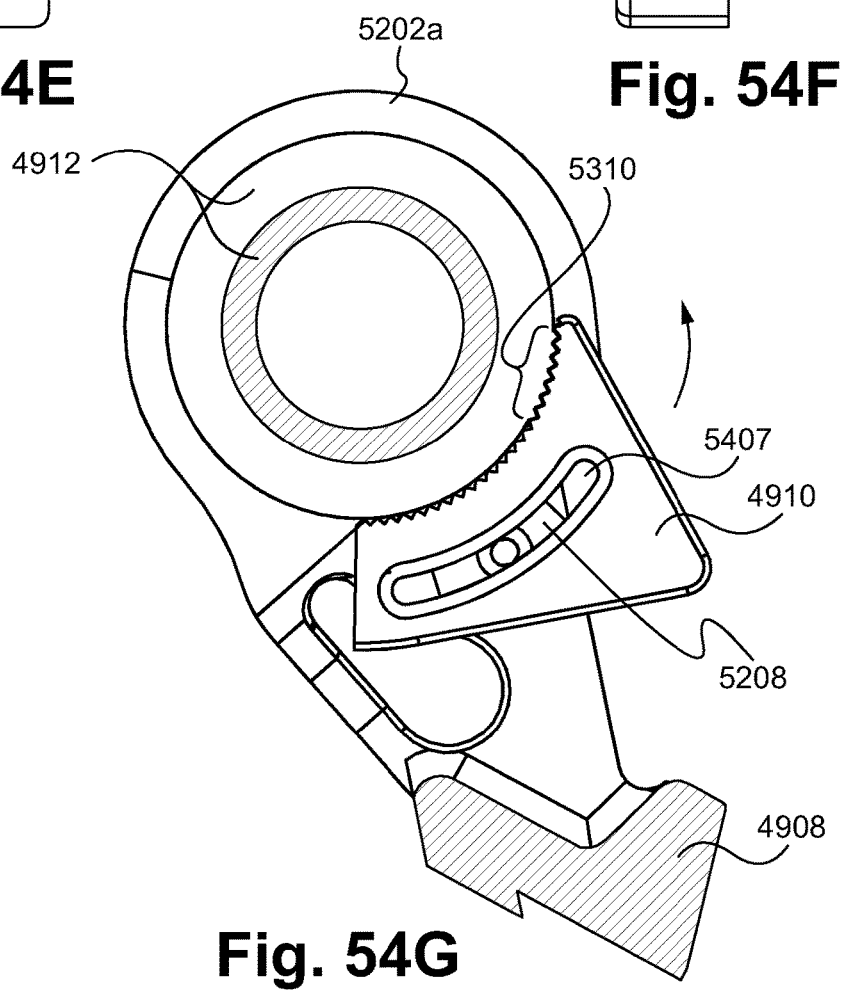
FIG. 54G illustrates an outside cross-sectional view of the non-rotor side bearing housing and the tension setter coupled with the derailleur mounting base according to some embodiments.
Figure 54H:
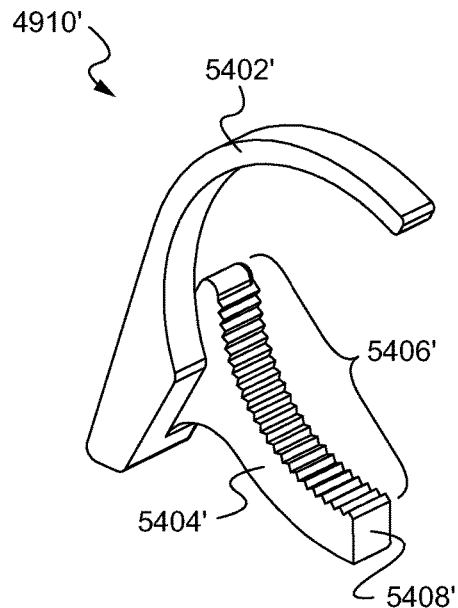
FIGS. 54H, 54I, 54J, 54K, 54L and 54M illustrate top inside perspective, top outside perspective, inside, outside, front and back views of a tension setter, respectively, according to some embodiments.
Figure 54I:
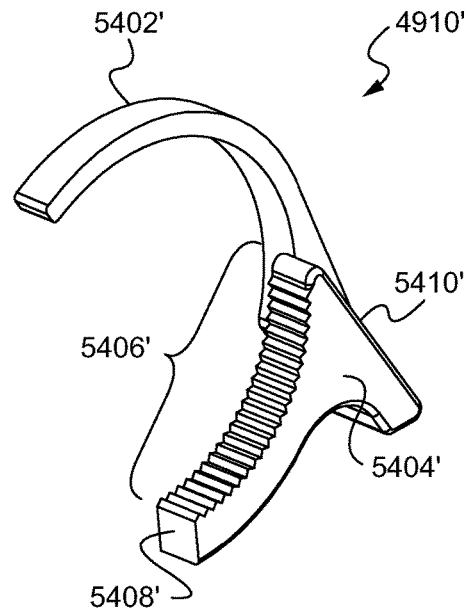
Figure 54J:
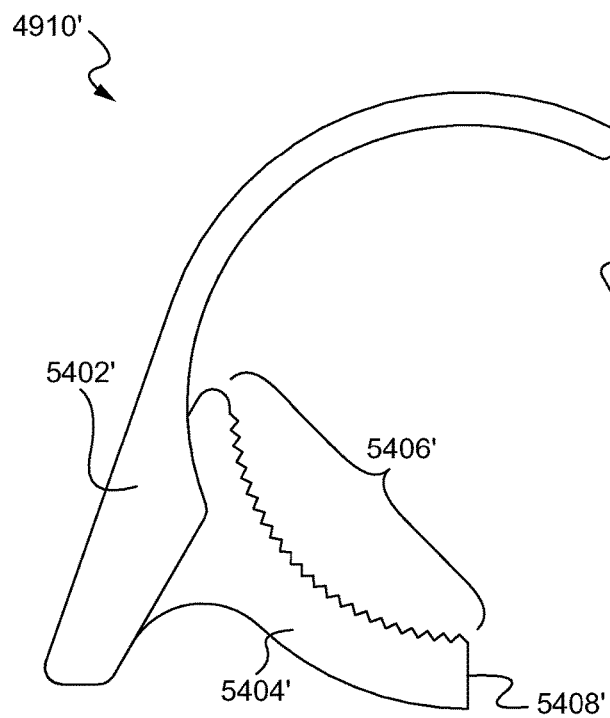
Figure 54K:
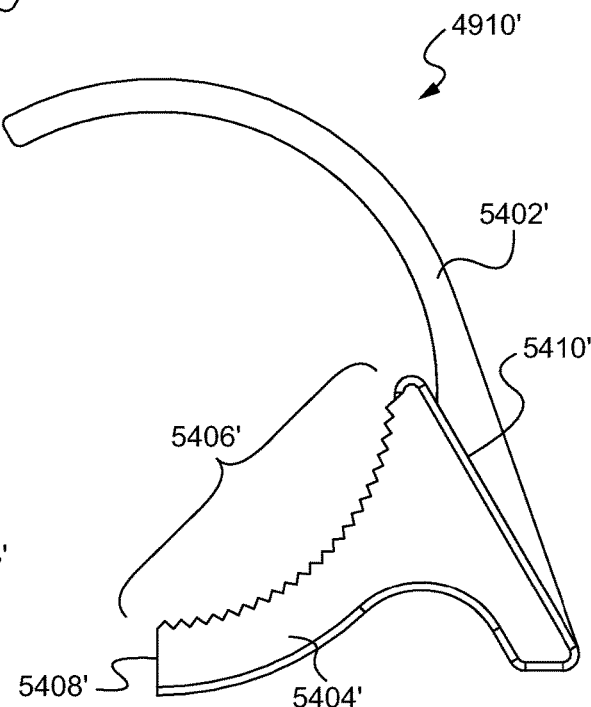
Figure 54L:
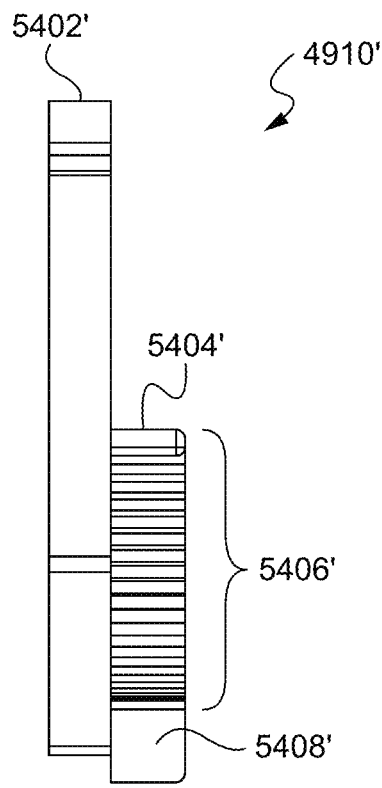
Figure 54M:
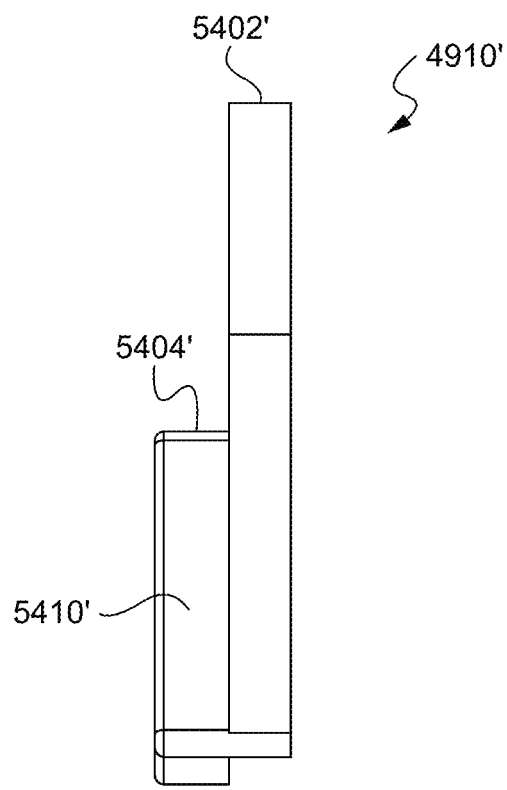

FIGS. 54A-54F illustrate top inside perspective, top outside perspective, inside, outside, front and back views of the tension setter 4910, respectively, according to some embodiments. As shown in FIGS. 54A-54F, the tension setter 4910 comprises a guiding member 5402 and an adjustment member 5404 having a ridged surface 5406, a guide slot 5407, an end wall 5408 and a back side 5410. As shown in FIG. 54G and FIGS. 49A-49C, the guide slot 5407 of the tension setter 4910 is positioned around the ramp 5208 of the mounting base 4908 adjacent to the tension setter end wall 5210 such that the guiding member 5402 contacts the outer surface of the inside coupling arm 5202*a* and the ridged surface 5406 contacts the outside of the bottom section 5306 of the housing 4912 (including the outer ridges 5310 of the housing 4912). In particular, as shown in FIG. 54G, when both the tension setter 4910 and the housing 4912 are assembled with the mounting base 4908, at least some of the ridges of the ridged surface 5406 are adjacent to the outer ridges 5310 of the housing 4912 (with a top portion of the adjustment member 5404 sandwiched between the top of the ramp 5208 and outside and/or outer ridges 5310 of the housing 4912).

As a result, the tension setter 4910 is able to be selectively moved about the bottom section 5306 of the housing 4912 and/or the inside coupling arm 5202*a* via a user pushing/pulling the guiding member 5402 (with the ramp 5308 sliding within the guide slot 5407 thereby holding the ridged surface 5406 against the outside of the bottom section 5306 and/or the outer ridges 5310 of the housing 4912). Indeed, as the tension setter 4910 is moved, each point where the tops of the ridges of the ridged surface 5406 are aligned with the bottoms of the outer ridges 5310 forms a stable position of the tension setter 4910 with respect to the housing 4912 and mounting base 4908 (due to the nesting of the complementary ridges with each other). Further, in each of these stable positions, the back side 5410 of the adjustment member 5404 forms a different angle with respect to the housing 4912 and mounting base 4908, which because the back side 4910 contacts the fork end 108 of the frame 102, enables the angle of the housing 4912 and mounting base 4908 with respect to the fork end 108 to be controlled/adjusted. The extent of this rotation/angle adjustment is able to be limited by the ramp 5208 contacting one of the ends of the guide slot 5407 in either direction of movement and/or the end wall 5408 of the adjustment member 5404 contacting the end wall 5210 of the mounting base 4908.

FIGS. 54H-54M illustrate top inside perspective, top outside perspective, inside, outside, front and back views of a tension setter 4910', respectively, according to some embodiments. The tension setter 4910' is able to be the same as the tension setter 4910 except for the differences described herein. As shown in FIGS. 54H-54M, the tension setter 4910' has an elongated guiding member 5402' and a truncated adjustment member 5404' without a guide slot. As a result, the truncated adjustment member 5404' of the tension setter 4910' is positioned on top of (not around) the ramp 5208 of the mounting base 4908 adjacent to the tension setter end wall 5410' and the elongated guiding member 5402' contacts and partially surrounds or hugs a larger portion of the outer surface of the inside coupling arm 5202*a* (with the ridged surface 5406' contacting the outside of the bottom section 5306 and/or the outer ridges 5310 of the housing 4912).

Further, similar to the tension setter 4910, the tension setter 4910' is able to be selectively moved about the bottom section 5306 of the housing 4912 and/or the inside coupling arm 5202*a* via a user pushing/pulling the guiding member 5402', but with adjustment member 5404' sliding on top of the ramp 5308 (between the ramp 5308 and the outer surface of the bottom section 5306 of the housing 4912) thereby holding the ridged surface 5406' against the outside of the bottom section 5306 and/or the outer ridges 5310 of the housing 4912. The extent of this rotation/angle adjustment is able to be limited in a first direction by the point at which the end wall 5408' of the tension setter 4910' contacts the end wall 5210 of the mounting base 4908 and in the opposite direction by the point at which the adjustment member 5404' is no longer above and/or in contact with the ramp 5208. Thus, the tension setter 4910' is able to adjust the angle of the housing 4912 and mounting base 4908 with respect to the fork end 108.

Figure 55:
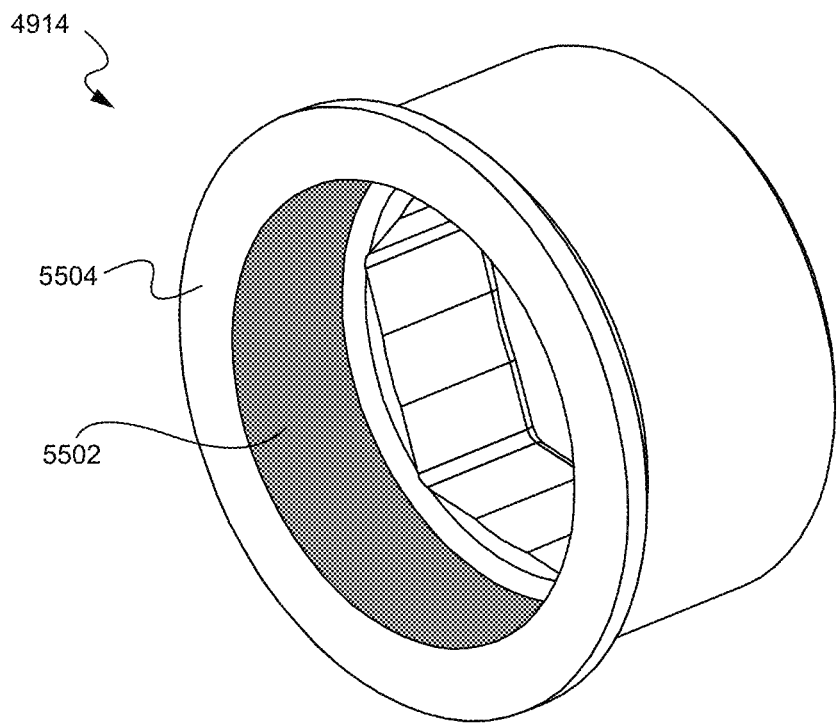
FIG. 55 illustrates a top inside perspective view of the non-rotor side lock bolt according to some embodiments.

FIG. 55 illustrates a top inside perspective view of the non-rotor side lock bolt 4914 according to some embodiments. As shown in FIG. 55, the non-rotor side lock bolt 4914 has an inner threaded portion 5502 that threads onto end threads of the shaft of the wave face axle 4928 such that a stop wall 5504 contacts the bearing ledge 5712 and/or the top of the derailleur housing bearing 4916. As a result, the non-rotor side lock bolt 4914 is able to secure all of the derailleur housing bearing 4916, the non-rotor side spacer 4920, the first freewheel bearing 4922, the freewheel body 4924 and the second freewheel bearing 4926 on the wave face axle 4928.

Figure 56:
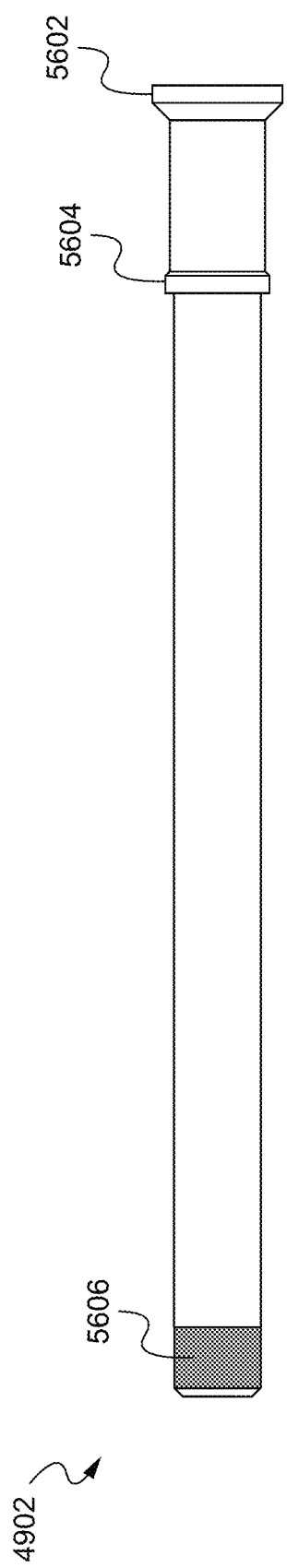
FIG. 56 illustrates a side view of the rear through axle according to some embodiments.
Figure 57:
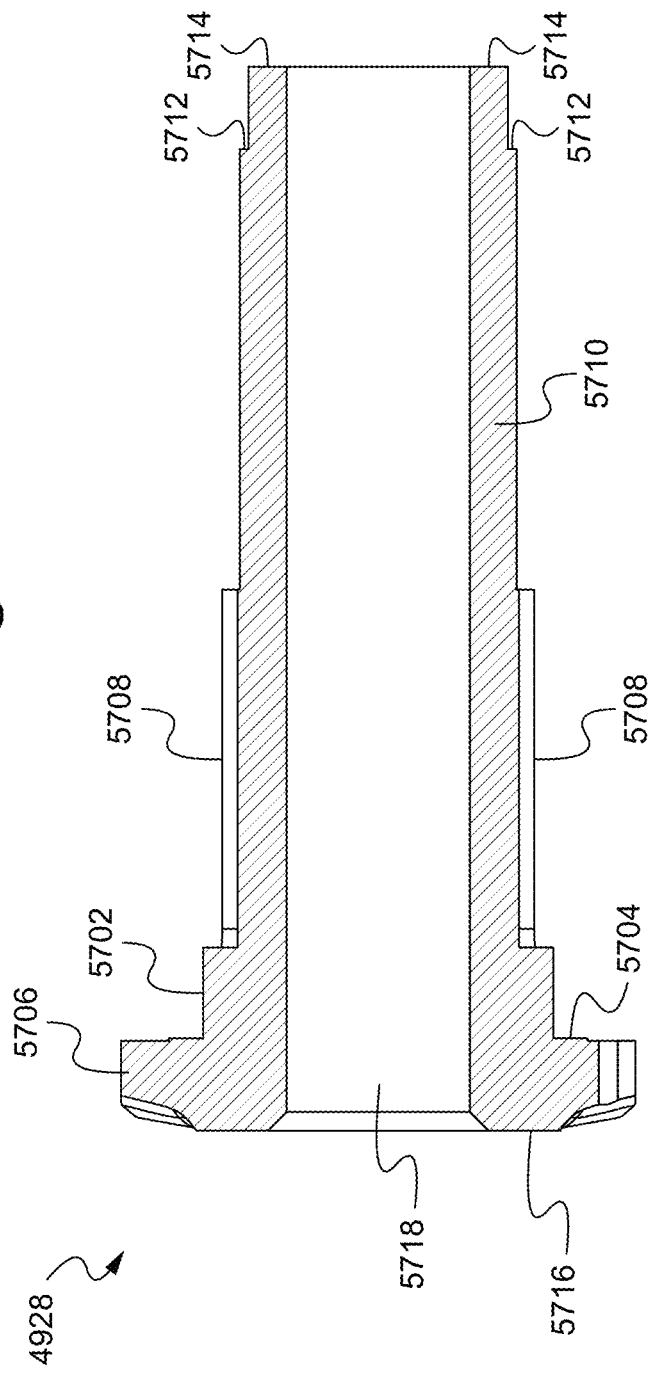
FIG. 57 illustrates a side cross-sectional view of the wave face axle according to some embodiments.

FIG. 56 illustrates a side view of the rear through axle 4902 according to some embodiments. As shown in FIG. 56, the rear through axle 4902 comprises a head 5602, a lip 5604 and end threads 5606. FIG. 57 illustrates a side cross-sectional view of the wave face axle 4928 according to some embodiments. As shown in FIG. 57, the wave face axle 4928 comprises a base 5702, a wall 5704, a bottom disk 5706, a shaft 5710 having a plurality of splines 5708, a bearing ledge 5712, an end rim 5714, a protruding splined face 5716 and a central aperture 5718.

As shown in FIGS. 56 and 57, the wave face axle 4928 and the rear through axle 4902 are substantially similar to the wave face axle 1340 and the rear through axle 1318 except the wave face axle 4928 does not have an inner wall 2020 and the lip 5604 of the rear through axle 4902 is closer to the head 5602. As a result, like the through axle 1318, the rear through axle 4902 (see FIG. 56) is able to extend through central shafts of the final lock bolt 4904, 4904', the non-rotor side lock bolt 4914, the wave face axle 4928, the housing 4912 and the hub 118" and threadably couple to internal threads of the rear hub bearing/housing rotor mount via end threads 5606. In particular, as the axle 4902 is further threaded into the bearing/housing rotor mount, the head 5602 of the through axle 4902 eventually contacts the top of the final outside lock bolt 4904, 4904' and/or the lip 5604 of the axle 4902 eventually contacts the end rim 5714 of the wave face axle 4928. Accordingly, as the through axle 4902 is even further threaded into the bearing/housing rotor mount, splined face of the rotor mount is compressed against the splined face of the rotor side flange and the splined face of the wave face axle 4928 is compressed against the splined face of the non-rotor side flange. These compression forces cause the hub 118" to be fixed between the wave face axle 4928 and the housing/rotor mount. Conversely, as the through axle 4902 is unscrewed, the compression forces are subsided and the hub 118" is able to be removed from between the wave face axle 4928 and the housing/rotor mount (e.g. during a tire change process). Alternatively, the wave face axle 4928 and through axle 4902 are able to be the same as the wave face axle 1340 and the through axle 1318 with the lip and inner wall interacting in the same manner as described in reference to the wave face axle 1340 and the through axle 1318.

In some embodiments, the through axle 4902 is able to have the same or substantially similar radius immediately before and after the lip 5604, with the lip 5604 constituting a portion having a discrete increase in radius than the portions immediately before and after the lip 5604. Alternatively, the lip 5604 is created by a discrete reduction in radius of the axle 4902 about its central axis such that an upper portion before the lip 5604 has a larger radius than a lower portion of the through axle 4902 after the lip 5604.

As shown in FIG. 49C, together the derailleur housing bearing 4916, the non-rotor side lock bolt 4914 and the end of the wave face axle 4928 are positioned within the bottom and middle chambers 5312, 5326 of the non-rotor side derailleur coupling housing 4912. In particular, the derailleur housing bearing 4916 is able to be adjacent to the bottom straight ledge 5314 and the bottom of the blocking flange 5008. Further, the blocking flange 5008 is able to be adjacent to and fit within the recess created by the bottom angled ledge 5328 thereby centering the wave face axle 4928 (as coupled to the lock bolt 4914) within the housing 4912. The outer threading of the housing lock ring 4918 is threaded within the bottom chamber 5312 via the threaded portion 5316 thereby holding the derailleur housing bearing 4916 within the bottom chamber 5312. Indeed, because the derailleur housing bearing 4916 is housed in the non-rotor side derailleur coupling housing 4912 (instead of in the hub 118"), larger bearings are able to be used that are able to better withstand the forces applied to the rear hub assembly 110". As a result, the use of a non-rotor side derailleur coupling housing 4912 improves the durability of the rear hub assembly 110".

As shown in FIGS. 49A-49C, the final lock bolt 4904, 4904' slides into the aperture 5204b of the outside coupling arm 5202b. In particular, in the case of the final lock bolt 4904' and the mounting base 4908', it slides into the aperture 5204b until the blocking flange 5008 is positioned within the flange recess 5214. In particular, the outside face of the blocking flange 5008 and the inside face of the flange recess 5214 are able to be tapered to facilitate the centering of the final lock bolt 4904' within the flange recess 5214 (and/or aperture 5204b). The final lock bolt 4904, 4904' is threadably coupled to the threaded top section 5302 of the non-rotor side derailleur coupling housing 4912 with the non-rotor side derailleur coupling housing 4912 being positioned through the aperture 5204a of the inside coupling arm 5202a, the hole in the fork end 108 of the frame 102, the central opening 5102 of the outside spacer 4906 and at least partially through the aperture 5204b of the outside coupling arm 5202b. As a result, by threading the final lock bolt 4904, 4904' onto the threaded top section 5302 of the non-rotor side derailleur coupling housing 4912, the outside spacer 4906 and the fork end 108 are secured to the middle section 5304 of the housing 4912. At the same time, the protruding bottom lip 5308 is positioned within the housing slot 5206 (such that the housing 4912 is unable to rotate with respect to the mounting base 4908 within the apertures 5204a/b) and the adjustment member 5404 of the tension setter 4910 is positioned around the ramp 5208 of the mounting base 4908 (with a top portion of the adjustment member 5404 sandwiched between the top of the ramp 5208 and the outside of the housing 4912). Finally, as described above, the rear through axle 4902 is able to extend through central shafts of the final lock bolt 4904, 4904', the non-rotor side lock bolt 4914, the wave face axle 4928, the housing 4912 and the hub 118" and threadably couple to internal threads of the rear hub bearing/housing rotor mount via end threads 5606.

In operation, like with the front hub assembly 106, a current wheel/hub 118" is able to removed from the locking mechanism 116" by unscrewing and removing the through axle 4902 thereby releasing the compression between the splined surfaces of the flanges and the splined surfaces of the locking mechanism 116". As a result, the unwanted wheel/hub 118" is able to be pulled out from between the splined surfaces and replaced with a new wheel/hub 118" at least semi-aligned between the splined surfaces of the locking mechanism 116". The through axle 4902 is then able to be reinserted and screwed into the bearing/housing rotor mount of the rotor side of the locking mechanism 116". As the through axle 4902 is further threaded into bearing/housing rotor mount, the splined surfaces are pushed against the outer recessed splined faces of the flanges, which causes the hub 118" to be fixed between the bearing/housing rotor mount and the wave face axle 4928. When pulled up tight the wheel/hub 118" and the two sides of the locking mechanism 116" are able to act like a single rigid component capable of safely holding the wheel/hub 118" in place while the bike is in use. Additionally, like with the front hub assembly 106", due to the arrangement of the bearings 4916, 4922, 4926 and the through axle 4902, when the through axle 4902 is tightened no side loading is exerted onto the bearings 4916, 4922, 4926. Instead, the through axle 4902 only pulls the two sets of splined faces together and does not need to carry any of the transverse load exerted on the hub/wheel 118" by the weight of the rider and the riding conditions. Again, because the splines are radially projected towards a center point, when they are engaged they are both self-centering and when tightened together, they are able to withstand the required transverse loading exerted on the hub 118". As a result, the system 100 provides the benefit of not needing wheel bearings in the central hub 118" itself, but instead having all the forces transferred through the engaging splined faces to the bearings 4916, 4922, 4926.

After the coupling is complete, the bearings 4916, 4922, 4926 enable the through axle 4902, the non-rotor side lock bolt 4904, 4904', the wave face axle 4928, the freewheel body 4924, the rotor side lock ring and the rear hub housing/rotor mount to all rotate together as the rear hub/wheel 118" rotates. In other words, when the wheel/hub 118" rotates (e.g. due to the drive mechanism causing the freewheel body 4924 to rotate in a drive direction) so will the through axle 4902 unlike a traditional through axle that remains stationery. The final lock bolt 4904, 4904', the outside spacer 4906, the mounting base 4908, the tension setter 4910, the non-rotor side derailleur coupling housing 4912 and the lock ring 4918 are affixed to one of the rear fork ends 108 of the frame 102 and thus do not rotate with the hub 118". Similarly, the rotor side lock bolt, the rotor side spacer and the rotor side bearing axle are affixed to the other one of the rear fork ends 108 of the frame 102 and do not rotate with the hub 118".

Figure 58:
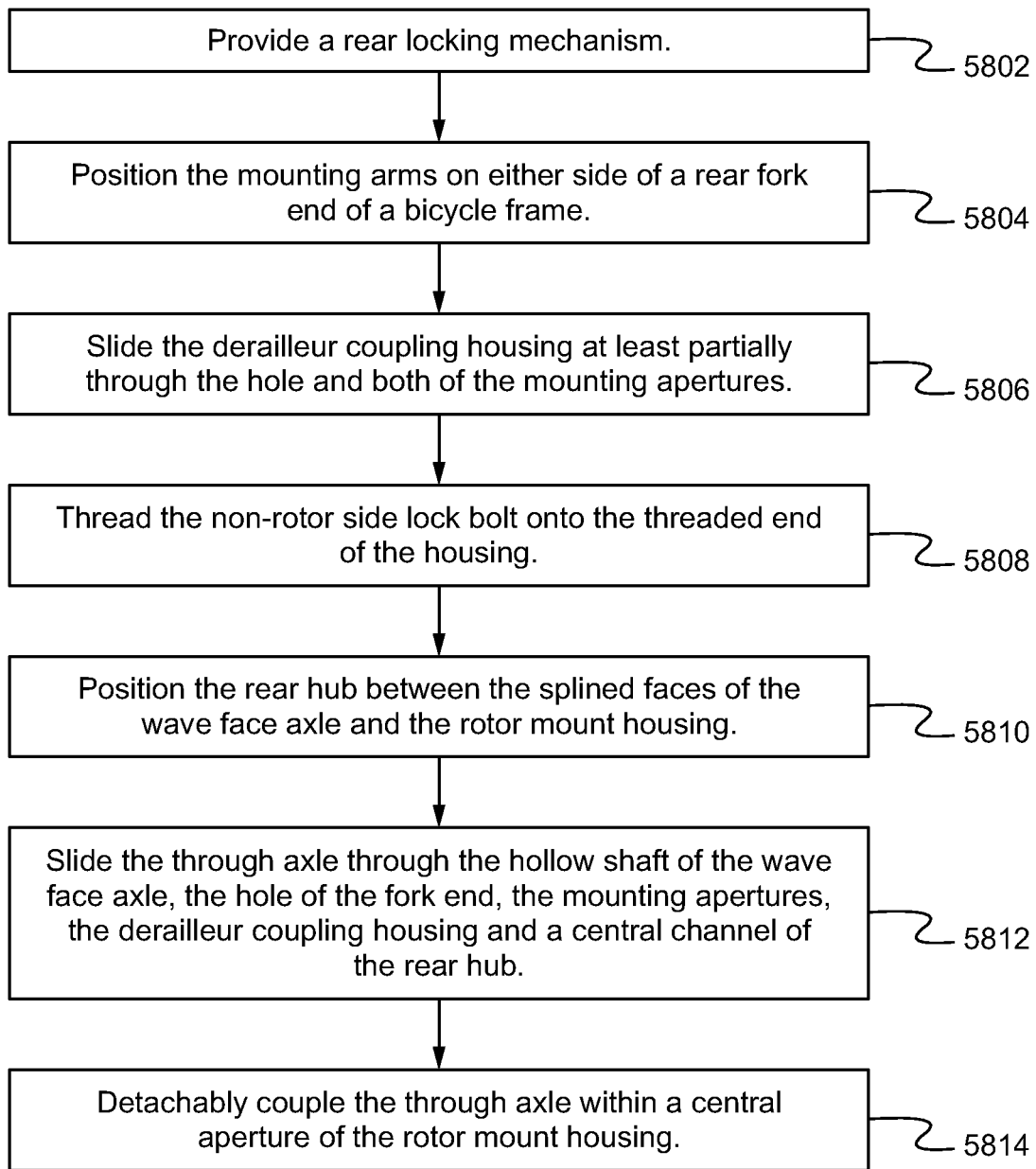
FIG. 58 illustrates a method of operation a bicycle system according to some embodiments.

FIG. 58 illustrates a method of operating bicycle system 100 according to some embodiments. As shown in FIG. 58, a rear locking mechanism 116" is provided at the step 5802. The mounting arms 5202 a/b are positioned on either side of a rear fork end 108 of a bicycle frame 102 such that the mounting apertures 5204 a/b align with a hole in the rear fork end 108 at the step 5804. In some embodiments, the outside spacer 4906 is positioned between the mounting arm 5202b and the rear fork end 108 (such that its central hole aligns with the apertures 5204 a/b). The derailleur coupling housing 4912 is slid at least partially through the hole and both of the mounting apertures 5204 a/b at the step 5806. In some embodiments, the derailleur coupling housing 4912 is also slid at least partially through the outside spacer 4906. In some embodiments, sliding the derailleur coupling housing 4912 at least partially through the mounting apertures 5204 a/b comprises positioning the protruding lip 5308 within the housing slot 5206 such that the housing slot 5206 prevents the derailleur coupling housing 4912 from rotating within the mounting apertures 5204 a/b. The non-rotor side lock bolt 4904, 4904' is threaded onto the threaded end 5302 of the housing 4912 at the step 5808 (thereby securing the housing 4912 through the hole in the fork end 108 and both of the mounting apertures 5204 a/b). In some embodiments, the blocking flange 5008 of the non-rotor side lock bolt 4904' is positioned within the flange recess 5214 of the mounting arm 5202b before the derailleur coupling housing 4912 is slid at least partially through the outside spacer 4906, the hole of the rear fork end 108 and both of the mounting apertures 5204 a/b.

In some embodiments, the method further comprises positioning the bearings 4916, 4922, 4926, the spacer 4920 and the freewheel body 4924 onto the wave face axle 4928; threading the non-rotor side lock bolt 4914 onto the threaded end of the wave face axle 4928 (thereby holding the bearings 4916, 4922, 4926, the spacer 4920 and the freewheel body 4924 onto the wave face axle 4928); positioning the non-rotor side lock bolt 4914, the derailleur bearing 4916, the spacer 4920 and the end of the wave face axle 4928 within the derailleur coupling housing 4912; and/or threading the lock ring 4918 into the inner threaded portion of the housing 4912 (thereby securing the non-rotor side lock bolt 4914, the derailleur bearing 4916, the spacer 4920 and the end of the wave face axle 4928 within the derailleur coupling housing 4912). In some embodiments, the method further comprises positioning the tension setter 4910 between an exterior surface of the derailleur coupling housing 4912 and the ramp 5208 of the mounting arm 5202a and sliding the ridged surface 5406 (of the tension setter 4910) along the exterior surface such that the ridged portion 5310 of the exterior surface of the derailleur coupling housing 4912 intermittently interlocks with the ridged top surface 5406 (thereby enabling the tension to be adjusted).

The rear hub 118, 118', 118" is positioned between the splined faces of the wave face axle 4928 and the rotor mount housing at the step 5810. The through axle 4902 is slid through the hollow shaft of the wave face axle 4928, the hole of the fork end 108, the mounting apertures 5204 a/b, the derailleur coupling housing 4912 and a central channel of the rear hub at the step 5812. The through axle 4902 is detachably coupled within a central aperture of the rotor mount housing at the step 5814. As a result, when the locking mechanism is coupled to the hub, the wave face axle rotates with the rear hub as the rear hub rotates about the through axle. Thus, the method provides the advantage of reducing wear on the bearings. Further, by incorporating the derailleur bearing within the housing 4912, the method provides the advantage of enabling an increased size bearing to be used. Alternatively, one or more of the above steps are able to be omitted and/or their order changed.

The systems, methods and devices described herein have numerous advantages. In particular, when the wheel is changed, the drive and/or brake components stay in the frame thus removing the need for careful disengaging or lining up movements to be made by a person. The drive also does not need to be geared down or up and thus stays in the gear the cyclist was in. This reduces the wheel change time immensely. Additionally, the hub lock system provides the advantage of reduced financial outlays due to the interchangeability of front and rear wheels and the zero amount of spare drive and brake components needed for each spare wheel, and case of storage due to less bulk and reduced risk of damage to components during storage. Another big advantage of this new hub lock system is that precision brake and drive setups are not compromised when a spare wheel is inserted into a frame. Spare wheels can be shared between different brands of brake and drive components, without compromised performance of these components. Also, the system is able to use standard frame and fork sizes, standard brake and drive components, and/or standard wheel rims and spoke lengths with standard tyre widths. Moreover, because the bearings are housed in housings separate from the hub and/or within the hanger or direct mount derailleur coupling housing, larger bearings are able to be used that are able to withstand larger forces and therefore last longer.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. For example, although the protruding and recessed splined faces are described as being correspondingly angled/tapered inwardly/outwardly (with respect to the central axis of the hub/wheel), the protruding and recessed splined faces are able to not be angled/tapered and instead be substantially perpendicular to the central axis of the hub/wheel. Additionally, although components are described as relating to a gearbox, it is understood that they are able to operate in the same manner when coupled to a single speed drive mechanism. Finally, it is understood that the described components are able to operate with electric, non-electric and/or hybrid electric/non-electric drive mechanisms.

What is claimed is:

1. A bicycle front hub system comprising:
    a front locking mechanism including a non-rotor-side bearing housing, a non-rotor-side bearing, a splined face plate, a rotor mount bearing and a rotor mount housing, the non-rotor-side bearing positioned around a base of the splined face plate within an inner chamber of the non-rotor-side bearing housing, and the rotor mount housing having a splined housing face, a plurality of rotor apertures for coupling to a brake rotor and a rotor mount housing inner cavity, wherein the rotor mount bearing is positioned within the rotor mount housing inner cavity and the splined housing face faces and is parallel with the splined face plate;
    a front hub positioned between the splined housing face and the splined face plate; and
    a through axle positioned through a central hole of the rotor mount housing and a central channel of the front hub and detachably coupled within a central aperture of the splined face plate;
    wherein when the front locking mechanism is coupled to the front hub, the splined face plate rotates with the front hub as the front hub rotates about the through axle.

2. The bicycle front hub system of claim 1, wherein when positioned through the splined housing face, the through axle has a protruding lip that abuts an inner surface of the rotor mount housing inner cavity.

3. The bicycle front hub system of claim 1, further comprising a face plate lock ring threaded onto a stem extending from the base of the splined face plate, wherein the face plate lock ring blocks the non-rotor-side bearing from sliding off the base of the splined face plate.

4. The bicycle front hub system of claim 3, further comprising a non-rotor side bearing housing lock ring coupled to the non-rotor bearing housing thereby holding the non-rotor-side bearing, as coupled with the splined face plate and the splined face plate lock ring, within the inner chamber of the non-rotor-side bearing housing.

5. The bicycle front hub system of claim 4, wherein a splined face of the splined face plate protrudes from a middle aperture of the non-rotor-side bearing housing lock ring toward the splined housing face.

6. The bicycle front hub system of claim 1, wherein the hub comprises a tube coupled between a pair of flanges, wherein each of the flanges includes an outer flange face having a central flange aperture and hub splines.

7. The bicycle front hub system of claim 6, wherein the flanges each include a plurality of spoke faces having spoke apertures for coupling with spokes of a wheel.

8. The bicycle front hub system of claim 7, wherein a portion of the spoke faces are perpendicular to a central axis of the tube and a remainder of the spoke faces are non-perpendicular to the central axis of the tube.

9. A front locking mechanism for a bicycle, the front locking mechanism comprising:
    a splined face plate having a splined surface extending from a first side, a base extending from a second side opposite the first side, and a central aperture extending through the splined surface and the base;
    a non-rotor-side bearing housing having an inner chamber;
    a non-rotor-side bearing positioned around the base of the splined face plate and within the inner chamber of the non-rotor-side bearing housing;
    a rotor mount bearing; and
    a rotor mount housing having a splined housing face including a central hole, a plurality of rotor apertures for coupling to a brake rotor and a rotor mount housing inner cavity, wherein the rotor mount bearing is positioned within the rotor mount housing inner cavity and the splined housing face faces and is parallel with the splined surface.

10. The front locking mechanism of claim 9, further comprising a face plate lock ring threaded onto a stem extending from the base of the splined face plate, wherein the face plate lock ring blocks the non-rotor-side bearing from sliding off the base of the splined face plate.

11. The front locking mechanism of claim 10, further comprising a non-rotor side bearing housing lock ring coupled to the non-rotor bearing housing thereby holding the non-rotor-side bearing, as coupled with the splined face plate and the splined face plate lock ring, within the inner chamber of the non-rotor-side bearing housing.

12. The front locking mechanism of claim 11, wherein a splined surface of the splined face plate protrudes from a middle aperture of the non-rotor-side bearing housing lock ring toward the splined housing face.

13. A front hub for a bicycle, the front hub comprising:
    a pair of flanges each including an inner flange recess and an outer flange face, the outer flange face having a central flange aperture and a plurality of flange splines that radially undulate about the central flange aperture; and a hollow tube having a first end coupled within the inner flange recess of a first of the flanges and a second end coupled within the inner flange recess of a second of the flanges.

14. The front hub of claim 13, wherein the flange splines of each of the flanges are recessed into the outer flange faces.

15. The front hub of claim 14, wherein the flange splines of each of the flanges are non-perpendicular to a central axis of the central flange apertures such that the flange splines taper from an inside end proximate the central flange apertures to an outside end distal from the central flange apertures.

16. The front hub of claim 15, wherein a thickness of the flange splines of each of the flanges decreases in a direction of a center of the central flange apertures from the outside end to the inside end.

17. The front hub of claim 13, wherein the flanges each include a plurality of spoke faces having spoke apertures for coupling with spokes of a wheel.

18. The front hub of claim 17, wherein a portion of the spoke faces are perpendicular to a central axis of the tube and a remainder of the spoke faces are non-perpendicular to the central axis of the tube.

19. A method of operating a bicycle front hub system, the method comprising:
providing a front locking mechanism including a non-rotor-side bearing housing, a non-rotor-side bearing, a splined face plate, a rotor mount bearing and a rotor mount housing, the non-rotor-side bearing positioned around a base of the splined face plate within an inner chamber of the non-rotor-side bearing housing, and the rotor mount housing having a splined housing face, a plurality of rotor apertures for coupling to a brake rotor and a rotor mount housing inner cavity, wherein the rotor mount bearing is positioned within the rotor mount housing inner cavity and the splined housing face faces and is parallel with the splined face plate;
positioning a front hub between the splined housing face and the splined face plate; and
positioning a through axle through a central hole of the rotor mount housing and a central channel of the front hub and detachably coupled within a central aperture of the splined face plate;
wherein when the front locking mechanism is coupled to the front hub, the splined face plate rotates with the front hub as the front hub rotates about the through axle.

20. The method of claim 19, wherein when positioned through the splined housing face, the through axle has a protruding lip that abuts an inner surface of the rotor mount housing inner cavity.

21. The method of claim 19, further comprising threading a face plate lock ring onto a stem extending from the base of the splined face plate, wherein the face plate lock ring blocks the non-rotor-side bearing from sliding off the base of the splined face plate.

22. The method of claim 21, further comprising threading a non-rotor side bearing housing lock ring onto the non-rotor bearing housing thereby holding the non-rotor-side bearing, as coupled with the splined face plate and the splined face plate lock ring, within the inner chamber of the non-rotor-side bearing housing.

23. The method of claim 22, wherein a splined face of the splined face plate protrudes from a middle aperture of the non-rotor-side bearing housing lock ring toward the splined housing face.

24. The method of claim 19, wherein the hub comprises a tube coupled between a pair of flanges, wherein each of the flanges includes an outer flange face having a central flange aperture and hub splines.

25. The method of claim 24, wherein the flanges each include a plurality of spoke faces having spoke apertures for coupling with spokes of a wheel.

26. The method of claim 25, wherein a portion of the spoke faces are perpendicular to a central axis of the tube and a remainder of the spoke faces are non-perpendicular to the central axis of the tube.

\* \* \* \* \*